United States Patent
Mandelboim et al.

(10) Patent No.: US 12,545,727 B2
(45) Date of Patent: Feb. 10, 2026

(54) ANTIBODIES SPECIFIC TO HUMAN NECTIN-2

(71) Applicants: YISSUM RESEARCH DEVELOPMENT COMPANY OF THE HEBREW UNIVERSITY OF JERUSALEM LTD., Jerusalem (IL); UNIVERSITY OF RIJEKA FACULTY OF MEDICINE, Rijeka (HR)

(72) Inventors: Ofer Mandelboim, Shoham (IL); Pinchas Tsukerman, Jerusalem (IL); Stipan Jonjic, Rijeka (HR); Tihana Lenac Rovis, Kastav (HR); Paola Kucan Brlic, Rijeka (HR)

(73) Assignees: YISSUM RESEARCH DEVELOPMENT COMPANY OF THE HEBREW UNIVERSITY OF JERUSALEM LTD., Jerusalem (IL); UNIVERSITY OF RIJEKA FACULTY OF MEDICINE, Rijeka (HR)

( * ) Notice: Subject to any disclaimer, the term of this patent is extended or adjusted under 35 U.S.C. 154(b) by 1158 days.

(21) Appl. No.: 17/421,885

(22) PCT Filed: Jan. 13, 2020

(86) PCT No.: PCT/IL2020/050047
§ 371 (c)(1),
(2) Date: Jul. 9, 2021

(87) PCT Pub. No.: WO2020/144697
PCT Pub. Date: Jul. 16, 2020

(65) Prior Publication Data
US 2022/0112283 A1    Apr. 14, 2022

Related U.S. Application Data

(60) Provisional application No. 62/791,808, filed on Jan. 13, 2019.

(51) Int. Cl.
```
C07K 16/28      (2006.01)
A61P 35/00      (2006.01)
C07K 14/705     (2006.01)
C07K 14/725     (2006.01)
```
(Continued)

(52) U.S. Cl.
CPC .......... C07K 16/2803 (2013.01); A61P 35/00 (2018.01); C07K 14/7051 (2013.01); C07K 14/70517 (2013.01); C07K 14/70521 (2013.01); C07K 14/70578 (2013.01); C07K 16/2818 (2013.01); G01N 33/57492 (2013.01); *A61K 2039/505* (2013.01); *C07K 2317/622* (2013.01); *C07K 2317/73* (2013.01);
(Continued)

(58) Field of Classification Search
CPC ............ C07K 16/2803; C07K 14/7051; C07K 14/70517; C07K 14/70521; C07K 14/70578; C07K 16/2818; C07K 2317/622; C07K 2317/73; C07K 2317/74; C07K 2317/76; C07K 2319/02; C07K 2319/03; C07K 16/2809; C07K 16/2896; C07K 2317/56; C07K 2317/565; C07K 2317/92; A61P 35/00; A61P 3/02; A61P 43/00; A61P 31/12; G01N 33/57492; A61K 2039/505; A61K 35/17; Y02A 50/30; C12N 5/0636; C12N 2510/00
See application file for complete search history.

(56) References Cited

U.S. PATENT DOCUMENTS

| | | |
|---|---|---|
| 4,816,567 A | 3/1989 | Cabilly |
| 4,946,778 A | 8/1990 | Ladner |
| 5,225,539 A | 7/1993 | Winter |

(Continued)

FOREIGN PATENT DOCUMENTS

| | | |
|---|---|---|
| CN | 108473572 A | 8/2018 |
| CN | 108513576 A | 9/2018 |

(Continued)

OTHER PUBLICATIONS

Meyskens et al., Cancer prevention obstacles challenges and the road ahead, 2016, JNCI National Cancer Institute (Year: 2016).*

(Continued)

*Primary Examiner* — Nelson B Moseley, II
*Assistant Examiner* — Josephine K Darpolor
(74) *Attorney, Agent, or Firm* — Antheros Legal Advisors LLP

(57) ABSTRACT

The present disclosure provides monoclonal antibodies that recognize human Nectin-2 (Nectin-2, Poliovirus Receptor-Related Protein-2, Poliovirus Receptor-Like 2, CDI12, or PRR-2, is a single pass transmembrane glycoprotein with two Ig-like C2-type domains and an Ig-like V-type domain) with high affinity and specificity and inhibit its binding to TIGIT and/or CD112R. The antibodies recognize the Nectin-2 protein (CD112), prevent its binding to T cell immunoreceptor with Ig and ITIM domains (TIGIT) and CD112R (PVRIG) and inhibit suppressive activity on lymphocytes such as natural killer (NK) cells and T-cells. The disclosure further provides pharmaceutical and methods for use in cancer immunotherapy and in diagnosis. The disclosure finally further provides chimeric antigen receptor (CAR) comprising scFv antibody binding to Nectin-2.

8 Claims, 17 Drawing Sheets
Specification includes a Sequence Listing.

(51) Int. Cl.
  *G01N 33/574* (2006.01)
  *A61K 39/00* (2006.01)
(52) U.S. Cl.
  CPC ...... *C07K 2317/74* (2013.01); *C07K 2317/76* (2013.01); *C07K 2319/02* (2013.01); *C07K 2319/03* (2013.01)

(56) References Cited

U.S. PATENT DOCUMENTS

| | | | |
|---|---|---|---|
| 5,530,101 | A | 6/1996 | Queen |
| 5,585,089 | A | 12/1996 | Queen |
| 5,641,870 | A | 6/1997 | Rinderknecht |
| 5,693,761 | A | 12/1997 | Queen |
| 5,693,762 | A | 12/1997 | Queen |
| 2010/0008928 | A1 | 1/2010 | Sato et al. |
| 2017/0037133 | A1 | 2/2017 | Fiedler |
| 2018/0185480 | A1 | 7/2018 | Mandelboim |
| 2024/0424128 | A1 | 12/2024 | Tsukerman et al. |

FOREIGN PATENT DOCUMENTS

| | | |
|---|---|---|
| CN | 109071666 A | 12/2018 |
| EP | 0404097 A2 | 12/1990 |
| WO | 8601533 A1 | 3/1986 |
| WO | 9007861 A1 | 7/1990 |
| WO | 9222653 A1 | 12/1992 |
| WO | 9311161 A1 | 6/1993 |
| WO | 9315210 A1 | 8/1993 |
| WO | 9613583 A2 | 5/1996 |
| WO | 9637621 A2 | 11/1996 |
| WO | 03080672 A1 | 10/2003 |
| WO | 2007043635 A1 | 4/2007 |
| WO | WO-2008126847 A1 | 10/2008 |
| WO | 2017021526 A1 | 2/2017 |
| WO | 2017041004 A1 | 3/2017 |
| WO | 2017149538 A1 | 9/2017 |
| WO | 2017189963 A1 | 11/2017 |
| WO | WO-2023161943 A1 | 8/2023 |

OTHER PUBLICATIONS

Borghaei et al., immunotherapy of cancer, 2009, European Journal of Pharmacology (Year: 2009).*
Badri et al., (2016) Optimization of radiation dosing schedules for proneural glioblastoma. J Math Biol 72(5): 1301-1336.
Baylot et al., (2017) TCTP Has a Crucial Role in the Different Stages of Prostate Cancer Malignant Progression. Results Probl Cell Differ 64: 255-261. Abstract.
Gafanov et al., (2018) Systemic therapy of metastatic urothelial cancer: current standards and treatment guidelines. RMJ. Medical Review 6: 28-35. Abstract.
Muller et al., (2008) Spliceosomal peptide P140 for immunotherapy of systemic lupus erythematosus: results of an early phase II clinical trial. Arthritis Rheum 58(12): 3873-3883.
Anaya (2016) OncoLnc: linking TCGA survival data to mRNAs, miRNAs, and lncRNAs. PeerJ Comput Sci 2: e67; 13 pages. DOI 10.7717/peerj-cs.67.
Bird et al., (1988) Single-chain antigen-binding proteins. Science 242(4877): 423-426.
Brennan et al., (1985) Preparation of bispecific antibodies by chemical recombination of monoclonal immunoglobulin G1 fragments. Science 229(4708): 81-83.
Carter et al., (1992) High level *Escherichia coli* expression and production of a bivalent humanized antibody fragment. Biotechnology (N Y) 10(2): 163-167.
Clackson et al., (1991) Making antibody fragments using phage display libraries. Nature 352(6336): 624-628.
Fields et al., (2013) Creation of recombinant antigen-binding molecules derived from hybridomas secreting specific antibodies. Nat Protoc 8(6): 1125-1148.

Gao et al., (2019) Therapeutic potential of CRISPR/Cas9 gene editing in engineered T-cell therapy. Cancer Med 8(9): 4254-4264.
Holliger et al., (1993) "Diabodies": small bivalent and bispecific antibody fragments. Proc Natl Acad Sci U S A 90(14): 6444-6448.
Huston et al., (1988) Protein engineering of antibody binding sites: recovery of specific activity in an anti-digoxin single-chain Fv analogue produced in *Escherichia coli*. Proc Natl Acad Sci U S A 85(16): 5879-5883.
Köhler and Milstein (1975) Continuous cultures of fused cells secreting antibody of predefined specificity. Nature 256 (5517): 495-497.
Lefranc et al., (2003) IMGT unique numbering for immunoglobulin and T cell receptor variable domains and Ig superfamily V-like domains. Dev Comp Immunol 27(1): 55-77.
Marks et al., (1991) By-passing immunization. Human antibodies from V-gene libraries displayed on phage. J Mol Biol 222(3): 581-597.
Morimoto and Inouye (1992) Single-step purification of F(ab')2 fragments of mouse monoclonal antibodies (immunoglobulins G1) by hydrophobic interaction high performance liquid chromatography using TSKgel Phenyl-5PW. J Biochem Biophys Methods 24(1-2): 107-117.
Morrison et al., (1984) Chimeric human antibody molecules: mouse antigen-binding domains with human constant region domains. Proc Natl Acad Sci U S A 81(21): 6851-6855.
Newick et al., (2017) CAR T Cell Therapy for Solid Tumors. Annu Rev Med 68: 139-152.
Oshima et al., (2013) Nectin-2 is a potential target for antibody therapy of breast and ovarian cancers. Mol Cancer 12: 60; 13 pages.
Oshima et al., (2018) Fc engineering of anti-Nectin-2 antibody improved thrombocytopeniadverse event in monkey. PLoS One 13(5): e0196422; 17 pages.
Scarano et al., (2010) Surface plasmon resonance imaging for affinity-based biosensors. Biosens Bioelectron 25(5): 957-966.
Stamm et al., (2018) Immune checkpoints PVR and PVRL2 are prognostic markers in AML and their blockade represents a new therapeutic option. Oncogene 37(39): 5269-5280.
Stamm et al., (2018) Interaction of PVR/PVRL2 with TIGIT/DNAM-1 as a novel immune checkpoint axis and therapeutic target in cancer. Mamm Genome 29(11-12): 694-702.
Ward et al., (1989) Binding activities of a repertoire of single immunoglobulin variable domains secreted from *Escherichia coli*. Nature 341(6242): 544-546.
Wu and Kabat (1970) An analysis of the sequences of the variable regions of Bence Jones proteins and myeloma light chains and their implications for antibody complementarity. J Exp Med 132(2): 211-250.
Zapata et al., (1995) Engineering linear F(ab')2 fragments for efficient production in *Escherichia coli* and enhanced antiproliferative activity. Protein Eng 8(10): 1057-1062.
Zhu et al., (2016) Identification of CD112R as a novel checkpoint for human T cells. J Exp Med 213(2): 167-176.
Park, M-H., et al., Pharmacokinetic and Metabolism Studies of Monomethyl Auristatin F via Liquid Chromatography-Quadrupole-Time-of-Flight Mass Spectrometry, Molecules, 24(15): 2754 (2019).
PCT/IL2020/050047 International Search Report and Written Opinion mailed May 7, 2020.
PCT/IL2023/050203 International Search Report and Written Opinion mailed May 30, 2023.
Yaghoubi, S., et al., Potential drugs used in the antibody-drug conjugate (ADC) architecture for cancer therapy, J Cell Physiol, 235(1): 31-64 (2020).
U.S. Appl. No. 18/818,412, filed Aug. 28, 2024, Pending.
U.S. Appl. No. 18/818,418, filed Aug. 28, 2024, Pending.
Deng et al., (2007) Preparation and characterization of monoclonal antibodies against human CD112 (Nectin2/PRR2). Chinese Journal of Cellular and Molecular Immunology 23(4): 356-358. Abstract.
Rudikoff et al., (1982) Single amino acid substitution altering antigen-binding specificity. Proc Natl Acad Sci U S A 79 (6): 1979-1983.
Tamura et al., (2000) Structural correlates of an anticarcinoma antibody: identification of specificity-determining residues (SDRs)

(56) References Cited

OTHER PUBLICATIONS and development of a minimally immunogenic antibody variant by retention of SDRs only. J Immunol 164(3): 1432-1441.

* cited by examiner

ANTIBODIES SPECIFIC TO HUMAN NECTIN-2

CROSS-REFERENCE

This application is the U.S. National Stage entry of International Application No. PCT/IL2020/050047, filed on Jan. 13, 2020, which claims the benefit of and priority to U.S. Provisional Application No. 62/791,808, filed Jan. 13, 2019, the disclosures of each are hereby incorporated by reference in their entirety for all purposes.

SEQUENCE LISTING

The application contains a Sequence Listing in computer readable form. The computer readable form is incorporated herein by reference in its entirety. Said ASCII copy, created on Aug. 5, 2021, is named, 00020.401.1201_SL.txt and is 22,733 bytes in size.

FIELD OF THE INVENTION

The invention is in the field of immunotherapy and relates to antibodies and fragments thereof which bind to the human protein Nectin-2 (CD112), to polynucleotide sequences encoding these antibodies and fragments and to cells producing them. The invention further relates to therapeutic and diagnostic compositions comprising these antibodies and fragments and to methods of treating and diagnosing diseases, particularly cancer, using them.

BACKGROUND OF THE INVENTION

Cancer immunotherapy is utilized for generating and augmenting an anti-tumor immune response, e.g., by treatment with antibodies specific to antigens on tumor cells, with fusions of antigen presenting cells with tumor cells, or by specific activation of anti-tumor T cells. The ability of recruiting immune cells (e.g. T cells) against tumor cells in a patient provides a therapeutic modality of fighting cancer types and metastasis that so far were considered incurable.

T cell mediated immune responses includes multiple sequential steps regulated by a balance between co-stimulatory and co-inhibitory signals that control the magnitude of the immune response. The inhibitory signals, referred to as immune checkpoints, are crucial for the maintenance of self-tolerance and for the limitation of immune-mediated collateral tissue damage. These inhibitory signals change as an infection or immune provocation is cleared, worsens, or persists, and these changes affect the response of T cells and re-shape the immune response.

The expression of immune checkpoint proteins is altered by tumors. For example, upregulation of programmed death-ligand 1 (PD-L1) on the cancer cell surface allows them to bind to the check-point molecule PD-1 expressed on T cells. This leads to inhibition of T cells that might otherwise attack the tumor cells and allow the tumor cells to evade the host immune system. Thus, immune checkpoints represent significant barriers for the activation of functional cellular immunity against cancer. Accordingly, antagonistic antibodies specific for inhibitory ligands on T cells (e.g. PD-1) are examples of targeted agents against immune check points that are being used in cancer therapy (e.g. Nivolumab and Pembrolizumab). Another example for an immune checkpoint molecule is T cell immunoreceptor with Ig and ITIM domains (TIGIT). TIGIT is a co-inhibitory molecule expressed on various immune cells including T cells and natural killer cells (NK cells). TIGIT binds with high affinity to polio virus receptor (PVR) and to Nectin-2.

Nectin-2, which was also named Poliovirus Receptor-Related Protein-2, Poliovirus Receptor-Like 2, CD112, or PRR-2, is a single pass transmembrane glycoprotein with two Ig-like C2-type domains and an Ig-like V-type domain. Nectin-2 is involved in mediating cell adhesion to extracellular matrix molecules, serving as one of the plasma membrane components of adherent junctions. It also serves as an entry receptor for certain mutant strains of herpes simplex virus and pseudorabies virus, and it is involved in cell to cell spreading of these viruses. Variations in this gene have been associated with differences in the severity of multiple sclerosis. Importantly, nectin-2 can also serve as a modulator of T-cell signaling. It can be either a costimulator of T-cell functions, or a coinhibitor, depending on the receptor it binds to. Upon binding to CD226 (DNAM-1), it stimulates T-cell proliferation and cytokine production, including that of IL-2, and IFNγ, while upon interaction with PVRIG (CD112R), and/or TIGIT it inhibits T-cell proliferation. These two contradictory interactions are competitive.

Nectin-2 was shown to be overexpressed in various tumors, including breast and ovarian cancers (Oshima et al. Molecular Cancer 2013). The presence of Nectin-2 on tumor cells leads to poor prognosis and reduced activity of T cells (Stamm et al. Oncogene 2018).

US patent application No. 2017/0037133 discloses an inhibitor against CD112 (Nectin-2, PVRL2), CD155 (PVR), Galectin-9, TIM-3 and/or TIGIT for use in a method of treatment of a blood-borne cancer, in particular acute myeloid leukemia (AML). The inhibitor may be an antibody construct.

There is an unmet need to provide additional and more effective, specific, safe and/or stable agents that alone, or in combination with other agents, may potentiate cells of the immune system to attack tumors or virus infected cells. Monoclonal antibodies inhibiting Nectin-2 binding to CD112R and to TIGIT may be such agents.

SUMMARY OF THE INVENTION

The present invention provides antibodies and fragments thereof that recognize the Nectin-2 protein (CD112), prevent its binding to T cell immunoreceptor with Ig and ITIM domains (TIGIT) and CD112R (PVRIG) and inhibit suppressive activity on lymphocytes such as natural killer (NK) cells and T-cells. The anti-Nectin-2 antibodies disclosed herein are capable of binding to Nectin-2 present on cancer cells. These antibodies and fragment thereof are characterized by having unique sets of CDR sequences, high affinity and high specificity to human Nectin-2, and are useful in cancer immunotherapy for combating tumor immune evasion, as stand-alone therapy and in combination with other anti-cancer agents. The antibodies are also useful in treating viral infections and may be used for cancer diagnosis. The present invention further comprises CAR-T cells and methods of their use for adoptive therapy.

It is now disclosed that the high affinity anti-Nectin-2 antibodies described herein block TIGIT- and/or CD112R-Nectin-2 interactions and subsequently restore T and NK cell activities. The antibodies of the present invention are highly specific to human Nectin-2. These properties make the monoclonal antibodies of the present invention valuable candidates for use in cancer immune-therapy, enabling administration of lower doses with fewer side effects.

Advantageously, the anti Nectin-2 mAbs according to the invention were found to induce T cells proliferation in a manner similar to that induced by anti-PD-1 and anti-CTLA-4 mAbs. The combination of some of the anti-Nectin-2 mAbs with clinically approved therapeutic anti-PD-1 and anti-CTLA4 mAbs resulted in a significant increase of activity above the activity level induced by any of the individual mAbs. Surprisingly, some of the combinations of the anti-Nectin-2 mAbs described herein with anti-PD-1 demonstrated a synergistic effect in killing of tumor cells. The induction effect was shown for human peripheral mono-nuclear blood cells (PBMCs) and mainly in T cells. In addition, Nectin-2 mAbs were able to induce NK cell activation in the presence of target cancer cells. It is further disclosed that some anti-Nectin-2 antibodies had no blocking effect on the co-stimulatory signaling of DNAM-1, therefore they had no deleterious effect on immune induction signals. In addition, the antibodies described herein were found to be highly specific to the human or cynomolgus Nectin-2 protein.

The anti-Nectin-2 mAbs disclosed herein may have a functional heavy chain (Fc) that may further trigger anti-cancer immune responses.

Some of the anti Nectin-2 mAbs described herein may be able to reduce tumor cell viability in an immune independent manner.

According to one aspect, the present invention provides an antibody, or an antibody fragment thereof comprising at least the antigen binding portion, which specifically binds to human Nectin-2 and inhibits its binding to at least one of the receptors TIGIT and CD112R, said antibodies have an affinity to human Nectin-2 of at least $10^{-9}$ M.

The present invention also provides an antibody, or an antibody fragment thereof, capable of inhibiting the binding of human Nectin-2 to human TIGIT or to CD112R, for use in treatment of cancer, together with T-cell lymphocytes and/or natural killer (NK) cells, said antibodies have an affinity of at least $10^{-9}$ M to human Nectin-2.

According to some embodiments, the antibody specifically binds to human Nectin-2 and inhibits its binding to TIGIT and CD112R.

According to some embodiments, the antibody or antibody fragment comprises a set of six CDR sequences selected from the group consisting of:
  i. three complementarity determining regions (CDRs) of a heavy-chain (HC) variable region comprising SEQ ID NO: 7 and three CDRs of a light-chain (LC) variable comprising SEQ ID NO: 8, or an analog or derivative thereof having at least 90% sequence identity with said antibody or fragment sequence; and
  ii. three CDRs of a heavy-chain variable region comprising SEQ ID NO: 17 and three CDRs of a light-chain variable region comprising SEQ ID NO: 18, or an analog or derivative thereof having at least 90% sequence identity with said antibody or fragment sequence.

There are several methods known in the art for determining the CDR sequences of a given antibody molecule, but there is no standard unequivocal method. Determination of CDR sequences from antibody heavy and light chain variable regions can be made according to any method known in the art, including but not limited to the methods known as KABAT, Chothia and IMGT. A selected set of CDRs may include sequences identified by more than one method, namely, some CDR sequences may be determined using KABAT and some using IMGT, for example. According to some embodiments, the CDR sequences of the mAb variable regions are determined using the IMGT method.

According to some embodiments, the antibody or fragment comprises the CDR sequences of a monoclonal antibody denoted clone 7, namely, the three CDR sequences contained in heavy chain variable region set forth in SEQ ID NO: 7 and the three CDR sequences contained in light chain variable region set forth in SEQ ID NO: 8, or a monoclonal antibody denoted clone 11, namely, the three CDR sequences contained in heavy chain variable region set forth in SEQ ID NO: 17 and the three CDR sequences contained in light chain variable region set forth in SEQ ID NO: 18.

According to some embodiments, the antibody or the antibody fragment comprises heavy-chain CDR1 comprising the sequence RFTMS (SEQ ID NO: 1). According to some embodiments, the antibody or the antibody fragment comprises heavy-chain CDR2 comprising the sequence TISSGGSYTYYPDSVKG (SEQ ID NO: 2). According to some embodiments, the antibody or the antibody fragment comprises heavy-chain CDR3 comprising the sequence DRDFYGPYYAMDY (SEQ ID NO: 3).

According to certain embodiments, the antibody or the antibody fragment comprises: (i) HC CDR1 comprising the sequence RFTMS (SEQ ID NO: 1); (ii) HC CDR2 comprising the sequence TISSGGSYTYYPDSVKG (SEQ ID NO: 2); and (iii) HC CDR3 comprising the sequence DRDFYGPYYAMDY (SEQ ID NO: 3).

According to some embodiments, the antibody or the antibody fragment comprises light-chain CDR1 comprising the sequence KSSQSLLNSGNQKNYLA (SEQ ID NO: 4). According to some embodiments, the antibody or the antibody fragment comprises light-chain CDR2 comprising the sequence FASTRES (SEQ ID NO: 5). According to some embodiments, the antibody or the antibody fragment comprises light-chain CDR3 comprising the sequence QQHYTTPLT (SEQ ID NO: 6).

According to certain embodiments, the antibody or the antibody fragment comprises: (i) LC CDR1 comprising the sequence KSSQSLLNSGNQKNYLA (SEQ ID NO: 4); (ii) LC CDR2 comprising the sequence FASTRES (SEQ ID NO: 5); and (iii) HC CDR3 comprising the sequence QQHYTTPLT (SEQ ID NO: 6).

According to some specific embodiments the antibody or fragment comprises heavy chain CDR1 sequence comprising the sequence RFTMS (SEQ ID NO: 1), heavy chain CDR2 comprising the sequence TISSGGSYTYYPDSVKG (SEQ ID NO: 2), heavy chain CDR3 comprising the sequence DRDFYGPYYAMDY (SEQ ID NO: 3), light chain CDR1 comprising the sequence KSSQSLLNSGNQKNYLA (SEQ ID NO: 4), light chain CDR2 comprising the sequence FASTRES (SEQ ID NO: 5), and light chain CDR3 comprising the sequence QQHYTTPLT (SEQ ID NO: 6), or analogs thereof comprising no more than 5% amino acid substitution, deletion and/or insertion in the hypervariable region (HVR) sequence.

According to some specific embodiments the antibody or fragment comprises a set of six CDR sequences consisting of:
  i. heavy chain CDR1 having a sequence set forth in SEQ ID NO: 1;
  ii. heavy chain CDR2 having a sequence set forth in SEQ ID NO: 2;
  iii. heavy chain CDR3 having a sequence set forth in SEQ ID NO: 3;
  iv. light chain CDR1 having a sequence set forth in SEQ ID NO: 4;
  v. light chain CDR2 having a sequence set forth in SEQ ID NO: 5; and vi. light chain CDR3 having a sequence set forth in SEQ ID NO: 6

According to some embodiments, the antibody or fragment thereof comprises heavy chain variable region set forth in SEQ ID NO: 7, or an analog or derivative thereof having at least 90% sequence identity with the heavy chain variable region sequence.

According to some embodiments, the antibody or fragment thereof comprises light chain variable region set forth in SEQ ID NO: 8, or an analog thereof having at least 90% sequence identity with the light chain variable region sequence.

According to a specific embodiment, the antibody or fragment thereof comprises a heavy chain variable region having a sequence set forth in SEQ ID NO: 7, and a light chain variable region having a sequence set forth in SEQ ID NO: 8, or an analog thereof having at least 90% sequence identity with the light and/or heavy chain sequence.

According to some embodiments, the antibody or fragment comprises the CDR sequences of a monoclonal antibody denoted clone 11, namely, the three CDR sequences contained in heavy chain variable region set forth in SEQ ID NO: 17 and the three CDR sequences contained in light chain variable region set forth in SEQ ID NO: 18.

According to some embodiments, the antibody or the antibody fragment comprises heavy-chain CDR1 comprising the sequence SYWIH (SEQ ID NO: 11). According to some embodiments, the antibody or the antibody fragment comprises heavy-chain CDR2 comprising the sequence AVYPGNSDSNYNQKFKA (SEQ ID NO: 12). According to some embodiments, the antibody or the antibody fragment comprises heavy-chain CDR3 comprising the sequence LVGTEDY (SEQ ID NO: 13).

According to certain embodiments, the antibody or the antibody fragment comprises: (i) HC CDR1 comprising the sequence SYWIH (SEQ ID NO: 11); (ii) HC CDR2 comprising the sequence AVYPGNSDSNYNQKFKA (SEQ ID NO: 12); and (iii) HC CDR3 comprising the sequence LVGTFDY (SEQ ID NO: 13).

According to some embodiments, the antibody or the antibody fragment comprises light-chain CDR1 comprising the sequence KASQNVGINVV (SEQ ID NO: 14). According to some embodiments, the antibody or the antibody fragment comprises light-chain CDR2 comprising the sequence SASYRYS (SEQ ID NO: 15). According to some embodiments, the antibody or the antibody fragment comprises light-chain CDR3 comprising the sequence QQYNTNPFT (SEQ ID NO: 16).

According to certain embodiments, the antibody or the antibody fragment comprises: (i) LC CDR1 comprising the sequence KASQNVGINVV (SEQ ID NO: 14); (ii) LC CDR2 comprising the sequence SASYRYS (SEQ ID NO: 15); and (iii) HC CDR3 comprising the sequence QQYNTNPFT (SEQ ID NO: 16).

According to some specific embodiments antibody or fragment comprises heavy chain CDR1 sequence comprising the sequence SYWIH (SEQ ID NO: 11), heavy chain CDR2 comprising the sequence AVYPGNSDSNYNQKFKA (SEQ ID NO: 12), heavy chain CDR3 comprising the sequence LVGTEDY (SEQ ID NO: 13), light chain CDR1 comprising the sequence KASQNVGINVV (SEQ ID NO: 14), light chain CDR2 comprising the sequence SASYRYS (SEQ ID NO: 15), and light chain CDR3 comprising the sequence QQYNTNPFT (SEQ ID NO: 16), or analogs thereof comprising no more than 5% amino acid substitution, deletion and/or insertion in the hypervariable region (HVR) sequence.

According to some specific embodiments the antibody or fragment comprises a set of six CDR sequences consisting of:
i. heavy chain CDR1 having a sequence set forth in SEQ ID NO: 11;
ii. heavy chain CDR2 having a sequence set forth in SEQ ID NO: 12;
iii. heavy chain CDR3 having a sequence set forth in SEQ ID NO: 13;
iv. light chain CDR1 having a sequence set forth in SEQ ID NO: 14;
v. light chain CDR2 having a sequence set forth in SEQ ID NO: 15; and
vi. light chain CDR3 having a sequence set forth in SEQ ID NO: 16.

According to some embodiments, the antibody or fragment thereof comprises heavy chain variable region set forth in SEQ ID NO: 17, or an analog or derivative thereof having at least 90% sequence identity with the heavy chain variable region sequence.

According to some embodiments, the antibody or fragment thereof comprises light chain variable region set forth in SEQ ID NO: 18, or an analog thereof having at least 90% sequence identity with the light chain variable region sequence.

According to a specific embodiment, the antibody or fragment thereof comprises a heavy chain variable region having a sequence set forth in SEQ ID NO: 17, and a light chain variable region having a sequence set forth in SEQ ID NO: 18, or an analog thereof having at least 90% sequence identity with the light and/or heavy chain sequence.

According to some embodiments, the antibody is an isolated monoclonal antibody.

According to some embodiments, the antibody or fragment thereof recognizes human Nectin-2 with an affinity of at least $5 \times 10^{-9}$M. According to other embodiments, the antibody or antibody fragment binds with an affinity of $5 \times 10^{-9}$M, $10^{-9}$M, $5 \times 10^{-10}$M, $10^{-10}$M, $5 \times 10^{-11}$M or even higher to human Nectin-2. According to some embodiments, the antibody or antibody fragment binds to human Nectin-2 with affinity at the range of $10^{-9}$ M to $10^{-11}$ M. According to some embodiments, the antibody or antibody fragment binds to human Nectin-2 with affinity at the range of $10^{-9}$ M to $10^{-10}$ M. According to some embodiments, the antibody or antibody fragment binds to human Nectin-2 with affinity at the range of $10^{-10}$ M to $10^{-11}$ M. Each possibility represents a separate embodiment of the invention.

Analogs and derivatives of the isolated antibody and the fragments described above, are also within the scope of the invention.

According to some embodiments, the antibody or antibody fragment analog have at least 90% sequence identity with the hypervariable region of the reference antibody sequence.

According to certain embodiments, the analog or derivative of the isolated antibody or fragment thereof has at least 91, 92, 93, 94, 95, 96, 97, 98 or 99% sequence identity with a variable region of the reference antibody sequence. Each possibility represents a separate embodiment of the invention.

According to some embodiments, the antibody or antibody fragment according to the invention comprises a heavy chain variable region set forth in SEQ ID NO: 7 or SEQ ID NO: 17, or an analog having at least 95% sequence similarity with said sequence.

According to some embodiments, the antibody or antibody fragment comprises a light chain variable region set forth in SEQ ID NO: 8 or SEQ ID NO: 18, or an analog having at least 95% sequence similarity with said sequence.

According to some embodiments, the antibody or antibody fragment comprises a heavy chain and a light chain, wherein: (i) the heavy chain comprises SEQ ID NO: 7 and the light chain comprises SEQ ID NO: 8; or (ii) the heavy chain comprises SEQ ID NO: 17 and the light chain comprises SEQ ID NO: 18. Analogs of the antibodies or fragments, having at least 95% sequence similarity with said heavy or light chains are also included.

According to some embodiments, the analog has at least 96, 97, 98 or 99% sequence similarity or identity with an antibody light or heavy chain variable regions described above. According to some embodiments, the analog comprises no more than one amino acid substitution, deletion or addition to one or more CDR sequences of the hypervariable region, namely, any one of the CDR sequences set forth in SEQ ID NOs: 1, 2, 3, 4, 5, 6, 11, 12, 13, 14, 15 and 16. Each possibility represents a separate embodiment of the present invention. According to some embodiments, the amino acid substitution is a conservative substitution.

According to some embodiments, the antibody or antibody fragment comprises a hypervariable region (HVR) having light and heavy chain regions defined above, in which 1, 2, 3, 4, or 5 amino acids were substituted, deleted and/or added. Each possibility represents a separate embodiment of the invention.

According to some embodiments, the antibody or antibody fragment comprises a HVR having light and heavy chain regions defined above, in which one amino acid was substituted. According to specific embodiments, the antibody or antibody fragment comprises a CDR as defined above, in which one amino acid was substituted.

According to some embodiments, the antibody or the antibody fragment comprises a CDR set selected from the group consisting of:

```
i. a set of six CDRs wherein:
                                       (SEQ ID NO: 1)
   HC CDR1 is RFTMS;

(SEQ ID NO: 2)
   HC CDR2 is TISSGGSYTYYPDSVKG;

(SEQ ID NO: 3)
   HC CDR3 is DRDFYGPYYAMDY;

(SEQ ID NO: 4)
   LC CDR1 is KSSQSLLNSGNQKNYLA;

(SEQ ID NO: 5)
   LC CDR2 is FASTRES;
   and (SEQ ID NO: 6)
   LC CDR3 is QQHYTTPLT;
   and ii. a set of six CDRs wherein:
                                       (SEQ ID NO: 11)
   HC CDR1 sequence is SYWIH;

(SEQ ID NO: 12)
   HC CDR2 is AVYPGNSDSNYNQKFKA;

(SEQ ID NO: 13)
   HC CDR3 is LVGTFDY;

(SEQ ID NO: 14)
   LC CDR1 is KASQNVGINVV;
```

```
                                       (SEQ ID NO: 15)
   LC CDR2 is SASYRYS;
   and (SEQ ID NO: 16)
   LC CDR3 is QQYNTNPFT.
```

The present invention also provides antibodies and binding fragments thereof, comprising a heavy chain and a light chain, wherein said chains comprises a set of heavy chain variable region sequence and light chain variable region sequence, said set is selected from the group consisting of:
  i. SEQ ID NOs: 7 and 8; and
  ii. SEQ ID NOs: 17 and 18.

According to some embodiments, the antibody or antibody fragment is capable of inhibiting human Nectin-2 binding to TIGIT or CD112R expressed on T cells or NK cells.

According to some embodiments, the antibody or antibody fragment is capable of inhibiting human Nectin-2 binding to TIGIT and CD112R expressed on T cells or NK cells.

According to a specific embodiment, the antibody is selected from the group consisting of: chimeric antibody and an antibody fragment comprising at least the antigen-binding portion of an antibody. According to specific embodiments, the antibody is a chimeric antibody. According to yet other embodiments, the chimeric antibody comprised human constant region. According to a specific embodiment, the antibody fragment is selected from the group consisting of: Fab, Fab', F(ab') 2, Fd, Fd', Fv, dAb, isolated CDR region, single chain variable region (scFv), single chain antibody (scab), "diabodies", and "linear antibodies". Each possibility represents a separate embodiment of the present invention.

According to some embodiments, the antibody or antibody fragment comprises a constant region selected from the group consisting of: mouse IgG1, mouse IgG2a, mouse IgG2b, mouse IgG3, human IgG1, human IgG2, human IgG3 and human IgG4. Each possibility represents a separate embodiment of the present invention.

According to some specific embodiments, the monoclonal antibody is a chimeric monoclonal antibody.

According to some embodiments, the chimeric antibody comprises human-derived constant regions.

According to some embodiments the human constant regions of the chimeric antibody are selected from the group consisting of: human IgG1, human IgG2, human IgG3, and human IgG4.

According to some embodiments the human constant region of the chimeric antibody is selected from the group consisting of: human IgG1 and human IgG2.

According to some embodiments, a conjugate comprising the antibody or fragment thereof as described above is provided.

Antibodies or fragments thereof according to the present invention may be attached to a cytotoxic moiety, a radioactive moiety, or an identifiable moiety.

Polynucleotide sequences encoding antibodies, having high affinity and specificity for human Nectin-2, as well as vectors and host cells carrying these polynucleotide sequences, are provided according to another aspect of the present invention.

According to some embodiments, polynucleotide sequences encoding the amino acid sequences of heavy chain variable region and light chain variable region described above are provided.

According to some embodiments, the polynucleotide sequence encodes an antibody or antibody fragment or chain capable of binding to an epitope within the human Nectin-2 protein to which binds: (i) an antibody (herein identified as clone 7) having a heavy chain variable region of SEQ ID NO: 7 and a light chain variable region of SEQ ID NO: 8; or (ii) an antibody (herein identified as clone 11) having a heavy chain variable region of SEQ ID NO: 17 and a light chain variable region of SEQ ID NO: 18.

According to some embodiments, the polynucleotide sequence encodes an antibody or antibody fragment or chain comprising the sequence set forth in a sequence selected from the group consisting of: (i) SEQ ID NO: 7 and SEQ ID NO: 8; and (ii) SEQ ID NO: 17 and SEQ ID NO: 18. Each possibility represents a separate embodiment of the present invention.

According to yet some embodiments, the polynucleotide sequence according to the invention encodes an antibody or antibody fragment or chain comprising:

```
i. a set of six CDRs wherein:
                                   (SEQ ID NO: 1)
HC CDR1 is RFTMS;

(SEQ ID NO: 2)
HC CDR2 is TISSGGSYTYYPDSVKG;

(SEQ ID NO: 3)
HC CDR3 is DRDFYGPYYAMDY;

(SEQ ID NO: 4)
LC CDR1 is KSSQSLLNSGNQKNYLA;

(SEQ ID NO: 5)
LC CDR2 is FASTRES;
and (SEQ ID NO: 6)
LC CDR3 is QQHYTTPLT;
or
ii. a set of six CDRs wherein:
                                   (SEQ ID NO: 11)
HC CDR1 sequence is SYWIH;

(SEQ ID NO: 12)
HC CDR2 is AVYPGNSDSNYNQKFKA;

(SEQ ID NO: 13)
HC CDR3 is LVGTFDY;

(SEQ ID NO: 14)
LC CDR1 is KASQNVGINVV;

(SEQ ID NO: 15)
LC CDR2 is SASYRYS;
and (SEQ ID NO: 16)
LC CDR3 is QQYNTNPFT.
Each possibility represents a separate
embodiment of the present invention.
```

According to some embodiments, the polynucleotide sequences defined above encode a molecule selected from the group consisting of: an antibody, an antibody fragment comprising at least an antigen-binding portion, and an antibody conjugate comprising said antibody or antibody fragment. Each possibility represents a separate embodiment of the present invention.

According to some embodiments, the polynucleotide sequence encodes a monoclonal antibody heavy chain variable region comprising a sequence set forth in SEQ ID NO: 7 or a variant thereof having at least 90% sequence identity.

According to some embodiments, the polynucleotide sequence encodes a monoclonal antibody heavy chain variable region, comprising a sequence set forth in SEQ ID NO: 17, or a variant thereof having at least 90% sequence identity.

According to some embodiments, the polynucleotide sequence encodes a monoclonal antibody light chain variable region comprising a sequence set forth in SEQ ID NO: 8 or a variant thereof having at least 90% sequence identity.

According to some embodiments, the polynucleotide sequence encodes a monoclonal antibody light chain variable region comprising a sequence set forth in SEQ ID NO: 18, or a variant thereof having at least 90% sequence identity.

The present invention provides, according to some embodiments, a polypeptide comprising at least one sequence encoded by at least one polynucleotide sequence disclosed above.

In a further aspect, the present invention provides a nucleic acid construct comprising a nucleic acid molecule encoding at least one antibody chain or fragment thereof according to the present invention. According to some embodiments the nucleic acid construct is a plasmid.

According to some embodiments the plasmid comprises at least one polynucleotide sequence set forth in a sequence selected from the group consisting of SEQ ID NO: 9, SEQ ID NO: 10, SEQ ID NO: 19 and SEQ ID NO: 20. Each possibility represents a separate embodiment of the present invention.

In still another aspect the present invention provides a cell capable of producing an antibody or an antibody fragment comprising the specific CDR sequences and/or specific heavy and light chain variable regions defined above.

According to some embodiments, a cell is provided comprising at least one polynucleotide sequence disclosed above.

According to some embodiments, the cell producing the monoclonal antibody is a hybridoma cell.

The present invention provides, according to another aspect, a pharmaceutical composition comprising as an active ingredient, at least one antibody, antibody fragment or conjugates thereof, that recognizes human Nectin-2 with high affinity and specificity, and optionally at least one pharmaceutical acceptable excipient, diluent, salt or carrier, wherein said at least one antibody or antibody fragment is capable of inhibiting the binding of human Nectin-2 to human TIGIT and/or CD112R.

According to some embodiments, the pharmaceutical composition comprises a monoclonal antibody or a fragment thereof which is capable of binding to an epitope within the human Nectin-2 protein to which binds a monoclonal antibody selected from the group consisting of: clone 7 and clone 11 having variable region and CDR sequences disclosed above.

According to some embodiments, the pharmaceutical composition comprises at least one monoclonal antibody comprising:

i. a set of six CDRs wherein: HC CDR1 is (SEQ ID NO: 1); HC CDR2 is (SEQ ID NO: 2); HC CDR3 is (SEQ ID NO: 3); LC CDR1 is (SEQ ID NO: 4); LC CDR2 is (SEQ ID NO: 5); and LC CDR3 is (SEQ ID NO: 6); or
ii. a set of six CDRs wherein: HC CDR1 sequence is (SEQ ID NO: 11); HC CDR2 is (SEQ ID NO: 12); HC CDR3 is (SEQ ID NO: 13); LC CDR1 is (SEQ ID NO: 14); LC CDR2 is (SEQ ID NO: 15); and LC CDR3 is (SEQ ID NO: 16).

Each possibility represents a separate embodiment of the present invention.

According to some embodiments, the pharmaceutical composition comprises an antibody or fragment thereof comprising a heavy chain variable region having a sequence selected from the group consisting of SEQ ID NO: 7, and SEQ ID NO: 17. Each possibility represent a separate embodiment of the invention.

According to some embodiments, the pharmaceutical composition comprises an antibody or fragment thereof comprising a light chain variable region having a sequence selected from the group consisting of SEQ ID NO: 8, and SEQ ID NO: 18. Each possibility represents a separate embodiment of the invention.

According to a specific embodiment, the pharmaceutical composition comprises an antibody or fragment thereof comprising a heavy chain variable region having the sequence set forth in SEQ ID NO: 7 and a light chain variable region having the sequence set forth in SEQ ID NO: 8.

According to a specific embodiment, the pharmaceutical composition comprises an antibody or fragment thereof comprising a heavy chain variable region having the sequence set forth in SEQ ID NO: 17 and a light chain variable region having the sequence set forth in SEQ ID NO: 18.

Single chain variable region (scFv) molecules of the antibodies of the present invention are also provided. The scFv molecules comprise the antigen binding site of the antibody expressed in one polypeptide chain. According to some embodiments, the invention provides scFv molecules comprising a heavy chain and a light chain variable regions of the anti-Nectin-2 antibodies. According to certain embodiments, the scFv comprises a hinge region between the two variable regions.

According to some embodiments, the scFv sequence is set forth in SEQ ID NO: 22, SEQ ID NO: 24, or an analog thereof having at least 85% sequence similarity to said sequences. According to some embodiment the scFv analog has at least 90% sequence identity to a sequence selected from SEQ ID NO: 22 and SEQ ID NO: 24.

A chimeric antigen receptor (CAR) comprising an extracellular portion (binding domain), capable of binding to Nectin-2 is provided according to another aspect of the present invention.

According to some embodiments, the CAR comprises an extracellular portion containing any of the provided antibodies or fragment thereof as described herein.

According to some embodiments, the CAR comprises a Nectin-2 binding site comprising six CDR sequences selected from the group consisting of:
  i. three complementarity determining regions (CDRs) of a heavy-chain (HC) variable region comprising SEQ ID NO: 7 and three CDRs of a light-chain (LC) variable comprising SEQ ID NO: 8, or an analog or derivative thereof having at least 90% sequence identity with said antibody or fragment sequence; and
  ii. three CDRs of a heavy-chain variable region comprising SEQ ID NO: 17 and three CDRs of a light-chain variable region comprising SEQ ID NO: 18, or an analog or derivative thereof having at least 90% sequence identity with said antibody or fragment sequence.

According to some embodiments, the CAR comprises a Nectin-2 binding site comprising a CDR set selected from the group consisting of:

i. a set of six CDRs wherein:
  HC CDR1 is RFTMS; (SEQ ID NO: 1)
  HC CDR2 is TISSGGSYTYYPDSVKG; (SEQ ID NO: 2)
  HC CDR3 is DRDFYGPYYAMDY; (SEQ ID NO: 3)
  LC CDR1 is KSSQSLLNSGNQKNYLA; (SEQ ID NO: 4)
  LC CDR2 is FASTRES; (SEQ ID NO: 5)
  and
  LC CDR3 is QQHYTTPLT; (SEQ ID NO: 6)
  and ii. a set of six CDRs wherein:
  HC CDR1 sequence is SYWIH; (SEQ ID NO: 11)
  HC CDR2 is AVYPGNSDSNYNQKFKA; (SEQ ID NO: 12)
  HC CDR3 is LVGTFDY; (SEQ ID NO: 13)
  LC CDR1 is KASQNVGINVV; (SEQ ID NO: 14)
  LC CDR2 is SASYRYS; (SEQ ID NO: 15)
  and
  LC CDR3 is QQYNTNPFT. (SEQ ID NO: 16)

According to some embodiments, the CAR comprises an antigen binding domain comprising SEQ ID NOs: 22 or 24, a transmembrane domain, and an intracellular T cell signaling domain.

According to some embodiments, a lymphocyte engineered to express the CAR described herein is provided.

According to some embodiments, a T cell engineered to express the CAR described herein is provided and denoted CAR-T. According to certain embodiments, an NK cell engineered to express the CAR described herein is provided and denoted CAR-NK.

According to some embodiments, a population of lymphocytes engineered to express the CAR described herein is provided. According to specific embodiments, a population of T-cells or NK-cells engineered to express the CAR described herein is provided.

According to some embodiments, the CAR comprises a single chain variable region (scFv) comprising the heavy chain and light chain variable regions of the antibodies described herein.

A single chain variable region (scFv) comprising the heavy chain and light chain variable regions of the antibodies described herein is also provided according to the present invention. According to certain embodiments, there is a hinge region between the variable regions.

According to some embodiments, the scFv sequence is set forth in SEQ ID NO: 22, SEQ ID NO: 24, or an analog thereof having at least 85% sequence similarity to any of said sequences.

The present invention further provides, in some embodiments, polynucleotides encoding CAR comprising a sequence set forth in SEQ ID NO: 21 or SEQ ID NO: 23.

According to some embodiments, the CAR comprises at least one protein domain selected from the group consisting of a scFv sequence, a CD8 Stalk domain, a CD28 TM domain, a 41BB domain, and a CD3ζ (CD3Z, Zetta) domain. According to some embodiments, the CAR comprises a scFv domain. According to some embodiments, the CAR comprises a CD8 Stalk domain. According to some embodiments, the CAR comprises a CD28 TM domain. According to some embodiments, the CAR comprises a CD3Z domain. According to some embodiments, the CAR comprises a 41BB domain. According to specific embodiments, the CAR comprises a CD8 Stalk domain, a CD28 TM domain, a 41BB domain, and a CD3Z domain.

According to some embodiments, the CAR comprises a scFv sequence comprising the Nectin-2 binding site of the antibodies disclosed herein and at least one domain selected from the group consisting of: CD8 Stalk domain, a CD28 TM domain, a 41BB domain, and a CD3Z domain. According to specific embodiments, the CAR comprises a scFv sequence comprising the Nectin-2 binding site of the antibodies disclosed herein and a CD8 Stalk domain, a CD28 TM domain, a 41BB domain, and a CD3Z domain.

According to specific embodiments, an engineered T cell is provided, expressing a scFv sequence selected from the group consisting of: SEQ ID NO: 22, SEQ ID NO: 24, or an analog thereof having at least 85% sequence similarity to any of said sequences; a CD8 Stalk domain, a CD28 TM domain, a 41BB domain, and a CD3Z domain.

According to some embodiments, a population of T cells is provided comprising T cells expressing a scFv sequence selected from the group consisting of: SEQ ID NO: 22, SEQ ID NO: 24, or an analog thereof having at least 85% sequence similarity to any of said sequences; a CD8 Stalk domain, a CD28 TM domain, a 41BB domain, and a CD3Z domain.

According to an aspect, the present invention provides a method of treating cancer in a subject comprising administering a therapeutically effective amount of at least one lymphocyte comprising the CAR as described herein to said subject.

Also provided are pharmaceutical compositions, comprising at least one antibody, antibody fragment or antibody conjugate according to the invention, for use in restoring NK cytotoxicity by inhibiting binding of Nectin-2 to TIGIT and/or CD112R expressed on NK cells.

According to other embodiments, the antibody, antibody fragment or antibody conjugate is capable of inhibiting human Nectin-2 binding to TIGIT and/or CD112R expressed on T-cells.

According to some embodiments, the pharmaceutical composition according to the present invention is for use in cancer immunotherapy or in enhancing immune response.

According to some embodiments, the pharmaceutical composition further comprises human lymphocytes expressing TIGIT and/or CD112R.

According to some embodiments, the human lymphocytes are killer cells selected from the group consisting of: T cells, NK cells and natural killer T (NKT) cells.

According to some embodiments, the killer cells are autologous or allogenic.

According to some embodiments, the pharmaceutical composition comprises autologous or allogenic NK cells expressing TIGIT and/or CD112R.

The cancer treatable with a composition according to the present invention may be any cancer that expresses Nectin-2. According to some embodiments, the cancer overexpresses Nectin-2. According to some embodiments of the invention, the cancer is a metastatic cancer. According to some embodiments, the pharmaceutical composition according to the present invention is for use in inhibiting formation or distribution of metastases, or reducing the total number of metastases in a subject.

According to some embodiments of the invention, the cancer is selected from the group consisting of a melanoma, a breast cancer, an ovarian cancer, a pancreatic cancer, a colorectal cancer, a colon cancer, a cervical cancer, a kidney cancer, a lung cancer, a thyroid cancer, a prostate cancer, a brain cancer, a renal cancer, a throat cancer, a laryngeal carcinoma, a bladder cancer, a hepatic cancer, a fibrosarcoma, an endometrial cells cancer, a glioblastoma, sarcoma, a myeloid, a leukemia and a lymphoma. Each possibility represents a separate embodiment of the invention.

According to some embodiments, the cancer is a solid cancer. According to some specific embodiments, the solid cancer is selected from the group consisting of breast cancer, lung cancer, bladder cancer, pancreatic cancer and ovarian cancer.

According to some embodiments, solid tumors are treated by CAR-T or CAR-NK. According to specific embodiments, solid tumors are treated by CAR-T. According to additional embodiments, hematological cancers are treated with CAR-NK or CAR-T cells. According to specific embodiments, hematological cancers are treated with CAR-NK cells.

According to some embodiments, the cancer is low-grade glioma. According to some embodiments, the cancer is kidney renal clear cell carcinoma (KIRC). According to some embodiments, the cancer is lung adenocarcinoma.

According to certain embodiments, the cancer is selected from the group consisting of: melanoma, breast cancer, colorectal cancer, kidney cancer, lung cancer, prostate cancer, and brain cancer. Each possibility represents a separate embodiment of the invention.

According to other embodiments, the cancer is hematologic cancer. According to some embodiments, the pharmaceutical composition if for use of treating cancer, together with human lymphocytes.

According to some embodiments, the human lymphocytes are killer cells selected from the group consisting of: T cells, NK cells and NKT cells. Each possibility represents a separate embodiment of the invention.

According to some embodiments, the killer cells are autologous or allogenic.

According to some embodiments, the pharmaceutical composition according to the present invention is for use in preventing or treating a viral infection.

According to yet another aspect, the present invention provides a method of inhibiting binding of human Nectin-2 to TIGIT or CD112R by using a monoclonal antibody or antibody fragment defined herein.

According to an additional aspect, the present invention provides a method for enhancing immune response in a subject in need thereof comprising administering to said subject a therapeutically effective amount of an antibody, antibody fragment or antibody conjugate described herein.

According to yet another aspect, the present invention provides a method of treating cancer comprising administering to a subject in need thereof, a therapeutically effective amount of a pharmaceutical composition comprising at least one antibody, antibody fragment or conjugate thereof, that recognizes human Nectin-2 with high affinity and specificity and capable of inhibiting its binding to its ligand.

According to some embodiments of the invention, the therapeutically effective amount results in a decrease in tumor size or in the number of metastases in the subject.

According to some embodiments, the method of treating cancer comprises administering or performing at least one additional anti-cancer therapy. According to certain embodiments, the additional anticancer therapy is surgery, chemotherapy, radiotherapy, or immunotherapy.

According to some embodiments, the method of treating cancer comprises administration of an antibody that recognizes human Nectin-2 with high affinity and specificity and an additional anti-cancer agent. According to some embodiments, the additional anti-cancer agent is selected from the group consisting of: immune-modulator, activated lymphocyte cell, kinase inhibitor and chemotherapeutic agent.

According to other embodiments, the additional immune-modulator is an antibody, antibody fragment or antibody conjugate that binds to an antigen other than human Nectin-2.

According to some embodiments, the additional immune-modulator is an antibody against an immune checkpoint molecule. According to some embodiments, the additional immune modulator is an antibody against an immune checkpoint molecule selected from the group consisting of human programmed cell death protein 1 (PD-1), PD-L1 and PD-L2, carcinoembryonic antigen-related cell adhesion molecule 1 (CEACAM1), lymphocyte activation gene 3 (LAG3), CD137, OX40 (also referred to as CD134), killer cell immunoglobulin-like receptors (KIR), TIGIT, PVR, CTLA-4, NKG2A, GITR, and any other checkpoint molecule or a combination thereof. Each possibility represents a separate embodiment of the invention. According to certain embodiments, the additional immune modulator is an antibody against PD-1. According to some embodiments, the additional immune modulator is an antibody against CTLA-4.

According to some embodiments, the anti-cancer agent is selected from the group consisting of: erbitux, cytarabine, fludarabine, fluorouracil, mercaptopurine, methotrexate, thioguanine, gemcitabine, vincristine, vinblastine, vinorelbine, carmustine, lomustine, chlorambucil, cyclophosphamide, cisplatin, carboplatin, ifosfamide, mechlorethamine, melphalan, thiotepa, dacarbazine, bleomycin, dactinomycin, daunorubicin, doxorubicin, idarubicin, mitomycin, mitoxantrone, plicamycin, etoposide, teniposide and any combination thereof. Each possibility represents a separate embodiment of the invention.

According to some embodiments, the anti-cancer agent is epidermal growth factor receptor (EGFR) inhibitor. According to some embodiments, the EGFR inhibitor is selected from the group consisting of: Cetuximab (Erbitux®), Panitumumab (Vectibix®), and necitumumab (Portrazza®). According to some embodiments, the EGFR inhibitor is Cetuximab (Erbitux®).

According to some embodiments of the invention, the subject is a human subject.

According to some embodiments of the invention, the use further comprises the use of an agent that downregulates the activity or expression of an immune co-inhibitory receptor.

According to some embodiments of the invention, the immune cell is a T cell.

According to some embodiments of the invention, the immune co-inhibitory receptor is selected from the group consisting of PD-1, TIGIT, PVR, CTLA-4, LAG3, TIM3, BTLA, VISTA, B7H4, CD96, BY55 (CD 160), LAIR1, SIGLEC10, and 2B4. Each possibility represents a separate embodiment of the invention.

According to an aspect, the present invention provides a method for modulating immune system function and/or activity comprising modulating the binding of Nectin-2 to TIGIT and/or CD112R using an antibody according to the invention.

According to some embodiments, the method of treating cancer involves preventing or reducing formation, growth or spread of metastases in a subject.

According to some embodiments, the method of treating cancer comprises administering to a subject in need thereof a pharmaceutical composition comprising an antibody or antibody fragment thereof, capable of inhibiting the binding of human Nectin-2 to human TIGIT or CD112R, and further administrating to said subject human lymphocytes.

According to some embodiments, the human lymphocytes are killer cells selected from the group consisting of: T cells, NK cells and NKT cells.

According to some embodiments, the killer cells are autologous or allogenic.

The present invention also provides a method of preventing or treating a viral infection comprising administering to a subject at least one antibody specific to human Nectin-2, or a fragment thereof comprising at least the antigen binding domain, wherein said mAb or fragment thereof is capable of inhibiting binding of Nectin-2 to TIGIT or CD112R.

According to an aspect, the present invention provides a method of diagnosing or prognosing cancer in a subject, the method comprises determining the expression level of Nectin-2 in a biological sample of said subject using at least one antibody as described herein.

The present invention further comprises, according to another aspect, a method of determining or quantifying Nectin-2 in a sample, the method comprising contacting a biological sample with an antibody or antibody fragment, and measuring the level of complex formation, wherein the antibody or antibody fragment comprises:
  i. a set of six CDRs wherein: HC CDR1 is (SEQ ID NO: 1); HC CDR2 is (SEQ ID NO: 2); HC CDR3 is (SEQ ID NO: 3); LC CDR1 is (SEQ ID NO: 4); LC CDR2 is (SEQ ID NO: 5); and LC CDR3 is (SEQ ID NO: 6); or
  ii. a set of six CDRs wherein: HC CDR1 sequence is (SEQ ID NO: 11); HC CDR2 is (SEQ ID NO: 12); HC CDR3 is (SEQ ID NO: 13); LC CDR1 is (SEQ ID NO: 14); LC CDR2 is (SEQ ID NO: 15); and LC CDR3 is (SEQ ID NO: 16).

Determining and quantifying methods may be performed in-vitro or ex-vivo according to some embodiments or may be used in diagnosing conditions associated with expression of Nectin-2. The antibodies according to the present invention may be also used to configure screening methods. For example, an enzyme-linked immunosorbent assay (ELISA), or a radioimmunoassay (RIA), as well as method such as IHC or FACS, can be constructed for measuring levels of secreted or cell-associated polypeptide using the antibodies and methods known in the art.

According to some embodiments, the method for detecting or quantifying the presence of Nectin-2 expressed on cells or secreted to a biological medium, comprises the steps of:
  i. incubating a sample with an antibody specific to human Nectin-2 or an antibody fragment thereof comprising at least an antigen-binding portion;
  ii. detecting the bound Nectin-2 using a detectable probe.

According to some embodiments, the method further comprises the steps of:
  iii. comparing the amount of (ii) to a standard curve obtained from a reference sample containing a known amount of Nectin-2; and iv. calculating the amount of the Nectin-2 in the sample from the standard curve.

According to some particular embodiments the sample is body fluid.

According to some embodiments, the method is performed in-vitro or ex-vivo.

A kit for measuring the expression or presence of Nectin-2 in biological sample is also provided comprising at least one antibody or antibody fragment according to the present invention. According to some embodiments, the kit comprises an antibody or antibody fragment comprising:
  i. a set of six CDRs wherein: HC CDR1 is (SEQ ID NO: 1); HC CDR2 is (SEQ ID NO: 2); HC CDR3 is (SEQ ID NO: 3); LC CDR1 is (SEQ ID NO: 4); LC CDR2 is (SEQ ID NO: 5); and LC CDR3 is (SEQ ID NO: 6); or
  ii. a set of six CDRs wherein: HC CDR1 sequence is (SEQ ID NO: 11); HC CDR2 is (SEQ ID NO: 12); HC CDR3 is (SEQ ID NO: 13); LC CDR1 is (SEQ ID NO: 14); LC CDR2 is (SEQ ID NO: 15); and LC CDR3 is (SEQ ID NO: 16).

According to an aspect, the present invention provides a kit for detecting cancer, the diagnostic kit comprises an antibody or antibody fragment thereof as disclosed herein.

According to some embodiments, the invention provides a method of diagnosing, early detecting, assessing the severity or staging an immune-related disease or a proliferative disease comprising determining the expression, concentration or activity of Nectin-2 in a sample from a subject using an antibody according to the present invention or a fragment or conjugate thereof, and comparing the expression or activity of Nectin-2 to a reference amount of Nectin-2 expression, concentration or activity. Said reference amount may be obtained from a sample taken from a normal subject, from the same subject while being in a different stage of the disease or is determined from clinical data of a large population of subjects.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3A illustrates binding of anti-Nectin-2 clones to MDA-231 cells, which endogenously express Nectin-2 or to 8866-hNectin-2 cells, which overexpress Nectin-2. FIG. 3B shows the results of a FACS analysis of CD112R-Fc binding to 8866-hNectin2 cells. Of the antibodies generated three clones (#9, 11 and 13) partially blocked these interactions, while one clone (#7) completely blocked them. FIG. 3C shows the results of a FACS analysis of DNAM-1-Fc binding to 8866-hNectin2 cells. Other than clone 15, none of the other clones (#7-13) blocked the binding of the activating receptor DNAM-1 to Nectin-2. FIG. 3D shows the results of a FACS analysis of TIGIT-Fc binding to CHOK1-hNectin2 cells in presence of anti-Nectin-2 clones 7 and 11. Both clones are blocking >66% of the TIGIT-Fc binding.

FIGS. 5A-5B demonstrate that the binding of the mAbs, clones 7 and 11, to human and monkey Nectin-2 is similar. FIG. 5A depicts the overlaid binding curves of both mAbs which were added in the range of 13.3 nM-0.02 nM in a series of three-fold dilutions to CHO cells expressing either human or cynomolgus (Cyno) monkey (Macaca fascicularis) Nectin-2 (protein id: XP_005589607.1). Results of the FACS analysis of this assay are expressed as relative binding intensity in comparison to the maximal binding which was set at 100%. For detection, Goat anti-mouse-647 Ab was used at 1:250 dilution. Summary of data analysis of this assay is presented as well, which further demonstrates that both mAbs bind to human and cynomolgus (Cyno) monkey (Macaca fascicularis) Nectin-2 (protein id: XP_005589607.1) with high and similar affinity. Binding of anti-Nectin-2 mAbs was also examined using Chlorocebus (African green monkey) Nectin-2 (XP_007995342.1 expressed by Vero cells). FIG. 5B shows the binding of anti-Nectin-2 mAbs to endogenous human Nectin-2 (expressed by 293T cells) and to endogenous African green monkey Nectin-2 (expressed by Vero cells) tested by FACS analysis as described for FIG. 5A (Ab range: 20-0.0003 nM). This analysis reveals similar Ab binding to both human and monkey Nectin-2 targets, with high affinity, for both anti-nectin-2 clones, which is also evident at the summary table.

FIGS. 12B-E depict representative experiments out of three performed for each cell line (CAR-T 2.07 grey bars, CAR-T 2.11 black bars).

DETAILED DESCRIPTION OF THE INVENTION

Figure 1A:
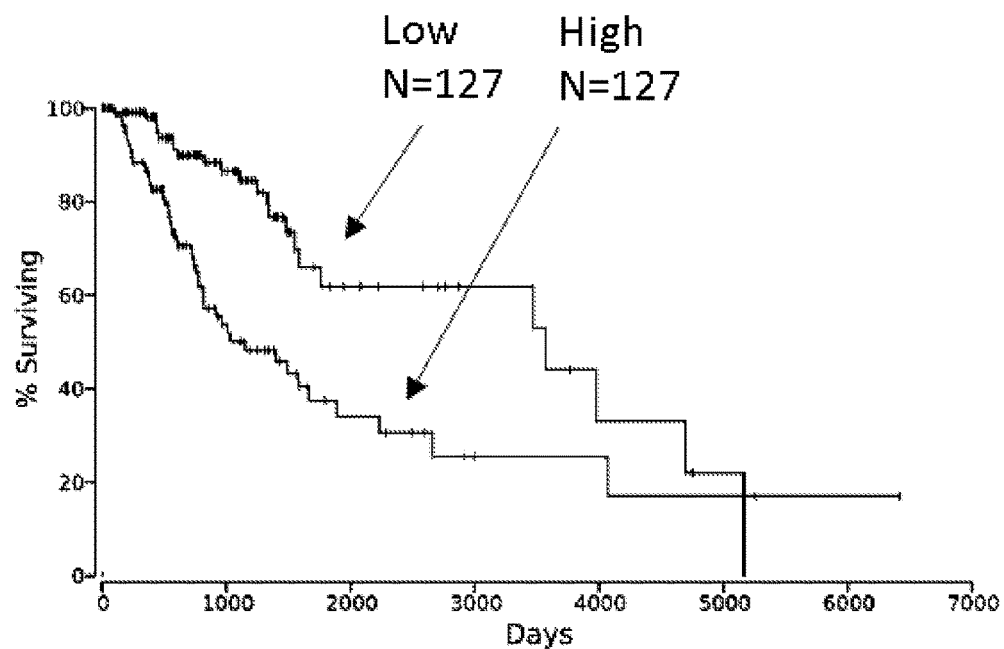
FIGS. 1A-1C depict the correlation of Nectin-2 expression levels (high or low as indicated) with survival probability of Low-grade glioma, (A), Kidney Renal Clear Cell Carcinoma (B) and lung adenocarcinoma (C) patients. Data sets were obtained from the TCGA site and analyzed using oncolnc.org site. (doi.org/10.7717/peerj-cs.67).

The present invention provides effective antibodies specific to the human Nectin-2. The invention also provides production and use of the antibodies as therapeutic agents. In particular, the mAbs of the present invention may be used for augmenting anti-tumor killing activity, and as diagnostic reagents. In some embodiments, the invention provides antibodies specific to Nectin-2 for efficient restoration of immune activity against cancer cells overexpressing Nectin-2. In other embodiments, the antibodies described herein are for use in treating viral infection. The antibodies, by blocking Nectin-2, prevent herpes virus entry to the cells.

The term "antigen" as used herein refers to a molecule or a portion of a molecule capable of eliciting antibody formation and being specifically bound by an antibody. An antigen may have one or more than one epitope. The specific binding referred to above is meant to indicate that the antigen will react, in a highly selective manner, with its corresponding antibody and not with the multitude of other antibodies which may be evoked by other antigens. An antigen according to some embodiments of the present invention is a Nectin-2 protein.

The term "Nectin-2" or "Nectin Cell Adhesion Molecule 2", as used herein refers to a human plasma membrane glycoprotein, also known as CD112, and PVRL2. The Nectin-2 protein is a single-pass type I membrane glycoprotein with two Ig-like C2-type domains and an Ig-like V-type domain. This protein is one of the plasma membrane components of adherent junctions. It also serves as an entry for certain mutant strains of herpes simplex virus and pseudorabies virus, and it is involved in cell to cell spreading of these viruses. An exemplary Nectin-2 according to the invention is set forth in SwissPort, UniPort and GenBank symbols or accession numbers: Gene ID: 5819, Q92692, 168093, NP_001036189.1, NP_002847.1, and #Q92692.

The antibodies or a fragment thereof according to the invention bind to an epitope in Nectin-2. Specifically, the antibodies bind to an epitope within the ectodomain (extracellular part) of the Nectin-2 protein.

The term "antigenic determinant" or "epitope" as used herein refers to the region of an antigen molecule that specifically reacts with a particular antibody. Peptide sequences derived from an epitope can be used, alone or in conjunction with a carrier moiety, applying methods known in the art, to immunize animals and to produce additional polyclonal or monoclonal antibodies. Isolated peptides derived from an epitope may be used in diagnostic methods to detect antibodies.

It should be noted that the affinity can be quantified using known methods such as, Surface Plasmon Resonance (SPR) (described in Scarano S, Mascini M, Turner A P, Minunni M. Surface plasmon resonance imaging for affinity-based biosensors. Biosens Bioelectron. 2010, 25:957-66), and can be calculated using, e.g., a dissociation constant, Kd, such that a lower Kd reflects higher affinity.

Antibodies, or immunoglobulins, comprise two heavy chains linked together by disulfide bonds and two light chains, each light chain being linked to a respective heavy chain by disulfide bonds in a "Y" shaped configuration. Proteolytic digestion of an antibody yields Fv (Fragment variable) and Fc (Fragment crystallizable) domains. The antigen binding domains, Fab, include regions where the polypeptide sequence varies. The term F(ab')$_2$ represents two Fab' arms linked together by disulfide bonds. Each heavy chain has at one end a variable domain ($V_H$) followed by a number of constant domains ($C_H$). Each light chain has a variable domain ($V_L$) at one end and a constant domain ($C_L$) at its other end, the light chain variable domain being aligned with the variable domain of the heavy chain and the light chain constant domain being aligned with the first constant domain of the heavy chain (CH1). The variable domains of each pair of light and heavy chains form the antigen-binding site. The domains on the light and heavy chains have the same general structure and each domain comprises four framework regions, whose sequences are relatively conserved, joined by three hyper-variable domains known as complementarity determining regions (CDRs 1-3). These domains contribute specificity and affinity of the antigen-binding site.

CDR identification or determination from a given heavy or light chain variable sequence, is typically made using one of few methods known in the art. For example, such determination is made according to the Kabat (Wu T. T and Kabat E. A., *J Exp Med,* 1970; 132:211-50) and IMGT (Lefranc M-P, et al., *Dev Comp Immunol,* 2003, 27:55-77).

When the term "CDR having a sequence", or a similar term is used, it includes options wherein the CDR comprises the specified sequences and also options wherein the CDR consists of the specified sequence.

The antigen specificity of an antibody is based on the hyper variable region (HVR), namely the unique CDR sequences of both light and heavy chains that together form the antigen-binding site.

The isotype of the heavy chain (gamma, alpha, delta, epsilon or mu) determines immunoglobulin class (IgG, IgA, IgD, IgE or IgM, respectively). The light chain is either of two isotypes (kappa, k or lambda, 2). Both isotypes are found in all antibody classes.

The term "antibody" is used in the broadest sense and includes monoclonal antibodies (including full length or intact monoclonal antibodies), polyclonal antibodies, multivalent antibodies, and antibody fragments long enough to exhibit the desired biological activity, namely binding to human Nectin-2.

Antibody or antibodies according to the invention includes intact antibodies, such as polyclonal antibodies or monoclonal antibodies (mAbs), as well as proteolytic fragments thereof, such as the Fab or F(ab')$_2$ fragments. Single chain antibodies also fall within the scope of the present invention.

Antibody Fragments

"Antibody fragments" comprise only a portion of an intact antibody, generally including an antigen binding site of the intact antibody and thus retaining the ability to bind antigen. Examples of antibody fragments encompassed by the present definition include: (i) the Fab fragment, having VL, CL, VH and CH1 domains; (ii) the Fab' fragment, which is a Fab fragment having one or more cysteine residues at the C-terminus of the CH1 domain; (iii) the Fd fragment having VH and CH1 domains; (iv) the Fd' fragment having VH and CH1 domains and one or more cysteine residues at the C-terminus of the CH1 domain; (v) the Fv fragment having the VL and VH domains of a single arm of an antibody; (vi) the dAb fragment (Ward et al., Nature 1989, 341, 544-546) which consists of a VH domain; (vii) isolated CDR regions; (viii) F(ab')$_2$ fragments, a bivalent fragment including two Fab' fragments linked by a disulphide bridge at the hinge region; (ix) single chain antibody molecules (e.g. single chain Fv; scFv) (Bird et al., Science 1988, 242, 423-426; and Huston et al., Proc. Natl. Acad. Sci. (USA) 1988, 85,5879-5883); (x) "diabodies" with two antigen binding sites, comprising a heavy chain variable domain (VH) connected to a light chain variable domain (VL) in the same polypeptide chain (see, e.g., EP 404,097; WO 93/11161; and Hollinger et al., Proc. Natl. Acad. Sci. USA, 1993, 90, 6444-6448); (xi) "linear antibodies" comprising a pair of tandem Fd segments (VH-CH1-VH-CH1) which, together with complementary light chain polypeptides, form a pair of antigen binding regions (Zapata et al. Protein Eng., 1995, 8, 1057-1062; and U.S. Pat. No. 5,641,870).

Various techniques have been developed for the production of antibody fragments. Traditionally, these fragments were derived via proteolytic digestion of intact antibodies (see, e.g., Morimoto et al., Journal of Biochemical and Biophysical Methods 24:107-117 (1992) and Brennan et al., Science, 229:81 (1985)). However, these fragments can now be produced directly by recombinant host cells. For example, the antibody fragments can be isolated from antibody phage libraries. Alternatively, Fab'-SH fragments can be directly recovered from E. coli and chemically coupled to form F(ab')$_2$ fragments (Carter et al., Bio/Technology 10:163-167 (1992)). According to another approach, F(ab')$_2$ fragments can be isolated directly from recombinant host cell culture. Other techniques for the production of antibody fragments will be apparent to the skilled practitioner. In other embodiments, the antibody of choice is a single chain Fv fragment (scFv).

Single chain antibodies can be single chain composite polypeptides having antigen binding capabilities and comprising amino acid sequences homologous or analogous to the variable regions of an immunoglobulin light and heavy chain i.e. linked VH-VL or single chain Fv (scFv). Techniques for the production of single-chain antibodies (U.S. Pat. No. 4,946,778) can be adapted to produce single-chain antibodies to Nectin-2.

The term "monoclonal antibody" (mAb) as used herein refers to an antibody obtained from a population of substantially homogeneous antibodies, i.e., the individual antibodies comprising the population are identical except for possible naturally occurring mutations that may be present in minor amounts. Monoclonal antibodies are highly specific, being directed against a single antigen. Furthermore, in contrast to polyclonal antibody preparations that typically include different antibodies directed against different determinants (epitopes), each monoclonal antibody is directed against a single determinant on the antigen. The modifier "monoclonal" is not to be construed as requiring production of the antibody by any particular method. mAbs may be obtained by methods known to those skilled in the art. For example, the monoclonal antibodies to be used in accordance with the present invention may be made by the hybridoma method first described by Kohler et al., Nature 1975, 256, 495, or may be made by recombinant DNA methods (see, e.g., U.S. Pat. No. 4,816,567). Monoclonal antibodies may also be isolated from phage antibody libraries using the techniques described, for example, in Clackson et al., Nature 1991, 352, 624-628 or Marks et al., *J. Mol. Biol.,* 1991, 222:581-597.

The design and development of recombinant monovalent antigen-binding molecules derived from monoclonal antibodies through rapid identification and cloning of the functional variable heavy (VH) and variable light (VL) genes and the design and cloning of a synthetic DNA sequence optimized for expression in recombinant bacteria are described in Fields et al. 2013, 8 (6): 1125-48.

The mAbs of the present invention may be of any immunoglobulin class including IgG, IgM, IgE, IgA, and IgD. A hybridoma producing a mAb may be cultivated in-vitro or in-vivo. High titers of mAbs can be obtained by in-vivo production where cells from the individual hybridomas are injected intra-peritoneally into pristine-primed Balb/c mice to produce ascites fluid containing high concentrations of the desired mAbs. mAbs may be purified from such ascites fluids, or from culture supernatants, using methods well known to those of skill in the art.

Anti-idiotype antibodies specifically immunoreactive with the hypervariable regions of an antibody of the invention are also comprehended.

The invention provides a monoclonal antibody or an antibody fragment comprising an antigen binding domain (ABD) which comprises three CDRs of a light chain and three CDRs of a heavy chain, wherein said ABD has at least 90% sequence identity or similarity with an ABD of a monoclonal mouse antibody comprising: (i) a heavy variable chain comprising the amino acid sequence SEQ ID NO: 7 and a light variable chain comprising the amino acid sequence SEQ ID NO: 8 (herein identified as clone 7); or (ii) a heavy variable chain comprising the amino acid sequence SEQ ID NO: 17 and a light variable chain comprising the amino acid sequence SEQ ID NO: 18 (herein identified as clone 11). Such antibody may have an ABD domain having at least 93%, at least 94%, at least 95%, at least 96, at least 97, at least 98, at least 99% sequence identity or similarity or 100% sequence identity with corresponding ABD of antibodies clone 7 or clone 11.

Sequence identity is the amount of amino acids or nucleotides which match exactly between two different sequences. Sequence similarity permits conservative substitution of amino acids to be determined as identical amino acids. The polynucleotide sequences described herein may be codon-optimized for expression in specific cells, such as human cells. Codon optimization does not change the encoded amino acid sequences of the antibody's chain but may, for example, increase the expression in cells.

The invention also provides conservative amino acid variants of the antibody molecules according to the invention. Variants according to the invention also may be made that conserve the overall molecular structure of the encoded proteins. Given the properties of the individual amino acids comprising the disclosed protein products, some rational substitutions will be recognized by the skilled worker. Amino acid substitutions, i.e., "conservative substitutions," may be made, for instance, on the basis of similarity in polarity, charge, solubility, hydrophobicity, hydrophilicity, and/or the amphipathic nature of the residues involved. The term "antibody analog" as used herein refers to an antibody derived from another antibody by one or more conservative amino acid substitutions.

The term "antibody variant" as used herein refers to any molecule comprising the antibody of the present invention. For example, fusion proteins in which the antibody or an antigen-binding-fragment thereof is linked to another chemical entity is considered an antibody variant.

Analogs and variants of the antibody sequences are also within the scope of the present application. These include, but are not limited to, conservative and non-conservative substitution, insertion and deletion of amino acids within the sequence. Such modification and the resultant antibody analog or variant are within the scope of the present invention as long as they confer, or even improve the binding of the antibody to the human Nectin-2.

Conservative substitutions of amino acids as known to those skilled in the art are within the scope of the present invention. Conservative amino acid substitutions include replacement of one amino acid with another having the same type of functional group or side chain, e.g., aliphatic, aromatic, positively charged, negatively charged. These substitutions may enhance oral bioavailability, penetration, and targeting to specific cell populations, immunogenicity, and the like. One of skill will recognize that individual substitutions, deletions or additions to a peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. For example, according to one table known in the art, the following six groups each contain amino acids that are conservative substitutions for one another:

1) Alanine (A), Serine(S), Threonine (T);
2) Aspartic acid (D), Glutamic acid (E);
3) Asparagine (N), Glutamine (Q);
4) Arginine (R), Lysine (K);
5) Isoleucine (I), Leucine (L), Methionine (M), Valine (V); and
6) Phenylalanine (F), Tyrosine (Y), Tryptophan (W).

It should be emphasized that the variant chain sequences are determined by sequencing methods using specific primers. Different sequencing methods employed on the same sequence may result in slightly different sequences due to technical issues and different primers, particularly in the sequence terminals.

The terms "molecule having the antigen-binding portion of an antibody" and "antigen-binding-fragments" as used herein are intended to include not only intact immunoglobulin molecules of any isotype and generated by any animal cell line or microorganism, but also the antigen-binding reactive fraction thereof, including, but not limited to, the Fab fragment, the Fab' fragment, the F(ab') 2 fragment, the variable portion of the heavy and/or light chains thereof, Fab mini-antibodies (see e.g., WO 93/15210, U.S. patent application Ser. No. 08/256,790, WO 96/13583, U.S. patent application Ser. No. 08/817,788, WO 96/37621, U.S. patent application Ser. No. 08/999,554), and single-chain antibodies incorporating such reactive fraction, as well as any other type of molecule in which such antibody reactive fraction has been physically inserted. Such molecules may be provided by any known technique, including, but not limited to, enzymatic cleavage, peptide synthesis or recombinant techniques.

The antibodies herein specifically include "chimeric" antibodies in which a portion of the heavy and/or light chain is identical with or homologous to corresponding sequences in antibodies derived from a particular species, or belonging to a particular antibody class or subclass, while the remainder of the chain(s) is identical with or homologous to corresponding sequences in antibodies derived from another species or belonging to another antibody class or subclass, as well as fragments of such antibodies, so long as they exhibit the desired biological activity (U.S. Pat. No. 4,816,567; and Morrison et al., Proc. Natl. Acad. Sci. USA 81:6851-6855 (1984)). In addition, complementarity determining region (CDR) grafting may be performed to alter certain properties of the antibody molecule including affinity or specificity. A non-limiting example of CDR grafting is disclosed in U.S. Pat. No. 5,225,539.

Chimeric antibodies are molecules of which different portions are derived from different animal species, such as those having a variable region derived from a murine mAb and a human immunoglobulin constant region. Antibodies that have variable region framework residues substantially from human antibody (termed an acceptor antibody) and CDRs substantially from a mouse antibody (termed a donor antibody) are also referred to as humanized antibodies. Chimeric antibodies are primarily used to reduce immunogenicity in application and to increase yields in production, for example, where murine mAbs have higher yields from hybridomas but higher immunogenicity in humans, such that human/murine chimeric mAbs are used. Chimeric antibodies and methods for their production are known in the art (for example PCT patent applications WO 86/01533, WO 97/02671, WO 90/07861, WO 92/22653 and U.S. Pat. Nos. 5,693,762, 5,693,761, 5,585,089, 5,530,101 and 5,225,539).

According to some embodiments, the antibody is a monoclonal antibody.

According to some specific embodiments, the monoclonal antibody is a chimeric monoclonal antibody.

According to some embodiments, the chimeric antibody comprises human-derived constant regions.

According to some embodiments the human constant regions of the chimeric antibody are selected from the group consisting of: human IgG1, human IgG2, human IgG3, and human IgG4.

According to some embodiments the human constant regions of the chimeric antibody are selected from the group consisting of: human IgG1 and human IgG2.

According to a particular embodiment, a chimeric monoclonal antibody which recognizes human Nectin-2 is provided comprising:
 i. a set of six CDRs wherein: HC CDR1 is (SEQ ID NO: 1); HC CDR2 is (SEQ ID NO: 2); HC CDR3 is (SEQ ID NO: 3); LC CDR1 is (SEQ ID NO: 4); LC CDR2 is (SEQ ID NO: 5); and LC CDR3 is (SEQ ID NO: 6); or
 ii. a set of six CDRs wherein: HC CDR1 sequence is (SEQ ID NO: 11); HC CDR2 is (SEQ ID NO: 12); HC CDR3 is (SEQ ID NO: 13); LC CDR1 is (SEQ ID NO: 14); LC CDR2 is (SEQ ID NO: 15); and LC CDR3 is (SEQ ID NO: 16).

Pharmacology

In pharmaceutical and medicament formulations, the active agent is preferably utilized together with one or more pharmaceutically acceptable carrier(s) and optionally any other therapeutic ingredients. The carrier(s) must be pharmaceutically acceptable in the sense of being compatible with the other ingredients of the formulation and not unduly deleterious to the recipient thereof. The active agent is provided in an amount effective to achieve the desired pharmacological effect, as described above, and in a quantity appropriate to achieve the desired exposure.

Typically, the antibodies and fragments and conjugates thereof of the present invention comprising the antigen binding portion of an antibody or comprising another polypeptide including a peptide-mimetic will be suspended in a sterile saline solution for therapeutic uses. The pharmaceutical compositions may alternatively be formulated to control release of active ingredient (molecule comprising the antigen binding portion of an antibody) or to prolong its presence in a patient's system. Numerous suitable drug delivery systems are known and include, e.g., implantable drug release systems, hydrogels, hydroxymethylcellulose, microcapsules, liposomes, microemulsions, microspheres, and the like. Controlled release preparations can be prepared through the use of polymers to complex or adsorb the molecule according to the present invention. For example, biocompatible polymers include matrices of poly(ethylene-co-vinyl acetate) and matrices of a polyanhydride copolymer of a stearic acid dimer and sebaric acid. The rate of release of the molecule according to the present invention, i.e., of an antibody or antibody fragment, from such a matrix depends upon the molecular weight of the molecule, the amount of the molecule within the matrix, and the size of dispersed particles.

The pharmaceutical composition of this invention may be administered by any suitable means, such as orally, topically, intranasally, subcutaneously, intramuscularly, intravenously, intra-arterially, intraarticularly, intralesionally, intratumorally or parenterally. Ordinarily, intravenous (i.v.) administration is used for delivering antibodies.

It will be apparent to those of ordinary skill in the art that the therapeutically effective amount of the molecule according to the present invention will depend, inter alia upon the administration schedule, the unit dose of molecule administered, whether the molecule is administered in combination with other therapeutic agents, the immune status and health of the patient, the therapeutic activity of the molecule administered, its persistence in the blood circulation, and the judgment of the treating physician.

As used herein the term "therapeutically effective amount" refers to an amount of a drug effective to treat a disease or disorder in a mammal. In the case of cancer, the therapeutically effective amount of the drug may reduce the number of cancer cells; reduce the tumor size; inhibit (i.e., slow to some extent and preferably stop) cancer cell infiltration into peripheral organs; inhibit (i.e., slow to some extent and preferably stop) tumor metastasis; inhibit, to some extent, tumor growth; and/or relieve to some extent one or more of the symptoms associated with the disorder. To the extent the drug may prevent growth and/or kill existing cancer cells, it may be cytostatic and/or cytotoxic. For cancer therapy, efficacy in vivo can, for example, be measured by assessing the duration of survival, time to disease progression (TTP), the response rates (RR), duration of response, and/or quality of life.

The cancer amendable for treatment by the present invention includes, but is not limited to: carcinoma, lymphoma, blastoma, sarcoma, and leukemia or lymphoid malignancies. More particular examples of such cancers include squamous cell cancer, lung cancer (including small-cell lung cancer, non-small cell lung cancer, adenocarcinoma of the lung, and squamous carcinoma of the lung), cancer of the peritoneum, hepatocellular cancer, gastric or stomach cancer (including gastrointestinal cancer), pancreatic cancer, glioblastoma, cervical cancer, ovarian cancer, liver cancer, bladder cancer, hepatoma, breast cancer, colon cancer, colorectal cancer, endometrial or uterine carcinoma, salivary gland carcinoma, kidney or renal cancer, liver cancer, prostate cancer, vulval cancer, thyroid cancer, hepatic carcinoma and various types of head and neck cancer, as well as B-cell lymphoma (including low grade/follicular non-Hodgkin's lymphoma (NHL); small lymphocytic (SL) NHL; intermediate grade/follicular NHL; intermediate grade diffuse NHL; high-grade immunoblastic NHL; high-grade lymphoblastic NHL; high-grade small non-cleaved cell NHL; bulky disease NHL; mantle cell lymphoma; AIDS-related lymphoma; and Waldenstrom's Macroglobulinemia); chronic lymphocytic leukemia (CLL); acute lymphoblastic leukemia (ALL); Hairy cell leukemia; chronic myeloblastic leukemia; and post-transplant lymphoproliferative disorder (PTLD), as well as abnormal vascular proliferation associated with phakomatoses, edema (such as that associated with brain tumors), and Meigs' syndrome. Preferably, the cancer is selected from the group consisting of breast cancer, colorectal cancer, rectal cancer, non-small cell lung cancer, non-Hodgkins lymphoma (NHL), renal cell cancer, prostate cancer, liver cancer, pancreatic cancer, soft-tissue sarcoma, Kaposi's sarcoma, carcinoid carcinoma, head and neck cancer, melanoma, ovarian cancer, mesothelioma, and multiple myeloma. The cancerous conditions amendable for treatment of the invention include metastatic cancers.

According to other embodiments, the pharmaceutical composition according to the invention is for use in treating cancer characterized by overexpression of Nectin-2. Nectin-2 overexpression related cancer types can be identified using known data bases such as The Cancer Genome Atlas (TCGA). According to certain embodiments, the cancer treatable with a composition according to the present invention is selected from the group consisting of adrenocortical carcinoma (ACC), chromophobe renal cell carcinoma (KICH), liver hepatocellular carcinoma (LIHC), colon and rectal adenocarcinoma (COAD, READ), pancreatic ductal adenocarcinoma (PAAD), pheochromocytoma & paraganglioma (PCPG), papillary kidney carcinoma (KIRP), lung adenocarcinoma (LUAD), head and neck squamous cell carcinoma (HNSC), prostate adenocarcinoma (PRAD), uterine corpus endometrial carcinoma (UCEC), cervical cancer (CESC), cutaneous melanoma (SKCM), mesothelioma (MESO), urothelial bladder cancer (BLCA), clear cell kidney carcinoma (KIRC), lung squamous cell carcinoma (LUSC), uterine carcinosarcoma (UCS), sarcoma (SARC), ovarian serous cystadenocarcinoma (OV), papillary thyroid carcinoma (THCA), glioblastoma multiforme (GBM), breast cancer (BRCA), lower grade glioma (LGG), and diffuse large B-cell lymphoma (DLBC). Each possibility represents a separate embodiment of the invention.

The molecules of the present invention as active ingredients are dissolved, dispersed or admixed in an excipient that is pharmaceutically acceptable and compatible with the active ingredient as is well known. Suitable excipients are, for example, water, saline, phosphate buffered saline (PBS), dextrose, glycerol, ethanol, or the like and combinations thereof. Other suitable carriers are well known to those skilled in the art. In addition, if desired, the composition can contain minor amounts of auxiliary substances such as wetting or emulsifying agents, pH buffering agents.

The pharmaceutical composition according to the present invention may be administered together with an anti-neoplastic composition.

The term "treatment" as used herein refers to both therapeutic treatment and prophylactic or preventative measures. Those in need of treatment include those already with the disorder as well as those in which the disorder is to be prevented.

The term "cancer" refers to or describes the physiological condition in mammals that is typically characterized by unregulated cell growth. Examples of cancer include but are not limited to, carcinoma, lymphoma, blastoma, sarcoma, and leukemia. More particular examples of such cancers include melanoma, lung, thyroid, breast, colon, prostate, hepatic, bladder, renal, cervical, pancreatic, leukemia, lymphoma, myeloid, ovarian, uterus, sarcoma, biliary, or endometrial cancer.

According to some embodiments, the method of treating cancer comprises administering the pharmaceutical composition as part of a treatment regimen comprising administration of at least one additional anti-cancer agent.

According to some embodiments, the anti-cancer agent is selected from the group consisting of an antimetabolite, a mitotic inhibitor, a taxane, a topoisomerase inhibitor, a topoisomerase II inhibitor, an asparaginase, an alkylating agent, an antitumor antibiotic, and combinations thereof. Each possibility represents a separate embodiment of the invention.

According to some embodiments, the antimetabolite is selected from the group consisting of cytarabine, fludarabine, fluorouracil, mercaptopurine, methotrexate, thioguanine, gemcitabine, and hydroxyurea. According to some embodiments, the mitotic inhibitor is selected from the group consisting of vincristine, vinblastine, and vinorelbine. According to some embodiments, the topoisomerase inhibitor is selected from the group consisting of topotecan and irinotecan. According to some embodiments, the alkylating agent is selected from the group consisting of busulfan, carmustine, lomustine, chlorambucil, cyclophosphamide, cisplatin, carboplatin, ifosfamide, mechlorethamine, melphalan, thiotepa, dacarbazine, and procarbazine. According to some embodiments, the antitumor antibiotic is selected from the group consisting of bleomycin, dactinomycin, daunorubicin, doxorubicin, idarubicin, mitomycin, mitoxantrone, and plicamycin. According to some embodiments, the topoisomerase II is selected from the group consisting of etoposide and teniposide. Each possibility represents a separate embodiment of the present invention.

According to some particular embodiments, the additional anti-cancer agent is selected from the group consisting of bevacizumab, carboplatin, cyclophosphamide, doxorubicin hydrochloride, gemcitabine hydrochloride, topotecan hydrochloride, thiotepa, and combinations thereof. Each possibility represents a separate embodiment of the present invention.

Monoclonal antibodies according to the present invention may be used as part of combined therapy with at least one anti-cancer agent. According to some embodiments, the additional anti-cancer agent is an immuno-modulator, an activated lymphocyte cell, a kinase inhibitor or a chemotherapeutic agent.

According to some embodiments, the anti-cancer agent is an immuno-modulator, whether agonist or antagonist, such as antibody against an immune checkpoint molecule.

Checkpoint immunotherapy blockade has proven to be an exciting new venue of cancer treatment. Immune checkpoint pathways consist of a range of co-stimulatory and inhibitory molecules which work in concert in order to maintain self-tolerance and protect tissues from damage by the immune system under physiological conditions. Tumors take advantage of certain checkpoint pathways in order to evade the immune system. Therefore, the inhibition of such pathways has emerged as a promising anti-cancer treatment strategy.

The anti-cytotoxic T lymphocyte 4 (CTLA-4) antibody ipilimumab (approved in 2011) was the first immunotherapeutic agent that showed a benefit for the treatment of cancer patients. The antibody interferes with inhibitory signals during antigen presentation to T cells. Anti-programmed cell death 1 (PD-1) antibody pembrolizumab (approved in 2014) blocks negative immune regulatory signaling of the PD-1 receptor expressed by T cells. An additional anti-PD-1 agent was filed for regulatory approval in 2014 for the treatment of non-small cell lung cancer (NSCLC). Active research is currently exploring many other immune checkpoints, among them: CEACAM1, NKG2A, B7-H3, B7-H4, VISTA, CD112R, lymphocyte activation gene 3 (LAG3), CD137, OX40 (also referred to as CD134), and killer cell immunoglobulin-like receptors (KIR).

According to some specific embodiments, the immuno-modulator is selected from the group consisting of: an antibody inhibiting CTLA-4, an anti-human programmed cell death protein 1 (PD-1), PD-L1 and PD-L2 antibody, an activated cytotoxic lymphocyte cell, a lymphocyte activating agent, an antibody against CEACAM, an antibody against TIGIT, and a RAF/MEK pathway inhibitor. Each possibility represents a separate embodiment of the present invention. According to some specific embodiments, the additional immuno-modulator is selected from mAb to PD-1, mAb to PD-L1, mAb to PD-L2, mAb to CEACAM1, mAb to CTLA-4, mAB to TIGIT, PVR, Interleukin 2 (IL-2) or lymphokine-activated killer (LAK) cell.

According to other embodiments the additional anticancer agent is a chemotherapeutic agent. The chemotherapy agent, which could be administered together with the antibody according to the present invention, or separately, may comprise any such agent known in the art exhibiting anticancer activity, including but not limited to: mitoxantrone, topoisomerase inhibitors, spindle poison from vinca: vinblastine, vincristine, vinorelbine (taxol), paclitaxel, docetaxel; alkylating agents: mechlorethamine, chlorambucil, cyclophosphamide, melphalan, ifosfamide; methotrexate; 6-mercaptopurine; 5-fluorouracil, cytarabine, gemcitabine; podophyllotoxins: etoposide, irinotecan, topotecan, dacarbazine; antibiotics: doxorubicin (adriamycin), bleomycin, mitomycin; nitrosoureas: carmustine (BCNU), lomustine, epirubicin, idarubicin, daunorubicin; inorganic ions: cisplatin, carboplatin; interferon, asparaginase; hormones: tamoxifen, leuprolide, flutamide, and megestrol acetate.

According to some embodiments, the chemotherapeutic agent is selected from alkylating agents, antimetabolites, folic acid analogs, pyrimidine analogs, purine analogs and related inhibitors, vinca alkaloids, epipodophyllotoxins, antibiotics, L-asparaginase, topoisomerase inhibitor, interferons, platinum coordination complexes, anthracenedione substituted urea, methyl hydrazine derivatives, adrenocortical suppressant, adrenocorticosteroids, progestins, estrogens, antiestrogen, androgens, antiandrogen, and gonadotropin-releasing hormone analog. According to another embodiment, the chemotherapeutic agent is selected from the group consisting of 5-fluorouracil (5-FU), leucovorin (LV), irinotecan, oxaliplatin, capecitabine, paclitaxel and docetaxel. One or more chemotherapeutic agents can be used.

In some embodiments, the pharmaceutical composition according to the present invention is for use in treating cancer or for use in enhancing the immune response.

The term "enhancing immune response" refers to increasing the responsiveness of the immune system and inducing or prolonging its memory. The pharmaceutical composition according to the present invention may be used to stimulate immune system upon vaccination. Thus, in one embodiment the pharmaceutical composition can be used for improving vaccination.

In certain embodiments, the cancer is selected from lung, thyroid, breast, colon, melanoma, prostate, hepatic, bladder, renal, cervical, pancreatic, leukemia, lymphoma, myeloid, ovarian, uterus, sarcoma, biliary, and endometrial cells cancer. Each possibility represents a separate embodiment of the invention.

According to some embodiments, a pharmaceutical composition, comprising at least one antibody or fragment thereof according to the present invention, and a pharmaceutical composition, comprising an additional immunomodulator or a kinase inhibitor, are used in treatment of cancer by separate administration.

According to still another aspect the present invention provides a method of treating cancer in a subject in need thereof comprising administering to said subject a therapeutically effective amount of a monoclonal antibody or antibody fragment according to the present invention.

The term "effective amount" as used herein refers to a sufficient amount of the monoclonal antibody of the antibody fragment that, when administered to a subject will have the intended therapeutic effect. The effective amount required to achieve the therapeutic end result may depend on a number of factors including, for example, the specific type of the tumor and the severity of the patient's condition, and whether the combination is further co-administered with radiation. The effective amount (dose) of the active agents, in the context of the present invention should be sufficient to affect a beneficial therapeutic response in the subject over time, including but not limited to inhibition of tumor growth, reduction in the rate of tumor growth, prevention of tumor and metastasis growth and enhanced survival.

Toxicity and therapeutic efficacy of the compositions described herein can be determined by standard pharmaceutical procedures in cell cultures or experimental animals, e.g., by determining the IC50 (the concentration which provides 50% inhibition) and the maximal tolerated dose for a subject compound. The data obtained from these cell culture assays, and animal studies can be used in formulating a range of dosages for use in humans. The dosage may vary depending inter alia upon the dosage form employed, the dosing regimen chosen, the composition of the agents used for the treatment and the route of administration utilized, among other relevant factors. The exact formulation, route of administration and dosage can be chosen by the individual physician in view of the patient's condition. Depending on the severity and responsiveness of the condition to be treated, dosing can also be a single administration of a slow release composition, with course of treatment lasting from several days to several weeks or until cure is effected or diminution of the disease state is achieved. The amount of a composition to be administered will, of course, be dependent on the subject being treated, the severity of the affliction, the manner of administration, the judgment of the prescribing physician, and all other relevant factors.

The term "administering" or "administration of" a substance, a compound or an agent to a subject can be carried out using one of a variety of methods known to those skilled in the art. For example, a compound or an agent can be administered enterally or parenterally. Enterally refers to administration via the gastrointestinal tract including per os, sublingually or rectally. Parenteral administration includes administration intravenously, intradermally, intramuscularly, intraperitoneally, subcutaneously, ocularly, sublingually, intranasally, by inhalation, intraspinally, intracerebrally, and transdermally (by absorption, e.g., through a skin duct). A compound or agent can also appropriately be introduced by rechargeable or biodegradable polymeric devices or other devices, e.g., patches and pumps, or formulations, which provide for the extended, slow or controlled release of the compound or agent. Administering can also be performed, for example, once, a plurality of times, and/or over one or more extended periods. In some embodiments, the administration includes both direct administration, including self-administration, and indirect administration, including the act of prescribing a drug. For example, as used herein, a physician who instructs a patient to self-administer a drug, or to have the drug administered by another and/or who provides a patient with a prescription for a drug is administering the drug to the patient.

Antibodies are generally administered in the range of about 0.1 to about 20 mg/kg of patient weight, commonly about 0.5 to about 10 mg/kg, and often about 1 to about 5 mg/kg. In this regard, it is preferred to use antibodies having a circulating half-life of at least 12 hours, preferably at least 4 days, more preferably up to 21 days. Chimeric antibodies are expected to have circulatory half-lives of up to 14-21 days. In some cases, it may be advantageous to administer a large loading dose followed by periodic (e.g., weekly) maintenance doses over the treatment period. Antibodies can also be delivered by slow-release delivery systems, pumps, and other known delivery systems for continuous infusion.

The antibodies of the present invention can be used in CAR-based adoptive immunotherapies that utilizes engineered lymphocytes comprising the CAR for treating cancer. CAR-T system is described herein as a non-limiting example.

The T cell therapy utilizes a chimeric antigen receptor (CAR) in the treatment of cancer or tumors (i.e., CAR-T cell therapy). CAR-T cell therapy is a cellular immunotherapy which involves administration to a cancer patient genetically engineered T-cells that act on tumor cells and cause apoptosis of the tumor cells. The genetically engineered T cells are prepared by expressing on a T cell a CAR having variable regions of an antibody (VL and VH) combined with an intracellular domain, such as fragment of a CD3 chain sequence, using gene transfer technique. CAR is a general term for a chimeric protein in which a light chain and a heavy chain of a variable region of a monoclonal antibody specific for a tumor antigen are linked to each other, which are then linked to a T-cell receptor (TCR) chain at the C-terminal side.

According to some embodiments, the CAR comprises at least one protein domain selected from the group consisting of a CD8 Stalk domain, a CD28 TM domain, a 41BB domain, and a CD3 domain. According to some embodiments, the CAR comprises a CD8 Stalk domain. According to some embodiments, the CAR comprises a CD28 TM domain. According to some embodiments, the CAR comprises a CD3ζ signaling domain. According to some embodiments, the CAR comprises a 41BB domain. According to specific embodiments, the CAR comprises a CD8 Stalk domain, a CD28 TM domain, a 41BB domain, and a CD3ζ domain.

According to some embodiments, the CAR comprises a costimulatory domain derived from 4-1BB (or 41BB or CD137), ICOS, OX40, CD27, KIR2DS2, MYD88-CD40, or CD28. In some embodiments, the CAR comprises signaling domains of CD3ζ, 41BB and CD28.

According to some embodiments, the CAR comprises a transmembrane domain (TM) selected from CD28 TM, DAP12 TM, CD8 TM, CD32 TM, DAP10 TM, and ICOS TM.

According to some embodiments, the CAR comprises a hinge region sequence. According to some embodiments, the hinge region sequence is derived from CD8, CD28, or IgG4 hinge.

According to some embodiments, a chimeric antigen receptor (CAR) comprising the heavy chain variable region (VH) and the light chain variable region (VL) according to the invention is provided. According to certain embodiments, a genetically modified lymphocyte having the CAR being expressed on its surface is provided. According to some specific embodiments, a genetically modified T cell having the CAR being expressed on its surface (CAR-T cell) is provided.

According to some embodiments, the CAR comprises a Nectin-2 binding site comprising six CDR sequences selected from the group consisting of:
i. three complementarity determining regions (CDRs) of a heavy-chain (HC) variable region comprising SEQ ID NO: 7 and three CDRs of a light-chain (LC) variable comprising SEQ ID NO: 8, or an analog or derivative thereof having at least 90% sequence identity with said antibody or fragment sequence; and
ii. three CDRs of a heavy-chain variable region comprising SEQ ID NO: 17 and three CDRs of a light-chain variable region comprising SEQ ID NO: 18, or an analog or derivative thereof having at least 90% sequence identity with said antibody or fragment sequence.

According to some embodiments, the analog or derivative has al least 91%, 92%, 93%, 94%, 95%, 96%, 97%, 98%, or 99% sequence identity with said antibody or fragment sequence.

According to some embodiments, the CAR comprises a Nectin-2 binding site comprising six CDR sequences selected from the group consisting of:
i. three complementarity determining regions (CDRs) of a heavy-chain (HC) variable region comprising SEQ ID NO: 7 and three CDRs of a light-chain (LC) variable comprising SEQ ID NO: 8; and
ii. three CDRs of a heavy-chain variable region comprising SEQ ID NO: 17 and three CDRs of a light-chain variable region comprising SEQ ID NO: 18.

According to some embodiments, the CAR comprises a Nectin-2 binding site comprising a CDR set selected from the group consisting of:

```
iii. a set of six CDRs wherein:
                                (SEQ ID NO: 1)
    HC CDR1 is RFTMS;

(SEQ ID NO: 2)
    HC CDR2 is TISSGGSYTYYPDSVKG;

(SEQ ID NO: 3)
    HC CDR3 is DRDFYGPYYAMDY;

(SEQ ID NO: 4)
    LC CDR1 is KSSQSLLNSGNQKNYLA;

(SEQ ID NO: 5)
    LC CDR2 is FASTRES;
    and (SEQ ID NO: 6)
    LC CDR3 is QQHYTTPLT;
    and iv. a set of six CDRs wherein:
                                (SEQ ID NO: 11)
    HC CDR1 sequence is SYWIH;

(SEQ ID NO: 12)
    HC CDR2 is AVYPGNSDSNYNQKFKA;

(SEQ ID NO: 13)
    HC CDR3 is LVGTFDY;

(SEQ ID NO: 14)
    LC CDR1 is KASQNVGINVV;

(SEQ ID NO: 15)
    LC CDR2 is SASYRYS;
    and (SEQ ID NO: 16)
    LC CDR3 is QQYNTNPFT.
```

According to some embodiments, the CAR comprises an antigen binding domain comprising SEQ ID NOs: 20 or 22, or an analog having at least 85% identity with SEQ ID NOs: 20 or 22; and a transmembrane domain, and an intracellular T cell signaling domain.

According to a certain aspect, the present invention provides a cell comprising the CAR described herein. According to some embodiments, the cell expresses or capable of expressing the CAR of the present invention. According to some embodiments, the cell is a lymphocyte. According to some embodiments, the cell is selected from a T cell and a natural killer (NK) cell.

According to some embodiments, the cell, such as T-cell comprises the nucleic acid molecule encoding the CAR of the present invention. According to other embodiments, the cell, such as T-cell comprises the nucleic acid construct comprising nucleic acid molecule encoding the CAR of the present invention. According to a further embodiment, the present invention provides a vector comprising the nucleic acid construct or molecule encoding the CAR of the present invention. According to such embodiments, the T-cell is capable of expressing or expresses the CAR of the present invention.

According to some embodiments, a lymphocyte engineered to express the CAR described herein is provided. According to some embodiments, a T cell engineered to express the CAR described herein is provided.

According to additional embodiments, an NK cell engineered to express the CAR described herein is provided.

The CAR of the present invention comprises a transmembrane domain (TM domain), a costimulatory domain and an activation domain. According to some embodiments, the TM domain is a TM domain of a receptor selected from CD4, CD3, CD28 and CD8, or an analog thereof having at least 85% amino acid identity to the original sequence and/or the costimulatory domain is selected from a costimulatory domain of a protein selected from CD28, 4-1BB, OX40, iCOS, CD27, CD80, and CD70, an analog thereof having at least 85% amino acid identity to the original sequence and any combination thereof, and/or the activation domain is selected from FcRγ and CD3-ζ activation domains. According to some embodiments, the CAR comprises a leading peptide.

According to some embodiments, the present invention provides a cell composition comprising a plurality of cells of the present invention, e.g. CAR displaying cells.

The term "about" means that an acceptable error range, e.g., up to 5% or 10%, for the particular value should be assumed.

Diagnosis

The present invention further discloses methods for diagnosing and prognosing cancer.

According to an aspect, the present invention provides a diagnostic and/or prognostic method of cancer or infectious disease in a subject, the method comprises the step of determining the expression level of Nectin-2 in a biological sample of said subject using at least one antibody as described herein.

The term "biological sample" encompasses a variety of sample types obtained from an organism that may be used in a diagnostic or monitoring assay. The term encompasses blood and other liquid samples of biological origin, solid tissue samples, such as a biopsy specimen, or tissue cultures or cells derived there from and the progeny thereof. Additionally, the term may encompass circulating tumor or other cells. The term specifically encompasses a clinical sample, and further includes cells in cell culture, cell supernatants, cell lysates, serum, plasma, urine, amniotic fluid, biological fluids including aqueous humour and vitreous for eyes samples, and tissue samples. The term also encompasses samples that have been manipulated in any way after procurement, such as treatment with reagents, solubilization, or enrichment for certain components.

Determining the expression level of Nectin-2 can be performed by a labeled anti-Nectin-2 antibody as described herein. Determining the expression can be performed, for example, by ELISA.

The method of the invention can further comprise the step of comparing said level of expression to a control level.

The following examples are presented in order to more fully illustrate some embodiments of the invention. They should, in no way be construed as limiting the scope of the invention.

EXAMPLES

Reference is now made to the following examples, which together with the above descriptions, illustrate the invention in a non-limiting fashion.

Generally, the nomenclature used herein and the laboratory procedures utilized in the present invention include molecular, biochemical, microbiological, immunological and recombinant DNA techniques. Such techniques are well known in the art. Other general references referring to well-known procedures are provided throughout this document for the convenience of the reader.

Figure 1B:
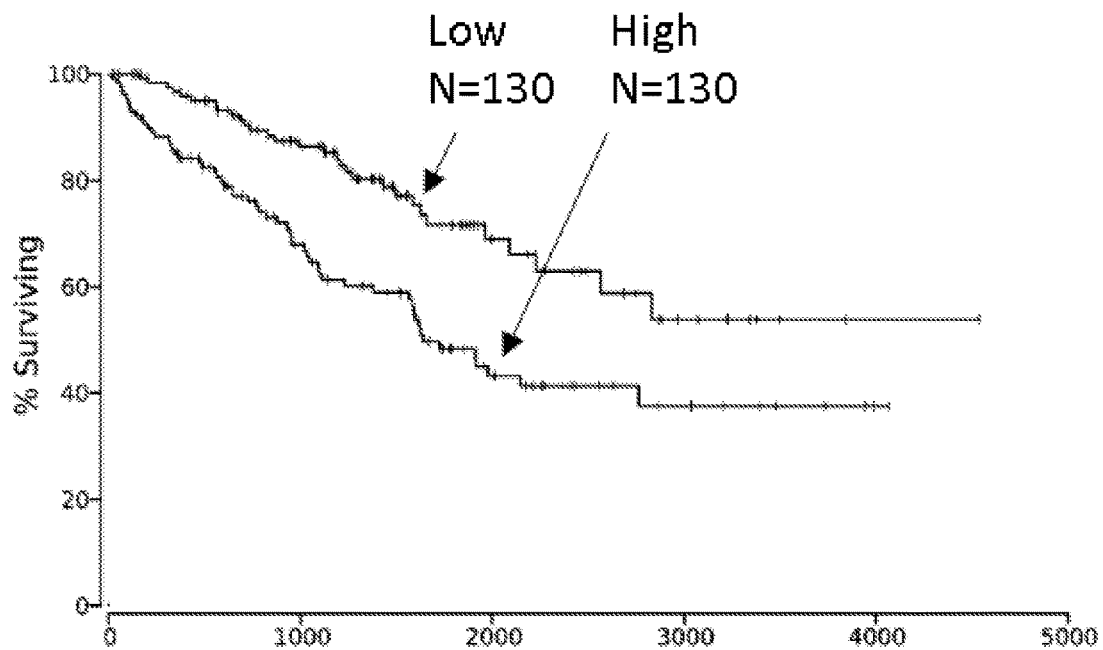
Figure 1C:
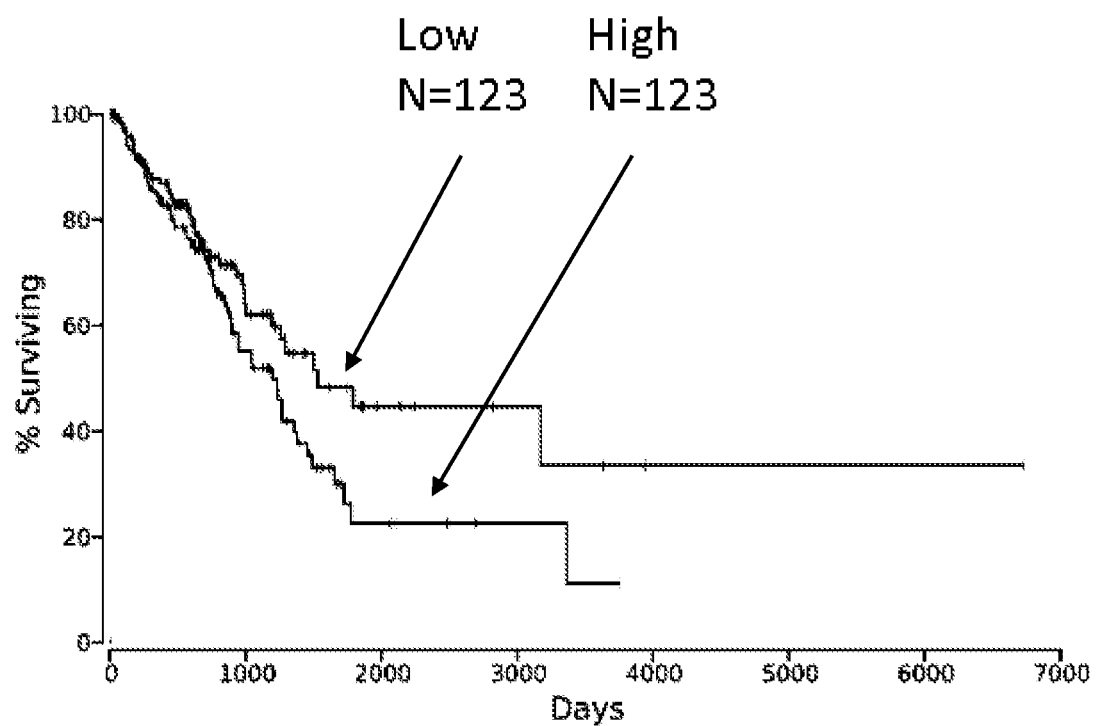

Example 1. High Expression of Nectin-2 mRNA Correlates with Poor Survival Probability of Various Cancer Patients The correlation between Nectin-2 mRNA expression and survival probability was examined on data from TCGA site, and analyzed using oncolnc.org site, (doi.org/10.7717/peerj-cs.67). This correlation is indicated by the arrows in FIG. 1 for Low grade glioma (FIG. 1A; p=5.22E-5), Kidney Renal Clear Cell Carcinoma (FIG. 1B; p=0.00037) and lung adenocarcinoma (FIG. 1C; p=0.0319) patients.

Example 2. Nectin-2 Binds and Affect Immune Cells Through Specific Receptors

Figure 2:
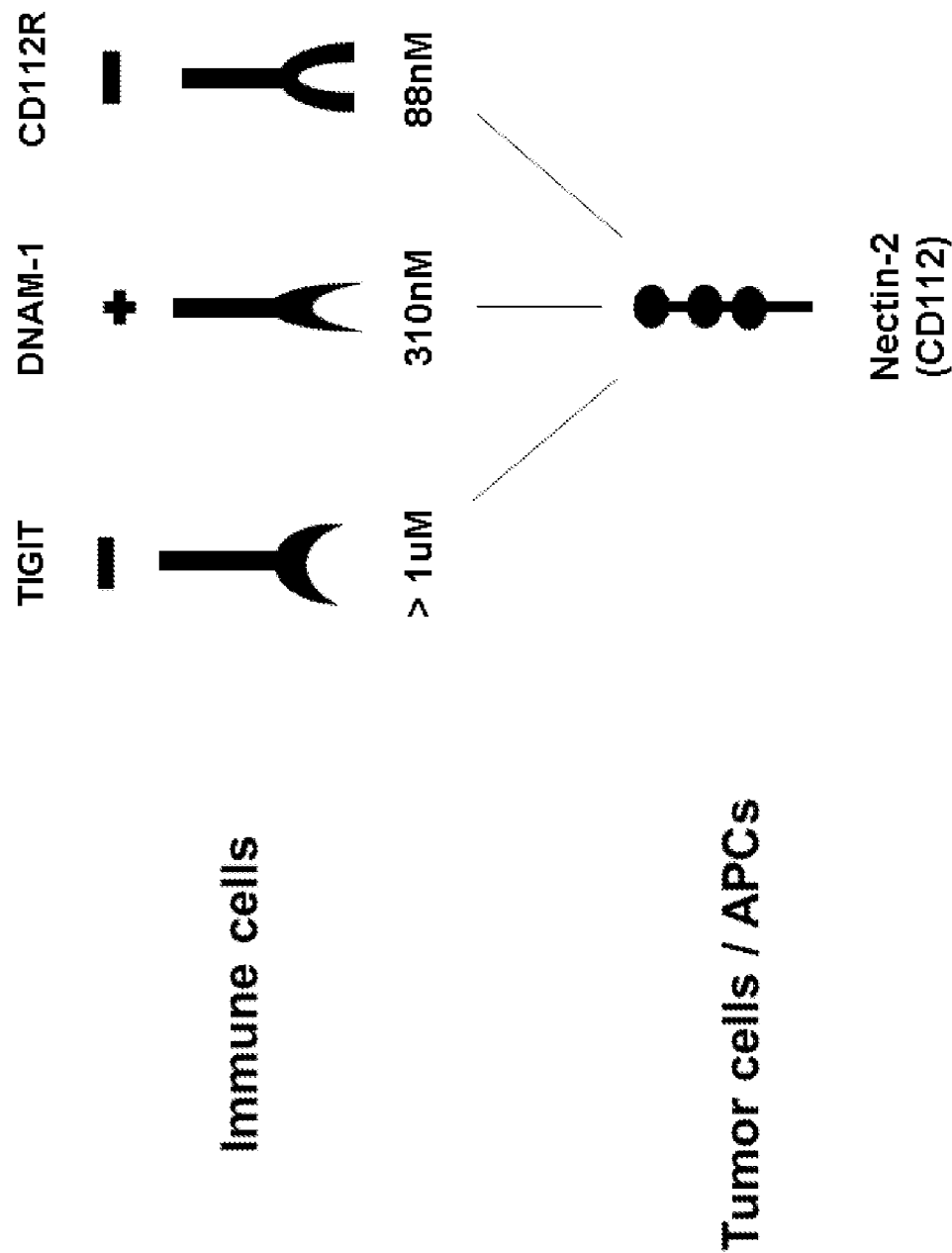
FIG. 2 is a schematic illustration of receptors expressed on immune cells and their respective affinities to Nectin-2 expressed by tumors or on antigen presenting cells (APCs). TIGIT is a co-inhibitory receptor on many immune cells (e.g. T and NK cells); DNAM-1 (also termed CD226) is an activating receptor on many immune cells (e.g. T cells), and CD112R (also termed PVRIG) is a co-inhibitory receptor on lymphoid immune cells (e.g. T and NK cells); Nectin-2 (CD112) is an inhibitory ligand for immune cells, mainly via its binding to CD112R, based on the depicted affinities.

A schematic illustration (FIG. 2) of receptors expressed on immune cells and their respective affinities to Nectin-2 expressed by tumors or on antigen presenting cells (APCs). TIGIT relates to a co-inhibitory receptor on immune cells such as T and NK cells; DNAM-1 (also termed CD226) relates to an activating receptor on immune cells (e.g. T cells), and CD112R (also termed PVRIG) relates to a co-inhibitory receptor on lymphoid immune cells (e.g., T and NK cells); Nectin-2 (CD112) is an inhibitory ligand for immune cells, mainly via its binding to CD112R. According to the present invention, anti-Nectin-2 mAbs may block Nectin-2 interactions with its ligands CD112R and/or TIGIT and increase activation of immune cells.

Figure 3A:
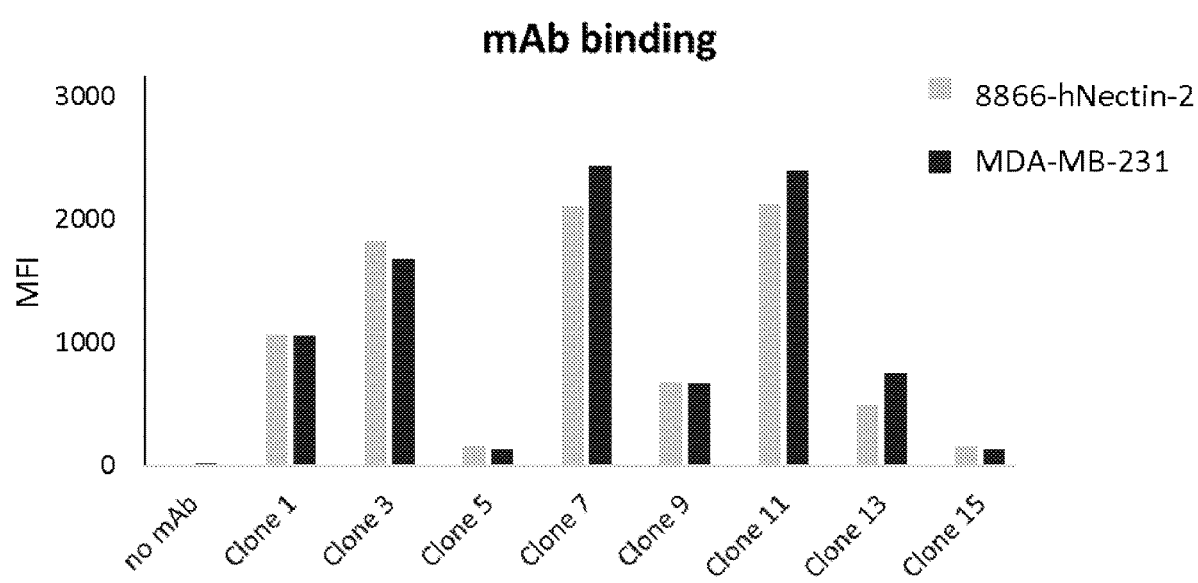
FIGS. 3A-3D. Analysis of binding and blocking characteristics of the generated anti-Nectin-2 mAbs.
Figure 3B:
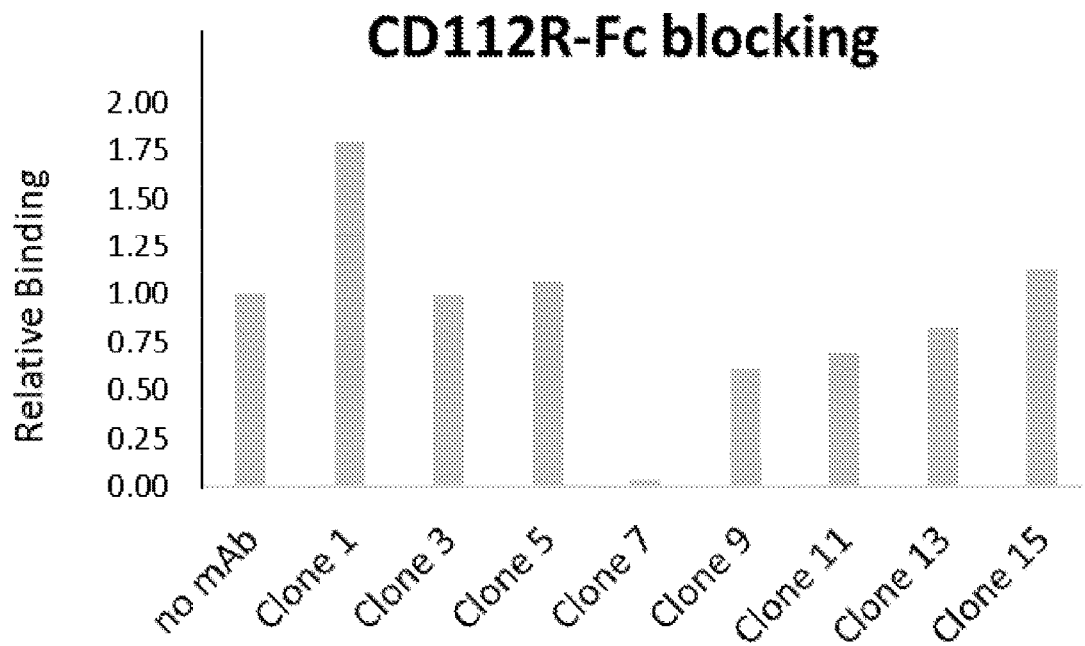
Figure 3C:
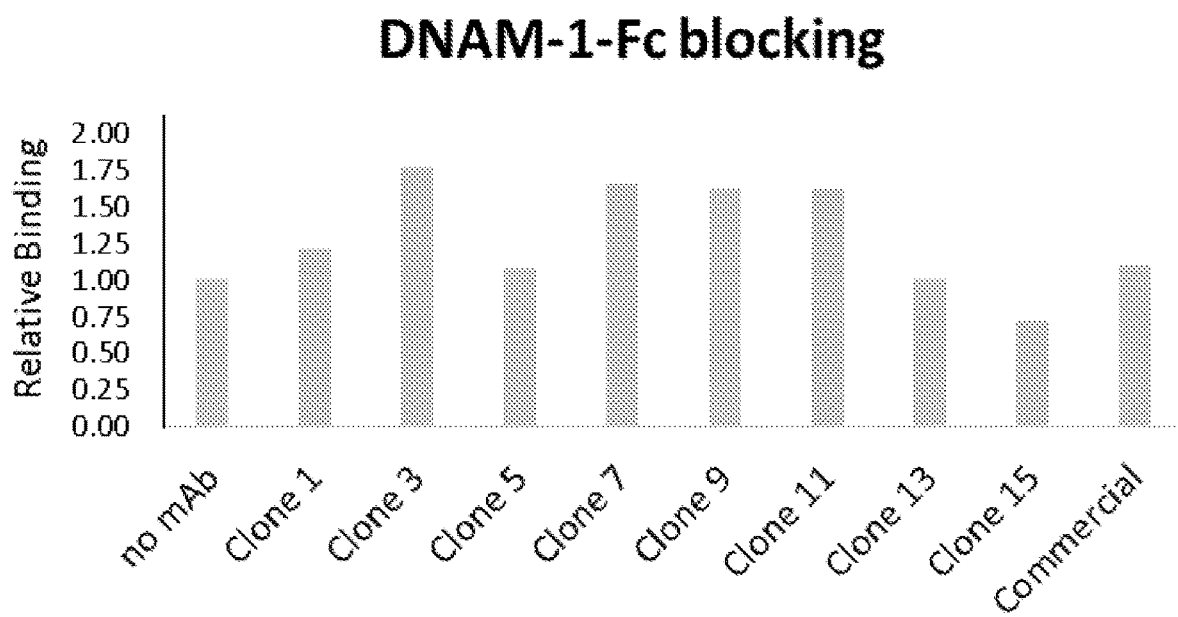
Figure 3D:
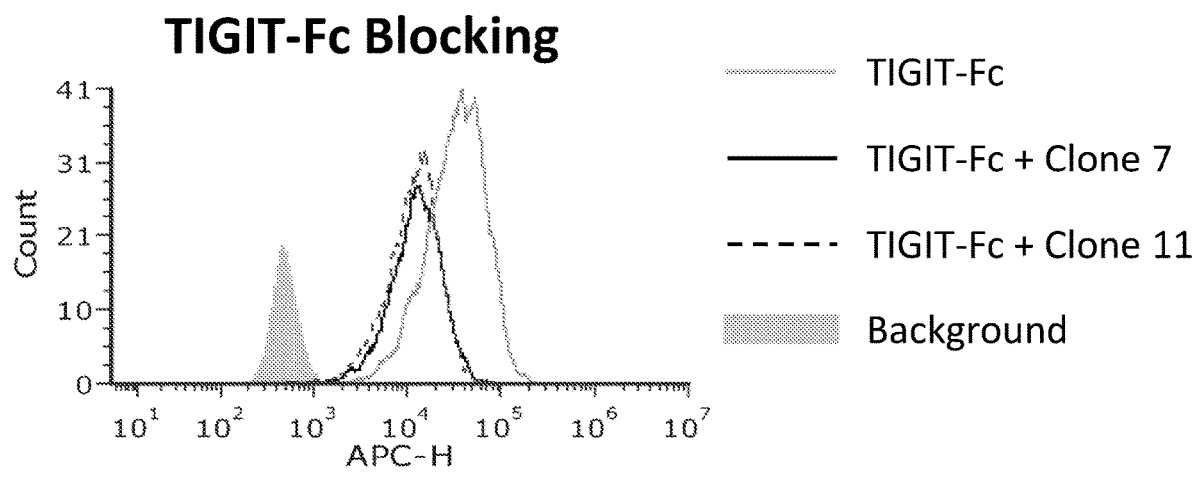

Example 3. Analysis of Binding and Blocking Characteristics of the Anti-Nectin-2 mAbs Nectin-2 clones did not bind to parental 8866 cells (EBV positive Burkit lymphoma) which do not express Nectin-2. FIG. 3A illustrates binding of anti-Nectin-2 clones to MDA-MB-231 (breast adenocarcinoma) cells (black bars), which endogenously express Nectin-2 or to 8866-hNectin-2 cells (grey bars), which overexpress Nectin-2. All of the mAbs were used from hybridoma supernatants at 30 ul/well. For detection, Goat anti-mouse-647 Ab was used at 1:250 dilution. FIG. 3B shows the results of a FACS analysis of CD112R-Fc (extracellular domain of CD112R fused to human Fc region of IgG1) binding to 8866-hNectin2 cells. Of the generated antibodies, three clones (#9, 11 and 13) partially blocked these interactions, while one clone (#7) completely blocked them. FIG. 3C shows the results of a FACS analysis of DNAM-1-Fc binding to 8866-hNectin2 cells. Other than clone 15, none of the other clones (#7-13) blocked the binding of the activating receptor DNAM-1 to Nectin-2. FIG. 3D shows the results of a FACS analysis of TIGIT-Fc binding to CHOK1-hNectin2 cells in presence of anti-Nectin-2 clones 7 and 11. Both clones are blocking >66% of the TIGIT-Fc binding. All of the Fc proteins were used at 20 ug/ml and co-incubated with 30 ul/well of the indicated mAb supernatant. For detection, anti-Human-APC Ab was used at 1:200 dilution (Jackson immunoresearch AB_2340526). These results suggest that some of the clones can prevent the binding of the inhibitory receptors without any interference to the binding of activating receptors.

Figure 4A:
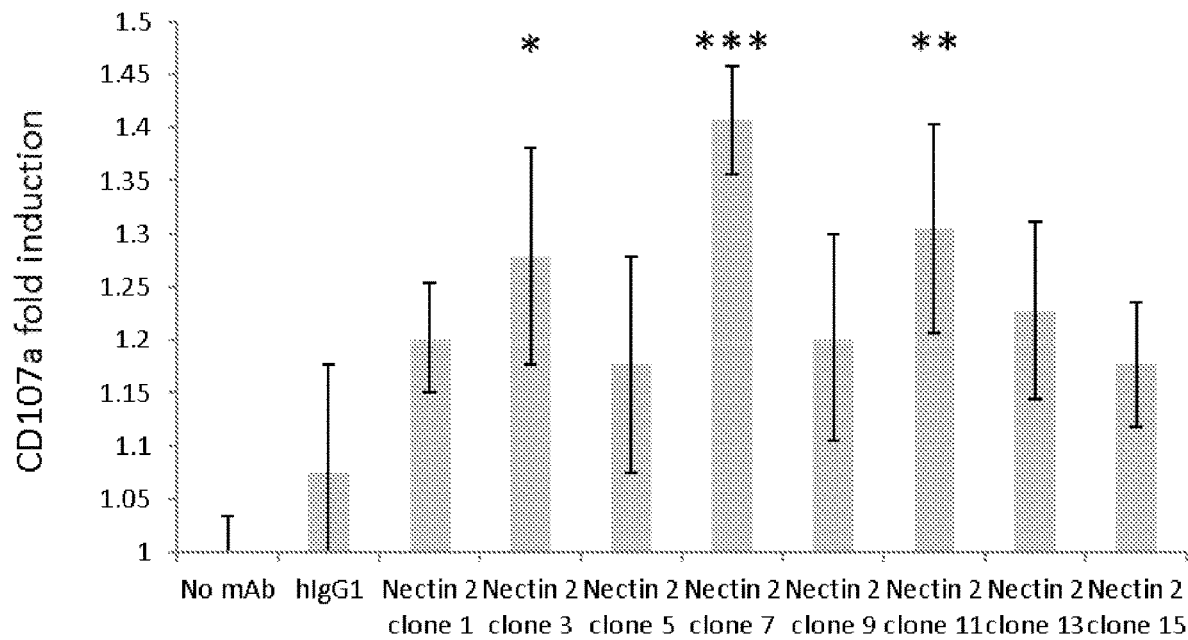
FIGS. 4A-4C depict that blocking of Nectin-2 by the anti-Nectin-2 mAbs (indicated at the X axis) enhances NK cell activation. NK activation was measured by the induction of surface expression of CD107a and is expressed as fold change over control IgG (Y axis). Results are shown for the human cancer cell lines A549 (lung adenocarcinoma) (FIG. 4A) and MDA-MB-231 (breast adenocarcinoma) (FIG. 4B). Most significant effect was noted for clones #3, 7 and 11. *=$p<0.04$, $p<0.02$, *$p<0.002$ by two tailed student t-test. Representative data for one out of five donors is shown. Human IgG1 chimeric variants of clones 7 and 11 increased the degranulation further (FIG. 4C) leading to >200% degranulation compared to isotype control. ***$p<0.002$. Representative data for one out of two donors is shown.
Figure 4B:
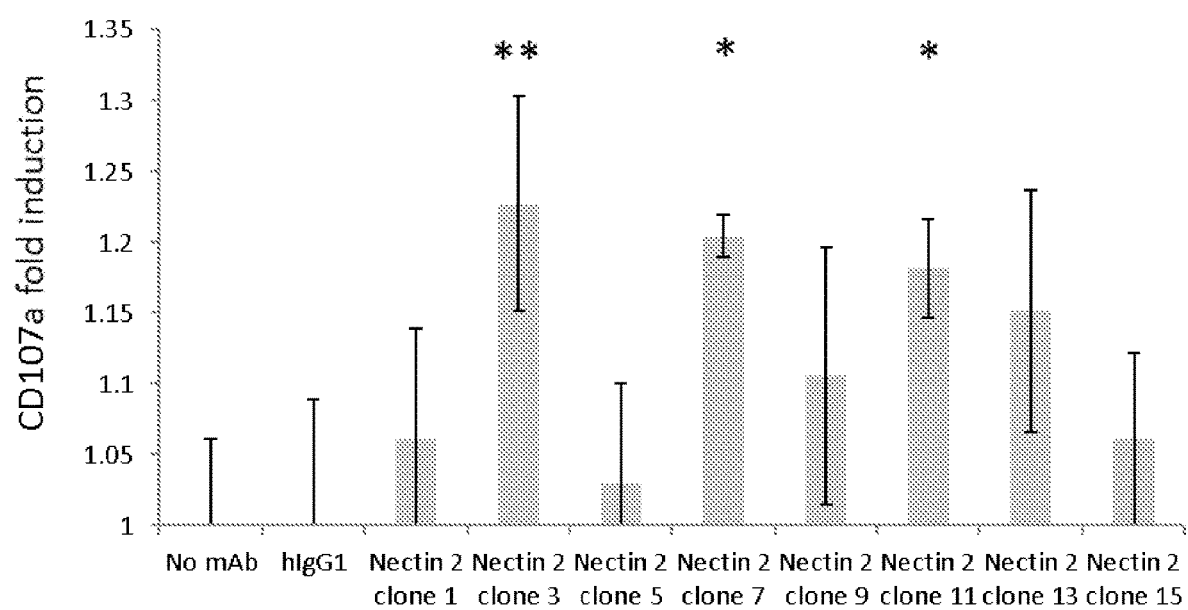
Figure 4C:
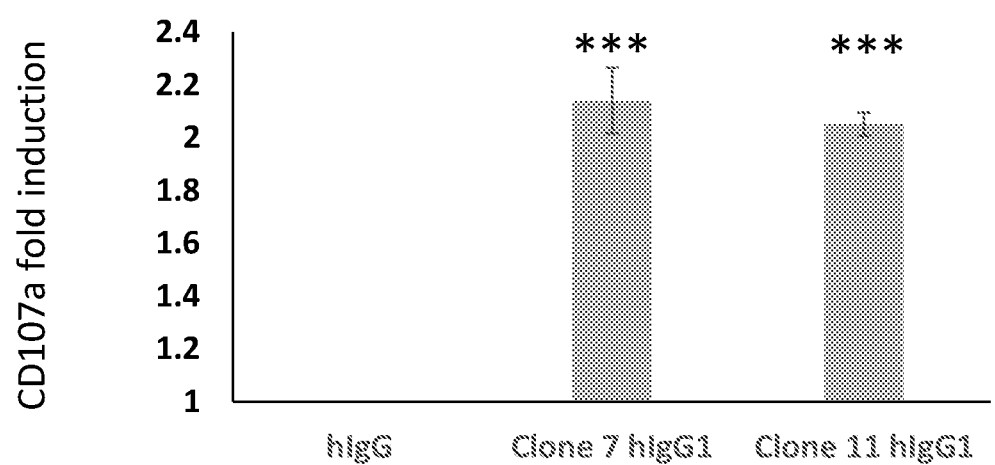

Example 4. Blocking of Nectin-2 by the Anti-Nectin2 mAbs Enhances NK Cell Activation NK cells from healthy donors were incubated in presence of different mAbs and target cell lines at 2:1 E:T ratio for 2 hours at 37° C. degrees. NK cell activation was measured by the induction of surface expression of CD107a and is depicted as fold change over control IgG (Y axis). All mAbs were used at 5 ug/ml. Results are shown in FIG. 4 for the human cancer cell lines A549 (FIGS. 4A and 4C, lung adenocarcinoma) and MDA-MB-231 (FIG. 4B, breast adenocarcinoma). Most significant effect was noted for clones #3, 7 and 11. *=p<0.04, p<0.02, *p<0.002 by two tailed student t-test. Representative data for one out of five donors is shown. Human IgG1 chimeric variants of clones 7 and 11 increased the degranulation further (FIG. 4C) leading to >200% degranulation compared to isotype control. ***p<0.002. Representative data for one out of two donors is shown. This data suggests that blocking of Nectin-2 by specific clones increase NK cells activity against a number of targets. Moreover, having an effector Fc further increases NK activity, suggesting another possible mode of actions for the mAbs.

Example 5. Nectin-2 is Expressed in Various Cancer Cells

Expression of Nectin-2 and PVR on various human tumor cell lines was analyzed by FACS. The analysis was performed for Melanoma cells, breast cancer cells, colorectal cancer (CRC) cells, kidney cells (HEK), lung cancer cells, prostate cancer cells, and brain tumor cells (GBM), all express PVR and Nectin-2. A commercial anti-Nectin-2 (Clone Tx31) and an inhouse anti-PVR mAb were used. All mAbs were used at 2 ug/ml. For detection, Goat anti mouse-647 was used at 1:250 dilution. Nectin-2 was found to be highly expressed in the different cancer cells.

Figure 5A:
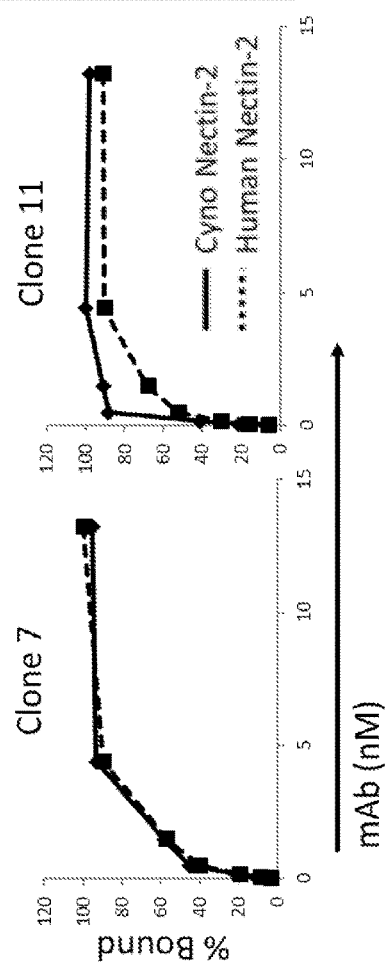

Example 6. Similar Binding of Anti-Nectin-2 mAbs to Nectin-2 of Human and Cynomolgus Monkey The anti-Nectin-2 mAbs (clones 7 and 11) binding to Nectin-2 of human (protein id: Q92692) and cynomolgus (Cyno) monkey (Macaca fascicularis, protein id: XP_005589607.1) was examined. A protein blast between cynomolgus and human Nectin-2 revealed that the extracellular domains of the mature proteins have 14 amino acids difference between the species. FIG. 5A depicts the overlaid binding curves of both mAbs which were added in the range of 13.3 nM-0.02 nM in a series of three-fold dilutions to CHO cells expressing either human or Cyno Nectin-2. Results of the FACS analysis of this assay are expressed as relative binding intensity in comparison to the maximal binding which was set at 100%. For detection, Goat anti-mouse-647 Ab (Jackson immunoresearch AB_2338910) was used at 1:250 dilution. Summary of data analysis of this assay is presented as well, and further demonstrates that both mAbs bind to human and Cyno Nectin-2 with high and similar affinity.

Figure 5B:
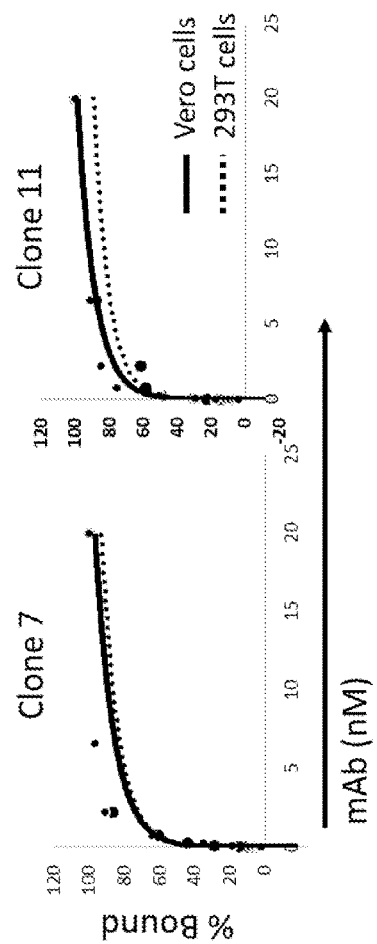

Binding of anti-Nectin-2 mAbs was also examined using Vero cells derived from Chlorocebus (African green monkey). This species expresses Nectin-2 protein (XP_007995342.1) with 97% similarity to human Nectin-2. FIG. 5B shows the binding of anti-Nectin-2 mAbs to endogenous human Nectin-2 (expressed by 293T cells) and to endogenous African green monkey Nectin-2 (expressed by Vero cells) tested by FACS analysis as described for FIG. 5A (Ab range: 20-0.0003 nM). This analysis reveals similar Ab binding to both human and monkey Nectin-2 targets, with high affinity, for both anti-nectin-2 clones, which is also evident at the summary tables.

Example 7. Anti-hNectin-2 mAbs Affect T Cell Proliferation

Figure 6A:
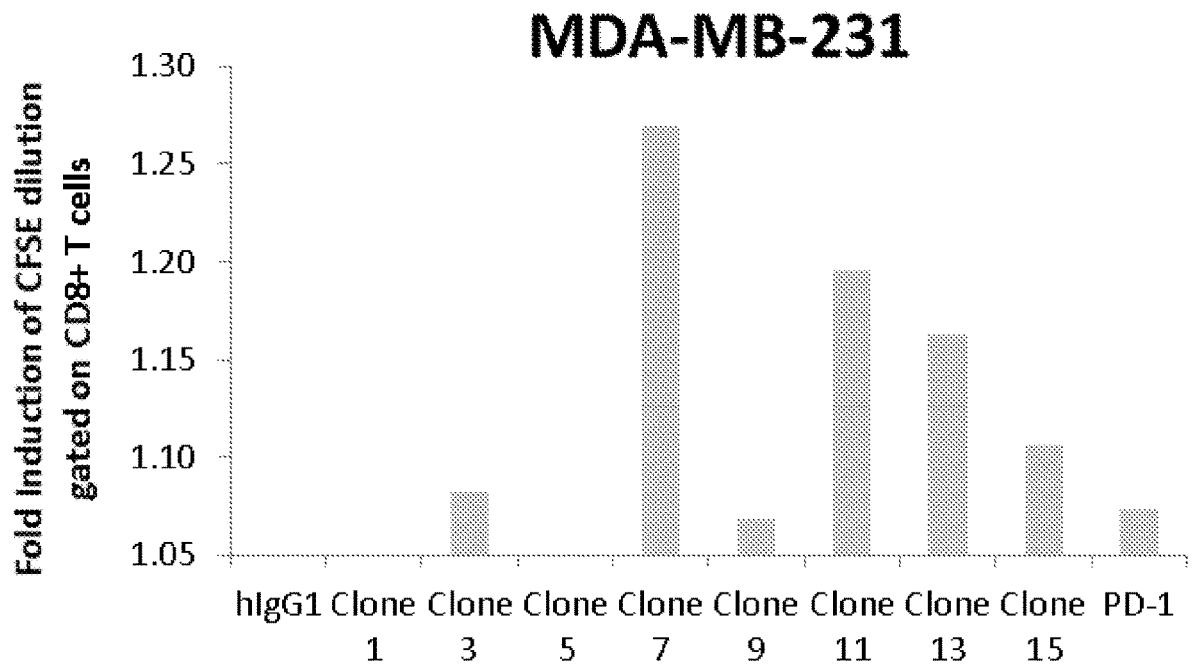
FIGS. 6A-6B show the effect of anti-hNectin-2 antibodies on T cell proliferation. Human PBMCs were CFSE labeled and incubated with target cells MDA-MB-231 (6A) or A549 (6B) in the presence of PHA-L and the indicated antibodies. Results are presented as fold increased proliferation relative to the control. Shown are results for 1 PBMC donor representative of 7 tested.
Figure 6B:
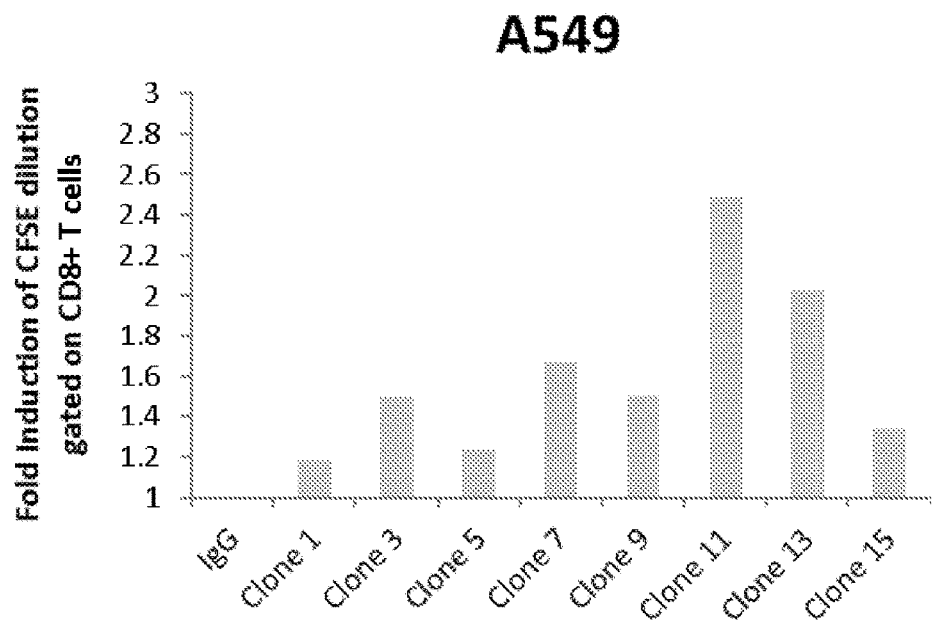

Human PBMCs were CFSE (C34554 ThermoFischer) labeled and incubated with target cells MDA-MB-231 (FIG. 6A) or A549 (FIG. 6B) in the presence of 0.2 ug/ml PHA-L (Roche) and the indicated antibodies at 2 ug/ml. After incubation the immune cells were collected and stained by anti-human CD8. Cell proliferation of CD8+ T cells was assessed by CFSE signal intensity. CFSE levels of the mIgG treated cells were set as 1. Results are presented as fold increased proliferation relative to this control. Experiments were done in quadruplicates; all p values were below 0.02 by two tailed student t-test. Shown are results for 1 PBMC donor representative of 7 tested. The data suggest that blocking of Nectin-2 by the indicated clones increases the proliferation of CD8+ T cells in presence of tumor cells from various origins.

Figure 7A:
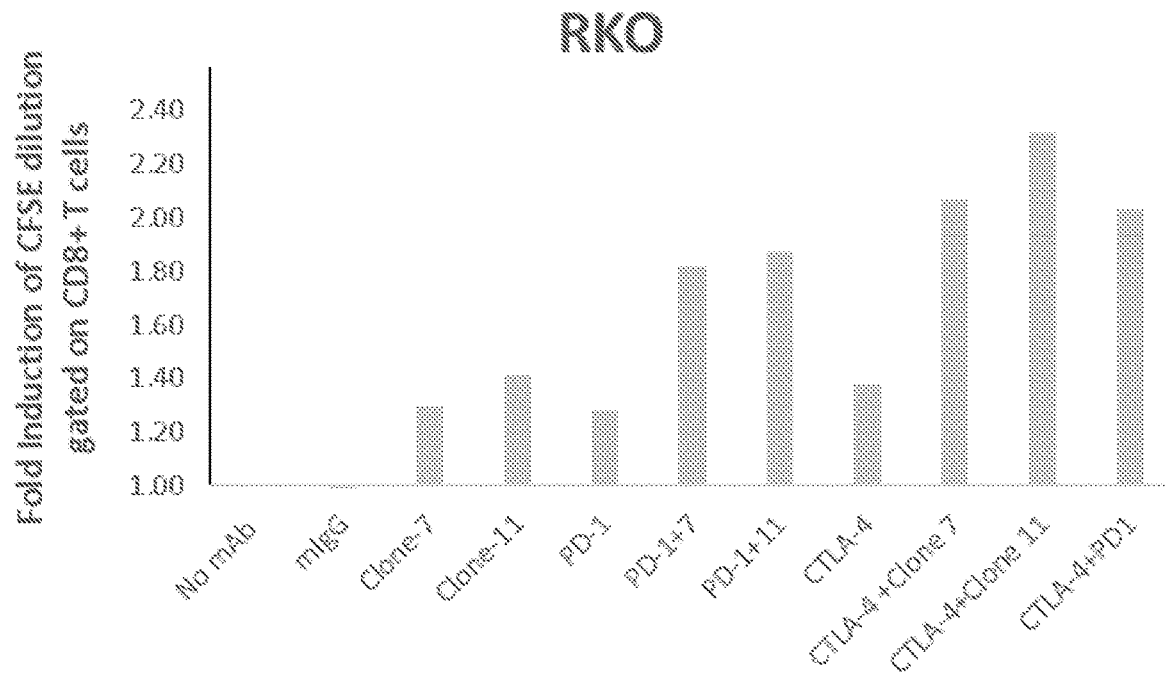
FIGS. 7A-7B show the effect of anti-hNectin-2 antibodies alone or in combination with known checkpoint blockers on CD8+ T cell proliferation. Human PBMCs were CFSE labeled and incubated with target cells RKO (FIG. 7A) or A549 (FIG. 7B) in presence of PHA-L and the indicated antibodies. Results are presented as fold increased proliferation relative to the control. All combinations tested resulted in significant increase of CD8+ T cell proliferation over individual treatments. Shown are results for one PBMC donor out of two donors tested.
Figure 7B:
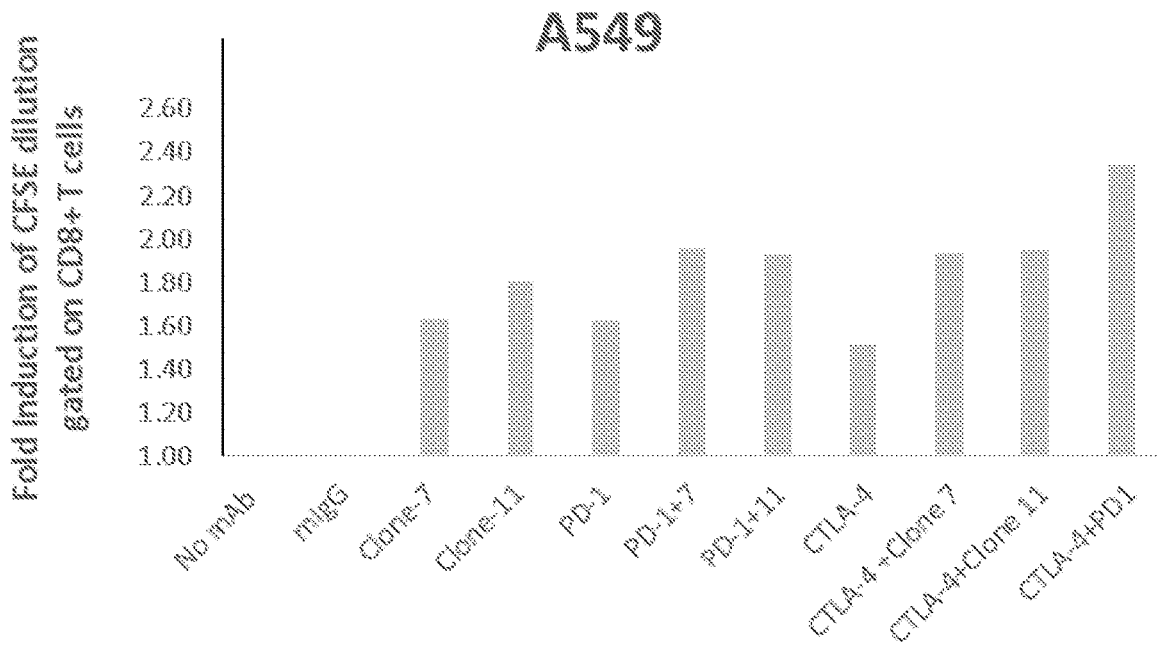

Example 8. Anti-hNectin-2 mAbs Affect CD8+ T Cell Proliferation, Alone or in Combination with Known Checkpoint Blockers To examine the effect of the mAbs on T cell proliferation, human PBMCs were CFSE labeled and incubated with target RKO (human colon carcinoma cells; FIG. 7A) or A549 (FIG. 7B) cells in the presence of 0.2 ug/ml PHA-L and the indicated mAbs at 2 ug/ml. For the combined treatment, each of the mAbs was added at 2 ug/ml. After the incubation the immune cells were collected and stained by anti-human CD8. The whole population and the CD8 proliferating cells were analyzed and the CFSE levels of the mIgG treated cells were set as 1. Experiments were done in quadruplicates; all p values were below 0.02 by two tailed student t-test. Results are presented as fold increased proliferation relative to the control. Shown are results for one PBMC donor out of two donors tested. All combinations tested resulted in significant increase of CD8+ T cell proliferation over individual treatments.

Example 9. Anti-hNectin-2 Antibodies Affect the Secretion of IFNγ

Figure 8A:
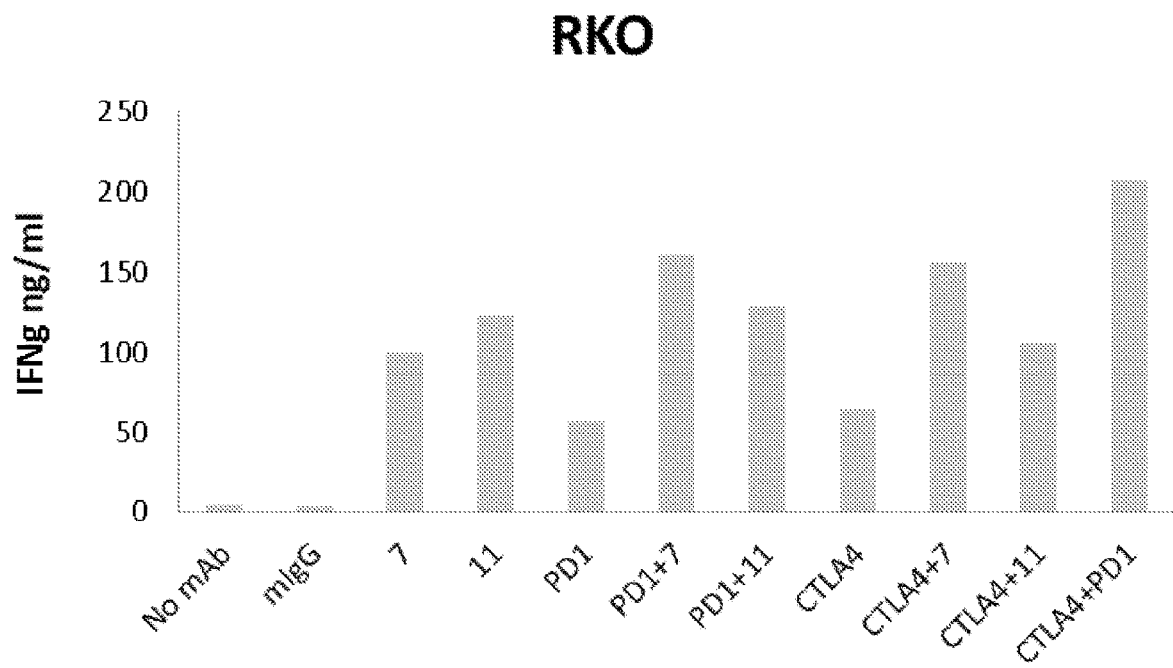
FIGS. 8A-8B show the effect of anti-hNectin-2 antibodies on secretion of IFNγ. Human PBMCs were incubated with target cells as described for FIG. 7. After 96 hours plates were centrifuged, and the supernatants collected. IFNγ quantification was done using Human IFN-γ ELISA MAX™ Deluxe by Biolegend according to the manufacturers protocol. Shown are results for one PBMC donor out of five donors tested.
Figure 8B:
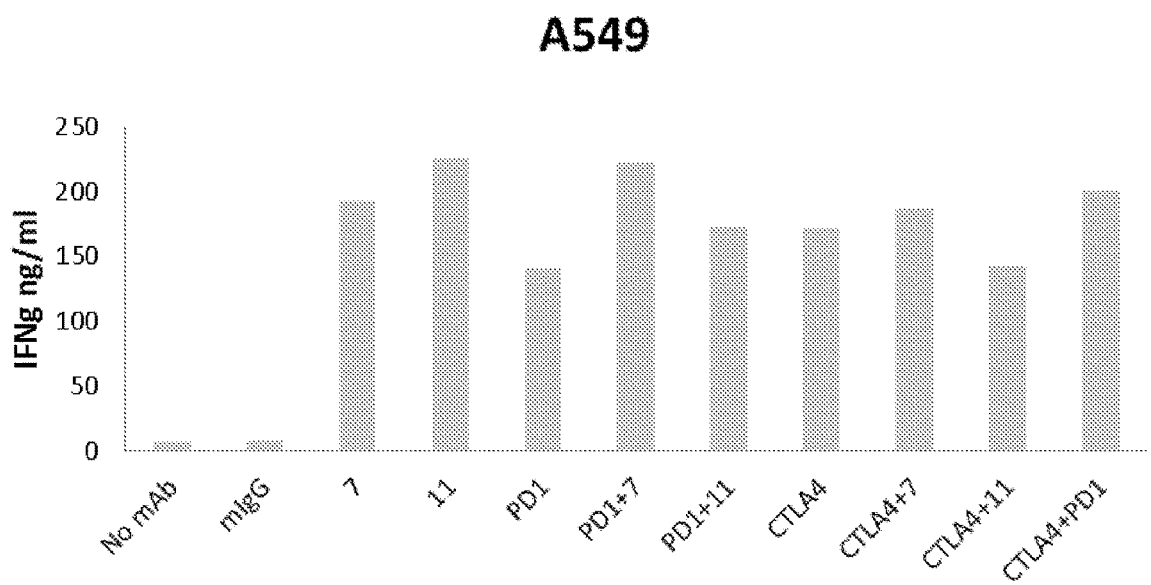

Human PBMCs were CFSE labeled and incubated with target cells RKO (FIG. 8A) or A549 (FIG. 8B) in the presence of 0.2 ug/ml PHA-L and the indicated antibodies at 2 ug/ml. For the combined treatment, each of the mAbs was added at 2 ug/ml. After 96 hours plates were centrifuged, and supernatants was collected. IFNγ quantification was done using Human IFN-γ ELISA MAX™ Deluxe by Biolegend according to the manufacturer's protocol. Shown are results for one PBMC donor out of five donors tested. All of the treatments resulted in significant increase of the IFNγ secretion (p<0.001 two tailed student t-test).

Figure 9A:
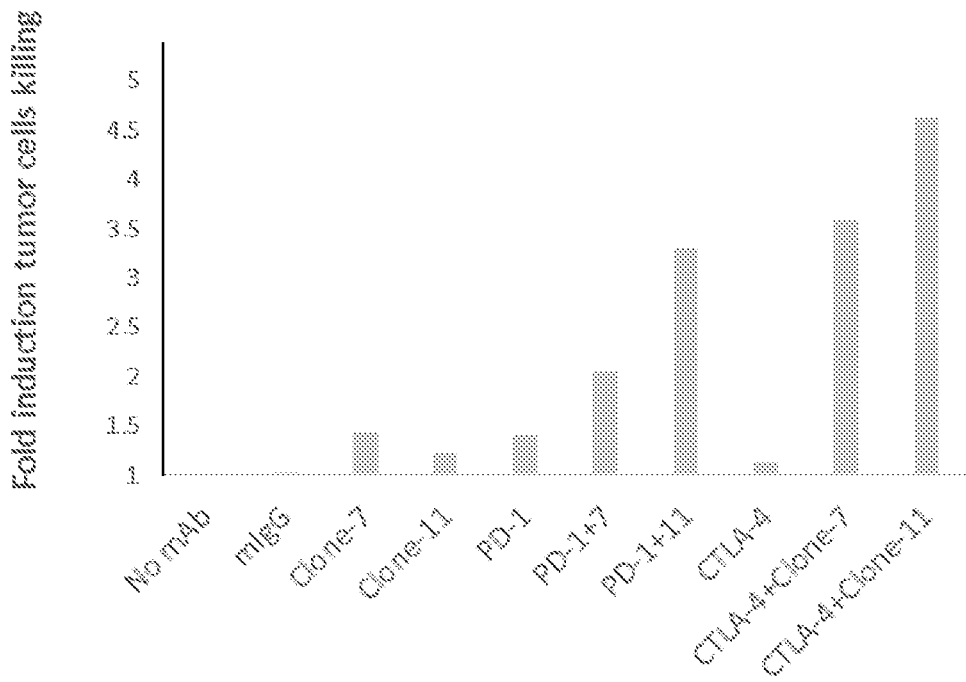
FIGS. 9A-9B show the effect of anti-hNectin-2 antibodies alone or in combination with known checkpoint blockers on killing of tumor cells by hPBMCs. Assay was conducted as described for FIG. 7. After 96-120 hours the immune cells were removed, tumor cells were extensively washed, and viability of the adherent tumor cells was established using CellTiter-Glo® according to the manufacturers protocol. All the results were in the linear range of the kit. Results are presented as fold increased killing of tumor cells, relative to the control. All combinations tested resulted in significant increase of tumor cells killing compared to individual treatments. Shown are results for one PBMC donor out of two donors tested.
Figure 9B:
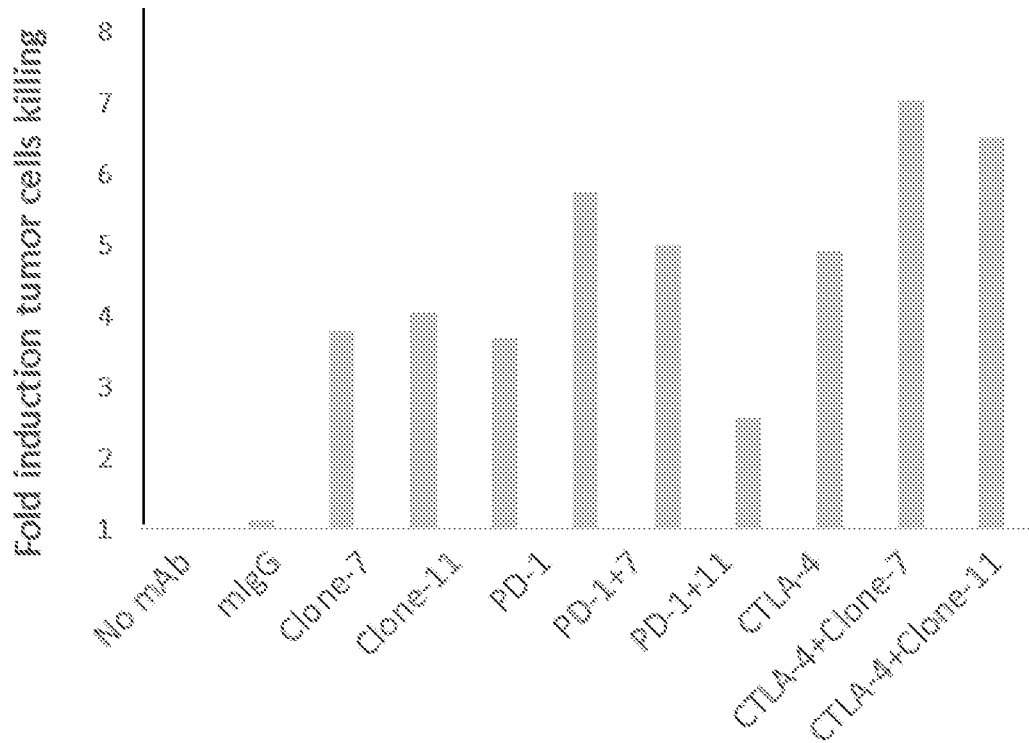

Example 10. Anti-hNectin-2 Antibodies Alone or in Combination with Known Checkpoint Blockers Affect Killing of Tumor Cells by hPBMCs The assay was conducted as described in example 8. After 96-120 hours the immune cells were removed, tumor cells were extensively washed, and viability of the adherent tumor cells was established using CellTiter-Glo® according to the manufacturer's protocol. All the results were in the linear range of the kit. Killing of the tumor cells in the mIgG treated wells was set as 1. All individual treatments significantly (p<0.01 two-tailed t-test) increased the killing of the tumor cells (FIG. 9A, RKO; FIG. 9B, A549). Shown are results for one PBMC donor out of two donors tested. Most combinations tested resulted in significant increase of tumor cells killing compared to individual treatments.

Example 11. Nectin-2 mAbs Significantly Inhibit Tumor Development In Vivo

Figure 10:
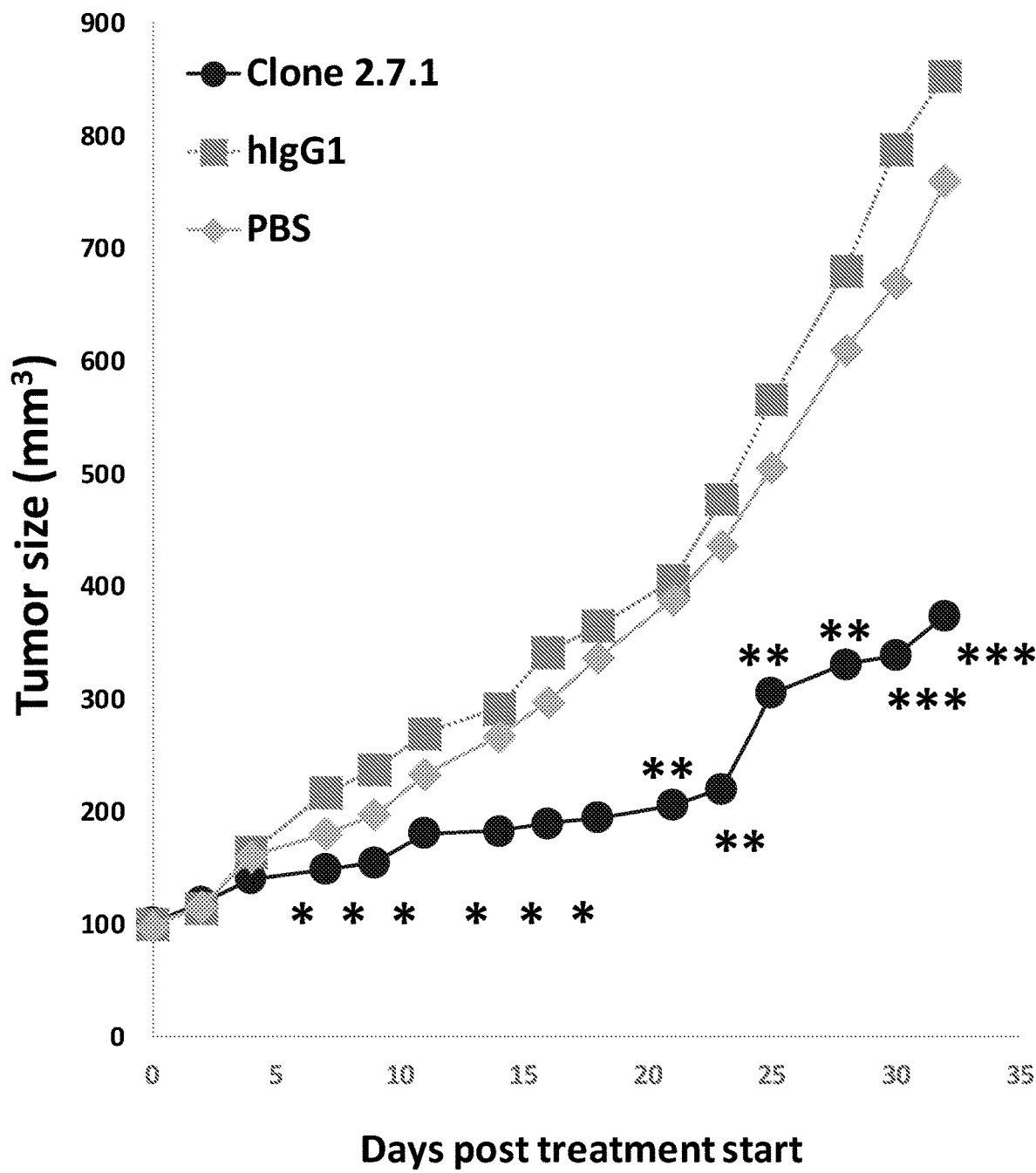
FIG. 10 shows the effect of Nectin-2 mAb on tumor development in vivo. Scid female mice (n=33) were injected SC with $5\times10^6$ MDA-MB-231 cells in Matrigel. Once tumors reached 80-120 $mm^3$ mice were randomized into three groups and treated twice weekly, in a blinded manner, by i.v. injection of either PBS (light grey diamonds), hIgG1 control Ab (grey squares) or clone-7-human IgG1 (2.7.1) (black circle), both at 3 mg/kg. *$p<0.04$, $p<0.02$, *$p<0.008$.

Scid female mice (n=33) were injected SC with $5 \times 10^6$ MDA-MB-231 cells in Matrigel. Once tumors reached 80-120 mm$^3$ mice were randomized into three groups and treated twice weekly, in a blinded manner, by i.v. injection of either PBS (light grey diamonds; FIG. 10), hIgG1 control Ab (grey squares) or clone-7-human IgG1 (2.7.1) (black circle), both at 3 mg/kg. As shown in FIG. 10, significant tumor growth inhibition (TGI) was observed for clone 2.7.1, starting at day 7 post treatment, reaching 54% at the end of the study. *p<0.04, p<0.02, *p<0.008.

Figure 11A:
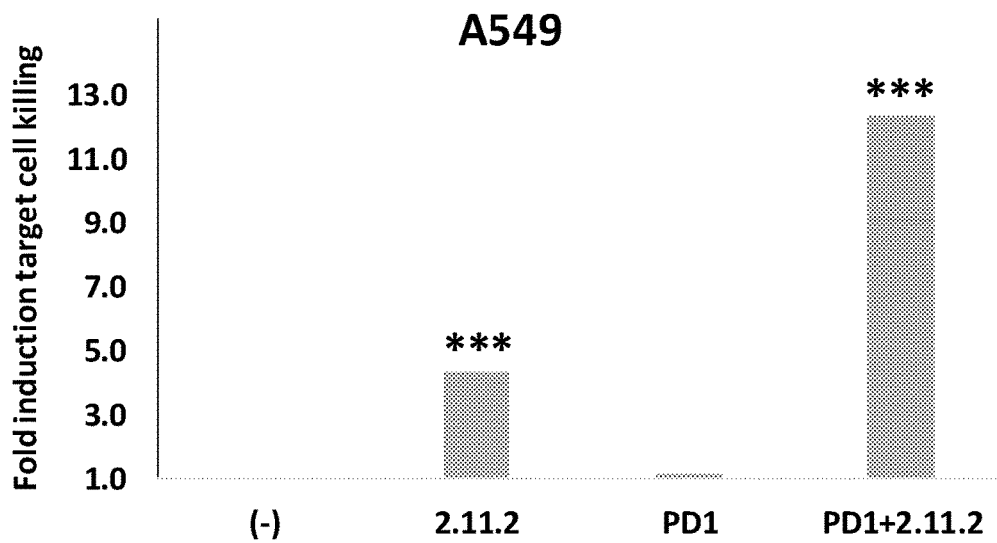
FIGS. 11A-11B show the effect of Nectin-2 mAbs with hIgG2 Fc, either alone or with PD-1, on tumor cells killing and PBMC proliferation. A549 cells were co-incubated with PBMCs at E:T ratio of 7:1, for 96 h, in the presence of 4 ug/ml PHA-L, either without Ab, or with Clone-11-human IgG2 (2.11.2), Keytruda™ (both at 3.5 ug/ml), or their combination (3.5 ug/ml each). Tumor cell killing (FIG. 11A) and PBMC (T cells) proliferation (FIG. 11B) are shown. *$p<0.01$, $p<0.002$, *$p<0.0008$.
Figure 11B:
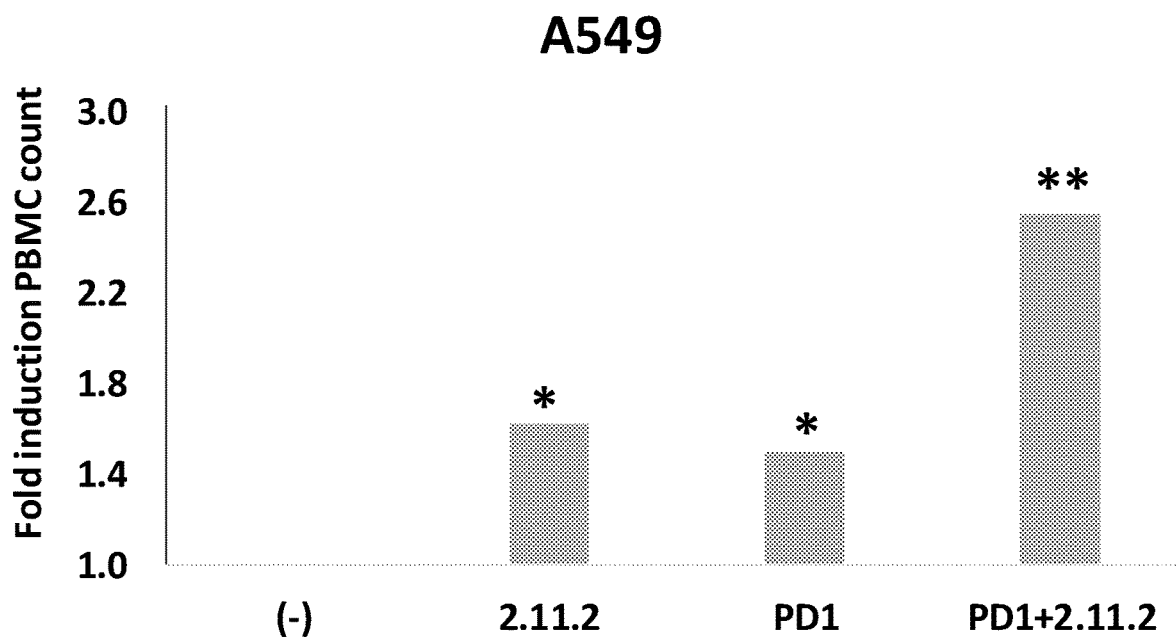

Example 12. Chimeric Nectin-2 mAbs with Human IgG2 Fc, Lead to Increased Tumor Cells Killing and PBMC Proliferation, in Synergy with Anti-PD-1 mAbs A549 cells were co-incubated with PBMCs at ET ratio of 7:1, for 96 h, in the presence of 4 ug/ml PHA-L, either without Ab, or with Clone-11-hIgG2 (2.11.2), Keytruda (both at 3.5 ug/ml), or their combination (3.5 ug/ml each). Significant increase in tumor cell killing (FIG. 11A) and PBMC (T cell) proliferation (FIG. 11B) was seen for the 2.11.2 treatment group, which was further increased when combined with the anti-PD-1 Ab Keytruda. *p<0.01, p<0.002, *p<0.0008.

Example 13. CAR-T Cells Expressing scFv Derived from Clones 7 and 11 are Specifically Activated in the Presence of Tumor Cells that Express Nectin-2

Figure 12A:
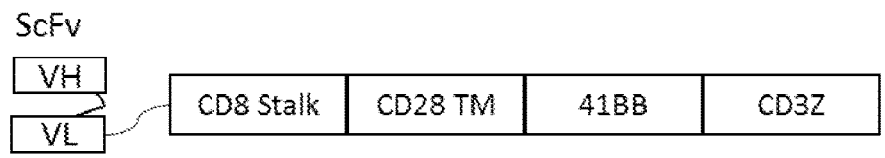
FIGS. 12A-12E show the effect of CAR-T expressing scFv derived from clone 7 and clone 11 antibodies (CAR-T 2.07 and CAR-T 2.11, respectively) on specific T cell activation in the presence of tumor cells that express Nectin-2. PBMCs from healthy donors were transduced with CAR-T constructs. The general schematic drawing of these constructs is shown in FIG. 12A where the scFv represents the single chain of the Nectin-2 mAbs described herein. Nectin-2 CAR-T PBMCs were incubated with U937 or BT-474 target cells at various E:T ratios. Killing of the target cells (FIGS. 12B and 12D), as well as IFNγ secretion by the activated PBMCs (FIGS. 12C and 12E, $p<0.03$) are shown.
Figure 12B:
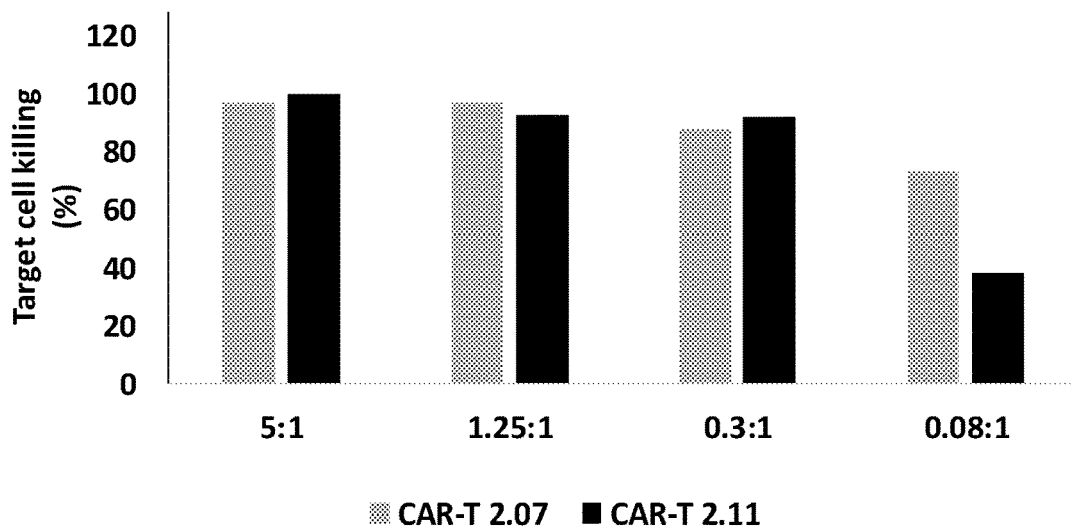
Figure 12C:
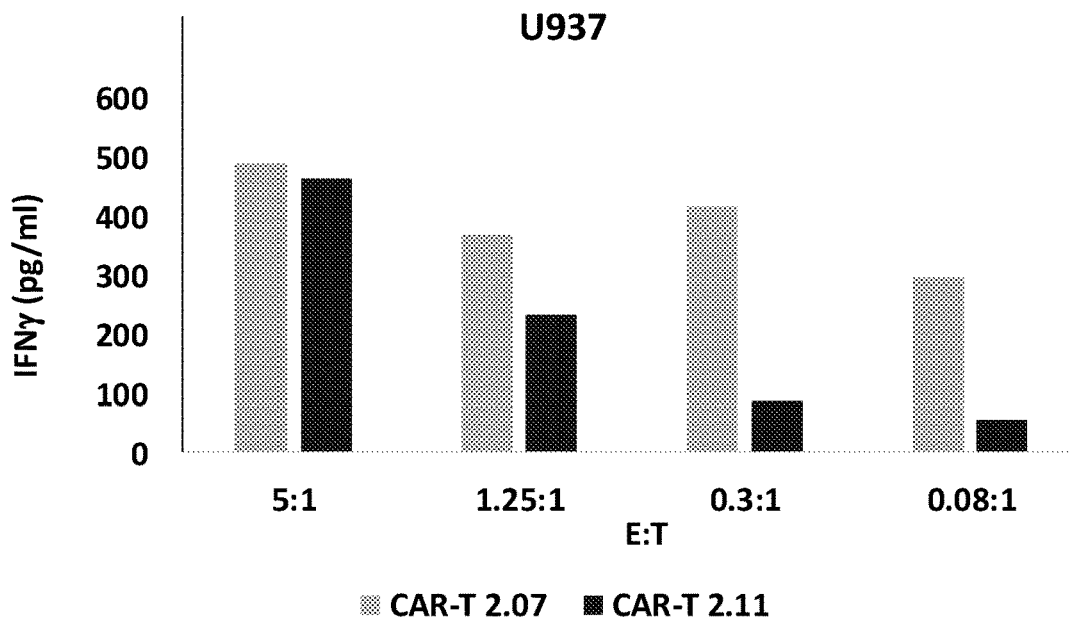
Figure 12D:
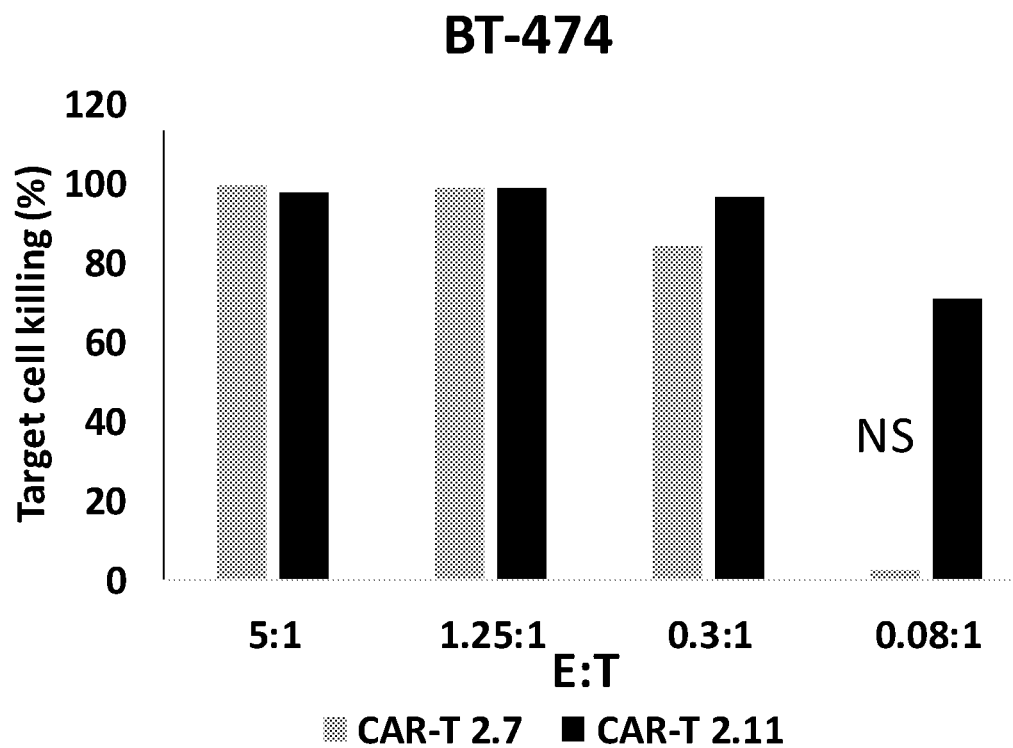
Figure 12E:
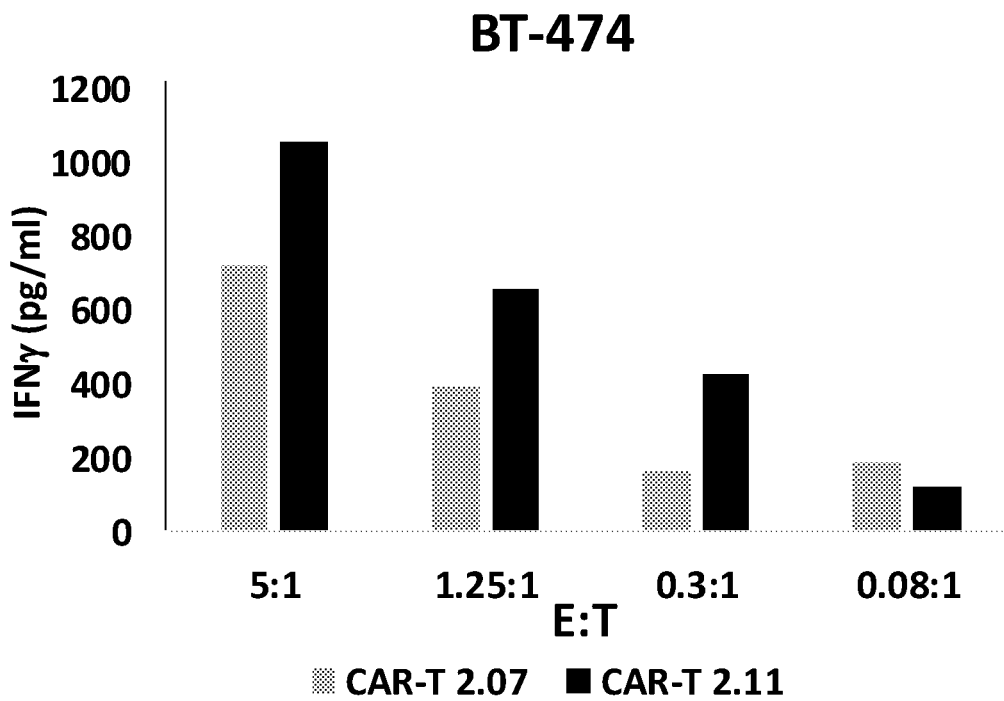

PBMCs from healthy donors were transduced with different CAR-T constructs comprising a scFv molecule according to the invention and at least one regulatory, transmembrane and/or stimulatory region. In the schematic drawing shown in FIG. 12A, the CAR-T comprises a scFv and the four regions: CD8 Stalk, CD28 TM, 4-1BB and CD3ξ. Nectin-2 CAR-T 2.07 (binding sites derived from clone 7) or CAR-T 2.11 (binding sites derived from clone 11) PBMCs were incubated with U937 or BT-474 target cells at various E:T ratios. Killing of the target cells (FIGS. 12B and 12D) was significant at the vast majority of the E:T ratios tested (p<0.005, except when indicated by NS) as well as IFNγ secretion by the activated PBMCs (FIGS. 12C and 12E, p<0.03). FIGS. 12B-E depict representative experiments out of three performed for each cell line (CAR-T 2.07 grey bars, CAR-T 2.11 black bars).

Example 14. Antibody Sequences

Table 1. details some of the antibody sequences of the invention.

TABLE 1

| SEQ ID # | Description | Type | SEQ ID # with a leader peptide* |
|---|---|---|---|
| 1 | Clone 7 HC CDR1 | Amino acid | |
| 2 | Clone 7 HC CDR2 | Amino acid | |
| 3 | Clone 7 HC CDR3 | Amino acid | |
| 4 | Clone 7 LC CDR1 | Amino acid | |
| 5 | Clone 7 LC CDR2 | Amino acid | |
| 6 | Clone 7 LC CDR3 | Amino acid | |
| 7 | Clone 7 HC | Amino acid | 25 |
| 8 | Clone 7 LC | Amino acid | 26 |
| 9 | Clone 7 HC | Nucleic acid | 27 |
| 10 | Clone 7 LC | Nucleic acid | 28 |
| 11 | Clone 11 HC CDR 1 | Amino acid | |
| 12 | Clone 11 HC CDR 2 | Amino acid | |
| 13 | Clone 11 HC CDR 3 | Amino acid | |
| 14 | Clone 11 LC CDR 1 | Amino acid | |
| 15 | Clone 11 LC CDR 2 | Amino acid | |
| 16 | Clone 11 LC CDR 3 | Amino acid | |
| 17 | Clone 11 HC | Amino acid | 29 |
| 18 | Clone 11 LC | Amino acid | 30 |
| 19 | Clone 11 HC | Nucleic acid | 31 |
| 20 | Clone 11 LC | Nucleic acid | 32 |
| 21 | scFv clone 7 | Nucleic acid | |
| 22 | scFv clone 7 | Amino acid | |
| 23 | scFv clone 11 | Nucleic acid | |
| 24 | scFv clone 11 | Amino acid | |

*Sequence ID Nos. 25-28 and 29-32 correspond to sequences 7-10 and 17-20, respectively, except that they have an addition of a leader peptide.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

The invention claimed is:

1. An antibody that binds to Nectin-2 or antigen-binding fragment thereof, comprising a CDR set selected from the group consisting of:

i. a set of six CDRs wherein:
HC CDR1 is RFTMS; (SEQ ID NO: 1)
HC CDR2 is TISSGGSYTYYPDSVKG; (SEQ ID NO: 2)
HC CDR3 is DRDFYGPYYAMDY; (SEQ ID NO: 3)
LC CDR1 is KSSQSLLNSGNQKNYLA; (SEQ ID NO: 4)
LC CDR2 is FASTRES; (SEQ ID NO: 5)
and
LC CDR3 is QQHYTTPLT; (SEQ ID NO: 6)
and ii. a set of six CDRs wherein:
HC CDR1 sequence is SYWIH; (SEQ ID NO: 11)
HC CDR2 is AVYPGNSDSNYNQKFKA; (SEQ ID NO: 12)
HC CDR3 is LVGTFDY; (SEQ ID NO: 13)
LC CDR1 is KASQNVGINVV; (SEQ ID NO: 14)
LC CDR2 is SASYRYS; (SEQ ID NO: 15)
and
LC CDR3 is QQYNTNPFT. (SEQ ID NO: 16)

2. The antibody or the antigen-binding fragment thereof according to claim 1, comprising:

a) (i) heavy chain variable region having at least 95% identity to the amino acid sequence according to SEQ ID NO: 7, and HC CDRs therein having amino acid sequences with 100% identity to RFTMS (SEQ ID NO: 1); TISSGGSYTYYPDSVKG (SEQ ID NO: 2); DRDFYGPYYAMDY (SEQ ID NO: 3); and (ii) a light chain variable region having at least 95% identity to the amino acid sequence according to SEQ ID NO: 8, and LC CDRs therein having amino acid sequences with 100% identity to KSSQSLLNSGNQKNYLA (SEQ ID NO: 4), FASTRES (SEQ ID NO: 5), and QQHYTTPLT (SEQ ID NO: 6); or b) (i) heavy chain variable region having at least 95% identity to the amino acid sequence according to SEQ ID NO: 17, and HC CDRs therein having amino acid sequences with 100% identity to SYWIH (SEQ ID NO: 11), AVYPGNSDSNYNQKFKA (SEQ ID NO: 12), and LVGTFDY (SEQ ID NO: 13); and (ii) and a light chain variable region having at least 95% identity to the amino acid sequence according to SEQ ID NO: 18, and LC CDRs therein having amino acid sequences with 100% identity to KASQNVGINVV (SEQ ID NO: 14), SASYRYS (SEQ ID NO: 15), and QQYNTNPFT (SEQ ID NO: 16).

3. The antibody or the antigen-binding fragment thereof according to claim 1, wherein the antigen-binding fragment thereof is a single chain Fv (scFv).

4. A polynucleotide encoding the antibody or antigen-binding fragment thereof according to claim 1.

5. The antibody or the antigen-binding fragment thereof according to claim 1 conjugated to a cytotoxic moiety, or a radioactive moiety.

6. A pharmaceutical composition comprising the antibody or the antigen-binding fragment thereof according to claim 1, and a pharmaceutical acceptable excipient, diluent, salt, or carrier.

7. A method of treating a Nectin-2 expressing cancer in a subject in need thereof, comprising administering to the subject in need thereof, a pharmaceutical composition according to claim 6.

8. The method of claim 7, further comprising administering to said subject an additional immuno-modulator, activated lymphocyte cell, kinase inhibitor, chemotherapeutic agent, or any other anti-cancer agent.

\* \* \* \* \*

SEQUENCE LISTING

<160> NUMBER OF SEQ ID NOS: 32

<210> SEQ ID NO 1
<211> LENGTH: 5
<212> TYPE: PRT
<213> ORGANISM: Mus musculus

```
<400> SEQUENCE: 1

Arg Phe Thr Met Ser
1               5

<210> SEQ ID NO 2
<211> LENGTH: 17
<212> TYPE: PRT
<213> ORGANISM: Mus musculus

<400> SEQUENCE: 2

Thr Ile Ser Ser Gly Gly Ser Tyr Thr Tyr Tyr Pro Asp Ser Val Lys
1               5                   10                  15

Gly

<210> SEQ ID NO 3
<211> LENGTH: 13
<212> TYPE: PRT
<213> ORGANISM: Mus musculus

<400> SEQUENCE: 3

Asp Arg Asp Phe Tyr Gly Pro Tyr Tyr Ala Met Asp Tyr
1               5                   10

<210> SEQ ID NO 4
<211> LENGTH: 17
<212> TYPE: PRT
<213> ORGANISM: Mus musculus

<400> SEQUENCE: 4

Lys Ser Ser Gln Ser Leu Leu Asn Ser Gly Asn Gln Lys Asn Tyr Leu
1               5                   10                  15

Ala

<210> SEQ ID NO 5
<211> LENGTH: 7
<212> TYPE: PRT
<213> ORGANISM: Mus musculus

<400> SEQUENCE: 5

Phe Ala Ser Thr Arg Glu Ser
1               5

<210> SEQ ID NO 6
<211> LENGTH: 9
<212> TYPE: PRT
<213> ORGANISM: Mus musculus

<400> SEQUENCE: 6

Gln Gln His Tyr Thr Thr Pro Leu Thr
1               5

<210> SEQ ID NO 7
<211> LENGTH: 122
<212> TYPE: PRT
<213> ORGANISM: Mus musculus

<400> SEQUENCE: 7

Asp Val Asn Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Arg Phe
            20                  25                  30
```

Thr Met Ser Trp Val Arg Gln Thr Pro Glu Lys Thr Leu Asp Trp Val
            35                  40                  45

Ala Thr Ile Ser Ser Gly Gly Ser Tyr Thr Tyr Tyr Pro Asp Ser Val
 50                  55                  60

Lys Gly Arg Phe Thr Ile Ser Arg Asp Asn Ala Lys Asn Thr Leu Tyr
65                  70                  75                  80

Leu Gln Met Ser Ser Leu Lys Ser Glu Asp Thr Ala Met Tyr Tyr Cys
                85                  90                  95

Thr Arg Asp Arg Asp Phe Tyr Gly Pro Tyr Tyr Ala Met Asp Tyr Trp
            100                 105                 110

Gly Gln Gly Thr Ser Val Thr Val Ser Ser
            115                 120

<210> SEQ ID NO 8
<211> LENGTH: 113
<212> TYPE: PRT
<213> ORGANISM: Mus musculus

<400> SEQUENCE: 8

Asp Ile Val Met Thr Gln Ser Pro Ser Ser Leu Ala Ile Ser Val Gly
1               5                   10                  15

Gln Lys Val Thr Met Ser Cys Lys Ser Ser Gln Ser Leu Leu Asn Ser
            20                  25                  30

Gly Asn Gln Lys Asn Tyr Leu Ala Trp Tyr Gln Lys Pro Gly Gln
        35                  40                  45

Ser Pro Lys Leu Leu Val His Phe Ala Ser Thr Arg Glu Ser Gly Val
 50                  55                  60

Pro Asp Arg Phe Ile Gly Ser Gly Ser Gly Thr Asp Phe Thr Leu Thr
65                  70                  75                  80

Ile Ser Ser Val Gln Ala Glu Asp Leu Ala Asp Tyr Phe Cys Gln Gln
                85                  90                  95

His Tyr Thr Thr Pro Leu Thr Phe Gly Ala Gly Thr Lys Leu Glu Leu
            100                 105                 110

Lys

<210> SEQ ID NO 9
<211> LENGTH: 366
<212> TYPE: DNA
<213> ORGANISM: Mus musculus

<400> SEQUENCE: 9
gacgtgaatc tggtggagtc tgggggaggc ttagtgaagc ctggagggtc cctgaaactc      60
tcctgtgcag cctctggatt cactttcagt aggtttacca tgtcttgggt tcgccagact     120
ccggagaaga cattgactg gtcgcaacc attagtagtg gtggttctta cacctactat     180
ccagacagtg tgaagggccg attcaccatc tccagagaca atgccaagaa caccctgtac     240
ctgcaaatga gcagtctgaa gtctgaggac acagccatgt attactgtac aagagatcga     300
gatttctacg gcccttacta tgctatggac tactggggtc aaggaacctc agtcaccgtc     360
tcctca                                                                 366

<210> SEQ ID NO 10
<211> LENGTH: 339
<212> TYPE: DNA
<213> ORGANISM: Mus musculus

<400> SEQUENCE: 10

```
gacattgtga tgacacagtc tccatcctcc ctggctatct cagtaggaca gaaggtcact    60
atgagctgca agtccagtca gagccttta  aatagtggca atcaaaagaa ctatttggcc   120
tggtaccagc aaaaaccagg acagtctcct aaacttctgg tacactttgc atccactagg   180
gaatctgggg tccctgatcg cttcataggc agtggatctg ggacagattt cactcttacc   240
atcagcagtg tgcaggctga agacctggca gattacttct gtcagcaaca ttataccact   300
ccgctcacgt tcggtgctgg gaccaagctg gagctgaaa                           339
```

<210> SEQ ID NO 11
<211> LENGTH: 5
<212> TYPE: PRT
<213> ORGANISM: Mus musculus

<400> SEQUENCE: 11

Ser Tyr Trp Ile His
1               5

<210> SEQ ID NO 12
<211> LENGTH: 17
<212> TYPE: PRT
<213> ORGANISM: Mus musculus

<400> SEQUENCE: 12

Ala Val Tyr Pro Gly Asn Ser Asp Ser Asn Tyr Asn Gln Lys Phe Lys
1               5                   10                  15
Ala

<210> SEQ ID NO 13
<211> LENGTH: 7
<212> TYPE: PRT
<213> ORGANISM: Mus musculus

<400> SEQUENCE: 13

Leu Val Gly Thr Phe Asp Tyr
1               5

<210> SEQ ID NO 14
<211> LENGTH: 11
<212> TYPE: PRT
<213> ORGANISM: Mus musculus

<400> SEQUENCE: 14

Lys Ala Ser Gln Asn Val Gly Ile Asn Val Val
1               5                   10

<210> SEQ ID NO 15
<211> LENGTH: 7
<212> TYPE: PRT
<213> ORGANISM: Mus musculus

<400> SEQUENCE: 15

Ser Ala Ser Tyr Arg Tyr Ser
1               5

<210> SEQ ID NO 16
<211> LENGTH: 9
<212> TYPE: PRT
<213> ORGANISM: Mus musculus

<400> SEQUENCE: 16

Gln Gln Tyr Asn Thr Asn Pro Phe Thr
1               5

<210> SEQ ID NO 17
<211> LENGTH: 116
<212> TYPE: PRT
<213> ORGANISM: Mus musculus

<400> SEQUENCE: 17

Glu Val Gln Leu Gln Gln Ser Gly Thr Val Leu Thr Arg Pro Gly Ala
1               5                   10                  15

Ser Val Lys Met Ser Cys Lys Ala Ser Gly Tyr Ile Phe Thr Ser Tyr
            20                  25                  30

Trp Ile His Trp Val Lys Gln Arg Pro Gly Gln Gly Leu Glu Trp Ile
        35                  40                  45

Gly Ala Val Tyr Pro Gly Asn Ser Asp Ser Asn Tyr Asn Gln Lys Phe
    50                  55                  60

Lys Ala Lys Ala Lys Leu Thr Ala Val Thr Ser Ser Thr Ala Tyr
65                  70                  75                  80

Met Glu Leu Ser Ser Leu Thr Ser Glu Asp Ser Ala Val Tyr Tyr Cys
                85                  90                  95

Thr Lys Leu Val Gly Thr Phe Asp Tyr Trp Gly Gln Gly Thr Thr Leu
            100                 105                 110

Thr Val Ser Ser
        115

<210> SEQ ID NO 18
<211> LENGTH: 107
<212> TYPE: PRT
<213> ORGANISM: Mus musculus

<400> SEQUENCE: 18

Asp Ile Val Met Thr Gln Ser Gln Lys Phe Met Ser Ser Ser Ile Gly
1               5                   10                  15

Asp Arg Val Ser Val Thr Cys Lys Ala Ser Gln Asn Val Gly Ile Asn
            20                  25                  30

Val Val Trp Tyr Gln Gln Arg Ala Gly Gln Ser Pro Lys Thr Leu Ile
        35                  40                  45

Tyr Ser Ala Ser Tyr Arg Tyr Ser Gly Val Pro Asp Arg Phe Thr Gly
    50                  55                  60

Ser Gly Ser Gly Thr Asp Phe Thr Leu Thr Ile Ser Asn Val Gln Ser
65                  70                  75                  80

Glu Asp Leu Ala Glu Tyr Phe Cys Gln Gln Tyr Asn Thr Asn Pro Phe
                85                  90                  95

Thr Phe Gly Ser Gly Thr Lys Leu Glu Ile Lys
            100                 105

<210> SEQ ID NO 19
<211> LENGTH: 348
<212> TYPE: DNA
<213> ORGANISM: Mus musculus

<400> SEQUENCE: 19
gaggttcagc tccagcagtc tgggactgtg ctgacaaggc ctggggcttc agtgaagatg      60
tcctgcaagg cttctggcta cattttacc agctactgga ttcactgggt aaaacagcgg     120
cctggacagg gtctggaatg gattggcgct gtttatcctg gaaatagtga ttctaactac     180
aaccagaagt tcaaggccaa ggccaaactg actgcagtca catccaccag cactgcctac     240
atggagctca gcagcctgac aagtgaggac tctgcggtct attactgtac aaagctagtt     300

```
gggacgtttg actactgggg ccaaggcacc actctcacag tctcctcg            348
```

<210> SEQ ID NO 20
<211> LENGTH: 321
<212> TYPE: DNA
<213> ORGANISM: Mus musculus

<400> SEQUENCE: 20

```
gacattgtga tgacccagtc tcaaaaattc atgtcctcat caataggaga cagggtcagc    60
gtcacctgca aggccagtca gaatgtgggc attaatgtag tttggtatca acagagagca   120
gggcagtctc ctaaaacact gatttactcg gcatcctacc ggtacagtgg agtccctgat   180
cgcttcacag gcagtggatc tgggacagat ttcactctca ccatcagcaa tgtgcagtct   240
gaagacttgg cagagtattt ctgtcagcaa tataacacca tccattcac gttcggctcg    300
gggacaaagt tggaaataaa a                                             321
```

<210> SEQ ID NO 21
<211> LENGTH: 750
<212> TYPE: DNA
<213> ORGANISM: Artificial sequence
<220> FEATURE:
<223> OTHER INFORMATION: scFv clone 7

<400> SEQUENCE: 21

```
gacgtgaatc tggtggagtc tgggggaggc ttagtgaagc ctggagggtc cctgaaactc    60
tcctgtgcag cctctggatt cactttcagt aggtttacca tgtcttgggt tcgccagact   120
ccggagaaga cattggactg ggtcgcaacc attagtagtg gtggttctta cacctactat   180
ccagacagtg tgaagggccg attcaccatc tccagagaca tgccaagaa cacccctgtac   240
ctgcaaatga gcagtctgaa gtctgaggac acagccatgt attactgtac aagagatcga   300
gatttctacg gcccttacta tgctatggac tactggggtc aaggaacctc agtcaccgtc   360
tcctcaggtg gaggtggctc cggaggaggt ggttctggag aggtggttc tgatatcgtg   420
atgacacagt ctccatcctc cctggctatc tcagtaggac agaaggtcac tatgagctgc   480
aagtccagtc agagcctttt aaatagtggc aatcaaaaga actatttggc ctggtaccag   540
caaaaaccag acagtctcc taaacttctg gtacactttg catccactag ggaatctggg   600
gtccctgatc gcttcatagg cagtggatct gggacagatt tcactcttac catcagcagt   660
gtgcaggctg aagacctggc agattacttc tgtcagcaac attataccac tccgctcacg   720
ttcggtgctg ggaccaagct ggagctgaaa                                    750
```

<210> SEQ ID NO 22
<211> LENGTH: 250
<212> TYPE: PRT
<213> ORGANISM: Artificial sequence
<220> FEATURE:
<223> OTHER INFORMATION: scFv clone 7

<400> SEQUENCE: 22

```
Asp Val Asn Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Arg Phe
            20                  25                  30

Thr Met Ser Trp Val Arg Gln Thr Pro Glu Lys Thr Leu Asp Trp Val
        35                  40                  45

Ala Thr Ile Ser Ser Gly Gly Ser Tyr Thr Tyr Tyr Pro Asp Ser Val
```

```
                  50                  55                  60
Lys Gly Arg Phe Thr Ile Ser Arg Asp Asn Ala Lys Asn Thr Leu Tyr
 65                  70                  75                  80

Leu Gln Met Ser Ser Leu Lys Ser Glu Asp Thr Ala Met Tyr Tyr Cys
                 85                  90                  95

Thr Arg Asp Arg Asp Phe Tyr Gly Pro Tyr Tyr Ala Met Asp Tyr Trp
            100                 105                 110

Gly Gln Gly Thr Ser Val Thr Val Ser Ser Gly Gly Gly Gly Ser Gly
            115                 120                 125

Gly Gly Ser Gly Gly Gly Ser Asp Ile Val Met Thr Gln Ser
130                 135                 140

Pro Ser Ser Leu Ala Ile Ser Val Gly Gln Lys Val Thr Met Ser Cys
145                 150                 155                 160

Lys Ser Ser Gln Ser Leu Leu Asn Ser Gly Asn Gln Lys Asn Tyr Leu
                165                 170                 175

Ala Trp Tyr Gln Gln Lys Pro Gly Gln Ser Pro Lys Leu Leu Val His
            180                 185                 190

Phe Ala Ser Thr Arg Glu Ser Gly Val Pro Asp Arg Phe Ile Gly Ser
            195                 200                 205

Gly Ser Gly Thr Asp Phe Thr Leu Thr Ile Ser Ser Val Gln Ala Glu
210                 215                 220

Asp Leu Ala Asp Tyr Phe Cys Gln Gln His Tyr Thr Thr Pro Leu Thr
225                 230                 235                 240

Phe Gly Ala Gly Thr Lys Leu Glu Leu Lys
                245                 250

<210> SEQ ID NO 23
<211> LENGTH: 714
<212> TYPE: DNA
<213> ORGANISM: Artificial sequence
<220> FEATURE:
<223> OTHER INFORMATION: scFv clone 11

<400> SEQUENCE: 23
gaggttcagc tccagcagtc tgggactgtg ctgacaaggc ctggggcttc agtgaagatg      60
tcctgcaagg cttctggcta cattttta cc agctactgga ttcactgggt aaaacagcgg    120
cctggacagg gtctggaatg gattggcgct gtttatcctg aaatagtga ttctaactac      180 aaccagaagt tcaaggccaa ggccaaactg actgcagtca catccaccag cactgcctac    240
atggagctca gcagcctgac aagtgaggac tctgcggtct attactgtac aaagctagtt    300
gggacgtttg actactgggg ccaaggcacc actctcacag tctcctcggg tggaggtggc    360
tccggaggag gtggttctgg aggaggtggt tctgatatcg tgatgaccca gtctcaaaaa    420
ttcatgtcct catcaatagg agacagggtc agcgtcacct gcaaggccag tcagaatgtg    480
ggcattaatg tagtttggta tcaacagaga gcagggcagt ctcctaaaac actgatttac    540
tcggcatcct accggtacag tggagtccct gatcgcttca caggcagtgg atctgggaca    600
gatttcactc tcaccatcag caatgtgcag tctgaagact ggcagagta tttctgtcag    660 caatataaca ccaatccatt cacgttcggc tcggggacaa agttggaaat aaaa          714

<210> SEQ ID NO 24
<211> LENGTH: 238
<212> TYPE: PRT
<213> ORGANISM: Artificial sequence
<220> FEATURE:
<223> OTHER INFORMATION: scFv clone 11
```

<400> SEQUENCE: 24

Glu Val Gln Leu Gln Gln Ser Gly Thr Val Leu Thr Arg Pro Gly Ala
1               5                   10                  15

Ser Val Lys Met Ser Cys Lys Ala Ser Gly Tyr Ile Phe Thr Ser Tyr
            20                  25                  30

Trp Ile His Trp Val Lys Gln Arg Pro Gly Gln Gly Leu Glu Trp Ile
        35                  40                  45

Gly Ala Val Tyr Pro Gly Asn Ser Asp Ser Asn Tyr Asn Gln Lys Phe
    50                  55                  60

Lys Ala Lys Ala Lys Leu Thr Ala Val Thr Ser Thr Ser Thr Ala Tyr
65                  70                  75                  80

Met Glu Leu Ser Ser Leu Thr Ser Glu Asp Ser Ala Val Tyr Tyr Cys
                85                  90                  95

Thr Lys Leu Val Gly Thr Phe Asp Tyr Trp Gly Gln Gly Thr Thr Leu
            100                 105                 110

Thr Val Ser Ser Gly Gly Gly Gly Ser Gly Gly Gly Gly Ser Gly Gly
        115                 120                 125

Gly Gly Ser Asp Ile Val Met Thr Gln Ser Gln Lys Phe Met Ser Ser
130                 135                 140

Ser Ile Gly Asp Arg Val Ser Val Thr Cys Lys Ala Ser Gln Asn Val
145                 150                 155                 160

Gly Ile Asn Val Val Trp Tyr Gln Gln Arg Ala Gly Gln Ser Pro Lys
                165                 170                 175

Thr Leu Ile Tyr Ser Ala Ser Tyr Arg Tyr Ser Gly Val Pro Asp Arg
            180                 185                 190

Phe Thr Gly Ser Gly Ser Gly Thr Asp Phe Thr Leu Thr Ile Ser Asn
        195                 200                 205

Val Gln Ser Glu Asp Leu Ala Glu Tyr Phe Cys Gln Gln Tyr Asn Thr
210                 215                 220

Asn Pro Phe Thr Phe Gly Ser Gly Thr Lys Leu Glu Ile Lys
225                 230                 235

<210> SEQ ID NO 25
<211> LENGTH: 141
<212> TYPE: PRT
<213> ORGANISM: Mus musculus

<400> SEQUENCE: 25

Met Asn Phe Gly Leu Arg Leu Ile Phe Leu Val Leu Thr Leu Lys Gly
1               5                   10                  15

Val Gln Cys Asp Val Asn Leu Val Glu Ser Gly Gly Gly Leu Val Lys
            20                  25                  30

Pro Gly Gly Ser Leu Lys Leu Ser Cys Ala Ala Ser Gly Phe Thr Phe
        35                  40                  45

Ser Arg Phe Thr Met Ser Trp Val Arg Gln Thr Pro Glu Lys Thr Leu
    50                  55                  60

Asp Trp Val Ala Thr Ile Ser Ser Gly Gly Ser Tyr Thr Tyr Tyr Pro
65                  70                  75                  80

Asp Ser Val Lys Gly Arg Phe Thr Ile Ser Arg Asp Asn Ala Lys Asn
                85                  90                  95

Thr Leu Tyr Leu Gln Met Ser Ser Leu Lys Ser Glu Asp Thr Ala Met
            100                 105                 110

Tyr Tyr Cys Thr Arg Asp Arg Asp Phe Tyr Gly Pro Tyr Tyr Ala Met
        115                 120                 125

Asp Tyr Trp Gly Gln Gly Thr Ser Val Thr Val Ser Ser
        130             135                 140

<210> SEQ ID NO 26
<211> LENGTH: 133
<212> TYPE: PRT
<213> ORGANISM: Mus musculus

<400> SEQUENCE: 26

Met Glu Ser Gln Thr Gln Val Leu Met Phe Leu Leu Leu Trp Val Ser
1               5                   10                  15

Gly Ala Cys Ser Asp Ile Val Met Thr Gln Ser Pro Ser Ser Leu Ala
            20                  25                  30

Ile Ser Val Gly Gln Lys Val Thr Met Ser Cys Lys Ser Ser Gln Ser
        35                  40                  45

Leu Leu Asn Ser Gly Asn Gln Lys Asn Tyr Leu Ala Trp Tyr Gln Gln
    50                  55                  60

Lys Pro Gly Gln Ser Pro Lys Leu Leu Val His Phe Ala Ser Thr Arg
65                  70                  75                  80

Glu Ser Gly Val Pro Asp Arg Phe Ile Gly Ser Gly Ser Gly Thr Asp
                85                  90                  95

Phe Thr Leu Thr Ile Ser Ser Val Gln Ala Glu Asp Leu Ala Asp Tyr
            100                 105                 110

Phe Cys Gln Gln His Tyr Thr Thr Pro Leu Thr Phe Gly Ala Gly Thr
        115                 120                 125

Lys Leu Glu Leu Lys
    130

<210> SEQ ID NO 27
<211> LENGTH: 423
<212> TYPE: DNA
<213> ORGANISM: Mus musculus

<400> SEQUENCE: 27
atgaacttcg ggctcagatt gattttcctt gtccttactt taaaaggtgt ccagtgtgac       60
gtgaatctgg tggagtctgg gggaggctta gtgaagcctg agggtccct gaaactctcc      120 tgtgcagcct ctggattcac tttcagtagg tttaccatgt cttgggttcg ccagactccg      180
gagaagacat tggactgggt cgcaaccatt agtagtggtg gttcttacac ctactatcca      240
gacagtgtga agggccgatt caccatctcc agagacaatg ccaagaacac cctgtacctg      300
caaatgagca gtctgaagtc tgaggacaca gccatgtatt actgtacaag agatcgagat      360
ttctacggcc ttactatgc tatggactac tggggtcaag aacctcagt caccgtctcc        420 tca                                                                    423

<210> SEQ ID NO 28
<211> LENGTH: 399
<212> TYPE: DNA
<213> ORGANISM: Mus musculus

<400> SEQUENCE: 28
atggaatcac agacccaggt cctcatgttt cttctgctct gggtatctgg tgcctgttca       60
gacattgtga tgacacagtc tccatcctcc ctggctatct cagtaggaca gaaggtcact      120
atgagctgca agtccagtca gagccttta aatagtggca atcaaaagaa ctatttggcc       180
tggtaccagc aaaaaccagg acagtctcct aaacttctgg tacactttgc atccactagg      240

```
gaatctgggg tccctgatcg cttcataggc agtggatctg ggacagattt cactcttacc    300
atcagcagtg tgcaggctga agacctggca gattacttct gtcagcaaca ttataccact    360
ccgctcacgt tcggtgctgg gaccaagctg gagctgaaa                           399
```

<210> SEQ ID NO 29
<211> LENGTH: 135
<212> TYPE: PRT
<213> ORGANISM: Mus musculus

<400> SEQUENCE: 29

```
Met Glu Cys Asn Trp Ile Leu Pro Phe Ile Leu Ser Val Thr Ser Gly
1               5                   10                  15

Val Tyr Ser Glu Val Gln Leu Gln Gln Ser Gly Thr Val Leu Thr Arg
            20                  25                  30

Pro Gly Ala Ser Val Lys Met Ser Cys Lys Ala Ser Gly Tyr Ile Phe
        35                  40                  45

Thr Ser Tyr Trp Ile His Trp Val Lys Gln Arg Pro Gly Gln Gly Leu
    50                  55                  60

Glu Trp Ile Gly Ala Val Tyr Pro Gly Asn Ser Asp Ser Asn Tyr Asn
65                  70                  75                  80

Gln Lys Phe Lys Ala Lys Ala Lys Leu Thr Ala Val Thr Ser Thr Ser
                85                  90                  95

Thr Ala Tyr Met Glu Leu Ser Ser Leu Thr Ser Glu Asp Ser Ala Val
            100                 105                 110

Tyr Tyr Cys Thr Lys Leu Val Gly Thr Phe Asp Tyr Trp Gly Gln Gly
        115                 120                 125

Thr Thr Leu Thr Val Ser Ser
    130                 135
```

<210> SEQ ID NO 30
<211> LENGTH: 127
<212> TYPE: PRT
<213> ORGANISM: Mus musculus

<400> SEQUENCE: 30

```
Met Glu Ser Gln Thr Gln Val Phe Val Tyr Met Leu Leu Trp Leu Ser
1               5                   10                  15

Gly Val Asp Gly Asp Ile Val Met Thr Gln Ser Gln Lys Phe Met Ser
            20                  25                  30

Ser Ser Ile Gly Asp Arg Val Ser Val Thr Cys Lys Ala Ser Gln Asn
        35                  40                  45

Val Gly Ile Asn Val Val Trp Tyr Gln Gln Arg Ala Gly Gln Ser Pro
    50                  55                  60

Lys Thr Leu Ile Tyr Ser Ala Ser Tyr Arg Tyr Ser Gly Val Pro Asp
65                  70                  75                  80

Arg Phe Thr Gly Ser Gly Ser Gly Thr Asp Phe Thr Leu Thr Ile Ser
                85                  90                  95

Asn Val Gln Ser Glu Asp Leu Ala Glu Tyr Phe Cys Gln Gln Tyr Asn
            100                 105                 110

Thr Asn Pro Phe Thr Phe Gly Ser Gly Thr Lys Leu Glu Ile Lys
        115                 120                 125
```

<210> SEQ ID NO 31
<211> LENGTH: 405
<212> TYPE: DNA
<213> ORGANISM: Mus musculus

```
<400> SEQUENCE: 31
atggaatgta actggatact tccttttatt ctgtcggtaa cctcaggggt ctactcagag      60
gttcagctcc agcagtctgg gactgtgctg acaaggcctg gggcttcagt gaagatgtcc    120
tgcaaggctt ctggctacat ttttaccagc tactggattc actgggtaaa acagcggcct    180
ggacagggtc tggaatggat tggcgctgtt tatcctggaa atagtgattc taactacaac    240
cagaagttca aggccaaggc caaactgact gcagtcacat ccaccagcac tgcctacatg    300
gagctcagca gcctgacaag tgaggactct gcggtctatt actgtacaaa gctagttggg    360
acgtttgact actggggcca aggcaccact ctcacagtct cctcg                     405

<210> SEQ ID NO 32
<211> LENGTH: 381
<212> TYPE: DNA
<213> ORGANISM: Mus musculus

<400> SEQUENCE: 32
atggagtcac agactcaggt ctttgtatac atgttgctgt ggttgtctgg tgttgatgga      60
gacattgtga tgacccagtc tcaaaaattc atgtcctcat caataggaga cagggtcagc    120
gtcacctgca aggccagtca gaatgtgggc attaatgtag tttggtatca acagagagca    180 ggcagtctc ctaaaacact gatttactcg gcatcctacc ggtacagtgg agtccctgat    240
cgcttcacag gcagtggatc tgggacagat ttcactctca ccatcagcaa tgtgcagtct    300
gaagacttgg cagagtattt ctgtcagcaa tataacacca tccattcac gttcggctcg    360 gggacaaagt tggaaataaa a                                               381
```